US012120758B2

(12) United States Patent
Pan

(10) Patent No.: US 12,120,758 B2
(45) Date of Patent: Oct. 15, 2024

(54) METHOD AND APPARATUS FOR ACQUIRING SYSTEM INFORMATION AND PAGING VIA UE-TO-NETWORK RELAY IN A WIRELESS COMMUNICATION SYSTEM

(71) Applicant: ASUSTek Computer Inc., Taipei (TW)

(72) Inventor: Li-Te Pan, Taipei (TW)

(73) Assignee: ASUSTek Computer Inc., Taipei (TW)

( * ) Notice: Subject to any disclaimer, the term of this patent is extended or adjusted under 35 U.S.C. 154(b) by 312 days.

(21) Appl. No.: 17/508,327

(22) Filed: Oct. 22, 2021

(65) Prior Publication Data

US 2022/0174762 A1 Jun. 2, 2022

Related U.S. Application Data

(60) Provisional application No. 63/117,090, filed on Nov. 23, 2020.

(51) Int. Cl.
*H04W 76/14* (2018.01)
*H04W 76/27* (2018.01)
*H04W 76/30* (2018.01)
*H04W 88/04* (2009.01)

(52) U.S. Cl.
CPC .......... *H04W 76/14* (2018.02); *H04W 76/27* (2018.02); *H04W 76/30* (2018.02); *H04W 88/04* (2013.01)

(58) Field of Classification Search
CPC ...... H04W 76/14; H04W 76/30; H04W 76/27
See application file for complete search history.

(56) References Cited

U.S. PATENT DOCUMENTS

2022/0095409 A1* 3/2022 Agiwal ............ H04W 74/0833
2023/0362765 A1* 11/2023 Zheng ................. H04W 76/28
2023/0397035 A1* 12/2023 Feltrin .............. H04W 28/0231

OTHER PUBLICATIONS

3GPP TR 23.733 v15.0.0 (Sep. 2017) (Year: 2017).*
3GPP TS 36.300 V16.0.0 (Dec. 2019) (Year: 2019).*
European Search Report in corresponding EP Application No. 21204112.3, dated Mar. 21, 2022.
"3rd Generation Partnership Project; Technical Specification Group Services and System Aspects; Study on Architecture Enhancements to ProSe UE-to-Nework Relay (Release 15)", 3GPP Standard; Technical Report; 3GPP TR 23.733, 3rd Generation Partnership Project (3GPP), Mobile Competence Centre; 650, Route Des Lucioles; F-06921, Sophia-Antipolis Cedex; France, vol. SA WG2, No. V15.0.0, Sep. 18, 2017, pp. -181, XP051336980.

(Continued)

*Primary Examiner* — Ricky Q Ngo
*Assistant Examiner* — Stephen N Steiner
(74) *Attorney, Agent, or Firm* — Cooper Legal Group LLC

(57) ABSTRACT

A method and device are disclosed for a remote User Equipment (UE) to support UE-to-Network relay communication. In one embodiment, the method includes the remote UE connecting with a relay UE. The method also includes the remote UE connecting with a first network node via the relay UE. The method further includes the remote UE receiving a first Radio Resource Control (RRC) message from the first network node via the relay UE, wherein the first RRC message includes a Cell Radio Network Temporary Identifier (C-RNTI) of the remote UE used for constructing authentication information.

14 Claims, 29 Drawing Sheets

(56) References Cited

OTHER PUBLICATIONS

"3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 16)", 3GPP Standard; Technical Specification; 3GPP TS 36.300, 3rd Generation Partnership Project (3GPP) Mobile Competence Center; 650, Route Des Lucioles; F-06921, Sophia-Antipolis Cedex; France, vol. RAN WG2, No. v16.1.1, Jan. 8, 2020, pp. 1-366, XP051860576.
5G; Security architecture and procedures for 5G System (3GPP TS 33.501 version 16.3.0 Release 16), ETSI Technical Specification, European Telecommunications Standards Institute (ETSI), 650, Route Des Lucioles, F-06921, Sophia-Antipolis; France, vol. 3GPP SA, No. V16.3.0, Aug. 10, 2020, pp. 1-251, XP014380028.

\* cited by examiner

| Profile ID | UE specific reference | NG-RAN node address index (e.g., gNB ID, eNB ID) | RAT-specific information | PLMN-specific information | Comment |
|---|---|---|---|---|---|
| 1 | 20 bits (~1 million values) | 20 bits (~1 million values) | N/A | N/A | NG-RAN node address index may be very well represented by the LSBs of the gNB ID. This profile may be applicable for any NG-RAN RAT. |
| 2 | 20 bits (~1 million values) | 16 bits (65.000 nodes) | N/A | 4 bits (Max 16 PLMNs) | Max number of PLMN IDs broadcast in NR is 12. This profile may be applicable for any NG-RAN RAT. |
| 3 | 24 bits (16 million values) | 16 bits (65.000 nodes) | N/A | N/A | Reduced node address to maximise addressable UE contexts. This profile may be applicable for any NG-RAN RAT. |

FIG. 11 (PRIOR ART)

| Relay | PLMN in Discovery message | PLMN list in System Information |
|---|---|---|
| Relay-1 | PLMN 1 | PLMN 1, 2, 3, 4 |
| Relay-2 | PLMN 6 | PLMN 5, 6, 7, 8 |
| Relay-3 | PLMN 5 | PLMN 3, 4, 5, 6 |

FIG. 20 (PRIOR ART)

METHOD AND APPARATUS FOR ACQUIRING SYSTEM INFORMATION AND PAGING VIA UE-TO-NETWORK RELAY IN A WIRELESS COMMUNICATION SYSTEM

CROSS-REFERENCE TO RELATED APPLICATIONS

The present Application claims the benefit of U.S. Provisional Patent Application Ser. No. 63/117,090 filed on Nov. 23, 2020, the entire disclosure of which is incorporated herein in its entirety by reference.

FIELD

This disclosure generally relates to wireless communication networks, and more particularly, to a method and apparatus for acquiring system information and paging via UE-to-network relay in a wireless communication system.

BACKGROUND

With the rapid rise in demand for communication of large amounts of data to and from mobile communication devices, traditional mobile voice communication networks are evolving into networks that communicate with Internet Protocol (IP) data packets. Such IP data packet communication can provide users of mobile communication devices with voice over IP, multimedia, multicast and on-demand communication services.

An exemplary network structure is an Evolved Universal Terrestrial Radio Access Network (E-UTRAN). The E-UTRAN system can provide high data throughput in order to realize the above-noted voice over IP and multimedia services. A new radio technology for the next generation (e.g., 5G) is currently being discussed by the 3GPP standards organization. Accordingly, changes to the current body of 3GPP standard are currently being submitted and considered to evolve and finalize the 3GPP standard.

SUMMARY

A method and device are disclosed for a remote User Equipment (UE) to support UE-to-Network relay communication. In one embodiment, the method includes the remote UE connecting with a relay UE. The method also includes the remote UE connecting with a first network node via the relay UE. The method further includes the remote UE receiving a first Radio Resource Control (RRC) message from the first network node via the relay UE, wherein the first RRC message includes a Cell Radio Network Temporary Identifier (C-RNTI) of the remote UE used for constructing authentication information.

BRIEF DESCRIPTION OF THE DRAWINGS

FIG. 11 is a reproduction of Table C-1 of 3GPP TS 38.300 V16.1.0.

FIG. 20 is a reproduction of Table 6.41.1-1 of 3GPP TR 23.752 V0.5.1.

DETAILED DESCRIPTION

The exemplary wireless communication systems and devices described below employ a wireless communication system, supporting a broadcast service. Wireless communication systems are widely deployed to provide various types of communication such as voice, data, and so on. These systems may be based on code division multiple access (CDMA), time division multiple access (TDMA), orthogonal frequency division multiple access (OFDMA), 3GPP LTE (Long Term Evolution) wireless access, 3GPP LTE-A or LTE-Advanced (Long Term Evolution Advanced), 3GPP2 UMB (Ultra Mobile Broadband), WiMax, 3GPP NR (New Radio), or some other modulation techniques.

In particular, the exemplary wireless communication systems and devices described below may be designed to support one or more standards such as the standard offered by a consortium named "3rd Generation Partnership Project" referred to herein as 3GPP, including: TS 38.331 V16.2.0, "NR; Radio Resource Control (RRC) protocol specification (Release 16)"; TS 38.300 V16.1.0, "NR; NR and NG-RAN Overall Description; Stage 2 (Release 16)"; TR 23.752 V0.5.1, "Study on system enhancement for Proximity based Services (ProSe) in the 5G System (5GS) (Release 17)"; R2-2008922, "On-demand SI Delivery for Remote UE", CATT; 3GPP RAN2 #112e Chairman's notes; TS 23.502 V16.4.0, "Procedures for the 5G System; Stage 2 (Release 16)"; and TR 38.836 V0.1.1, "Study on NR sidelink relay; (Release 17)"; TS 23.287 V16.4.0, "Architecture enhancements for 5G System (5GS) to support Vehicle-to-Everything (V2X) services (Release 16)". The standards and documents listed above are hereby expressly incorporated by reference in their entirety.

Figure 1:
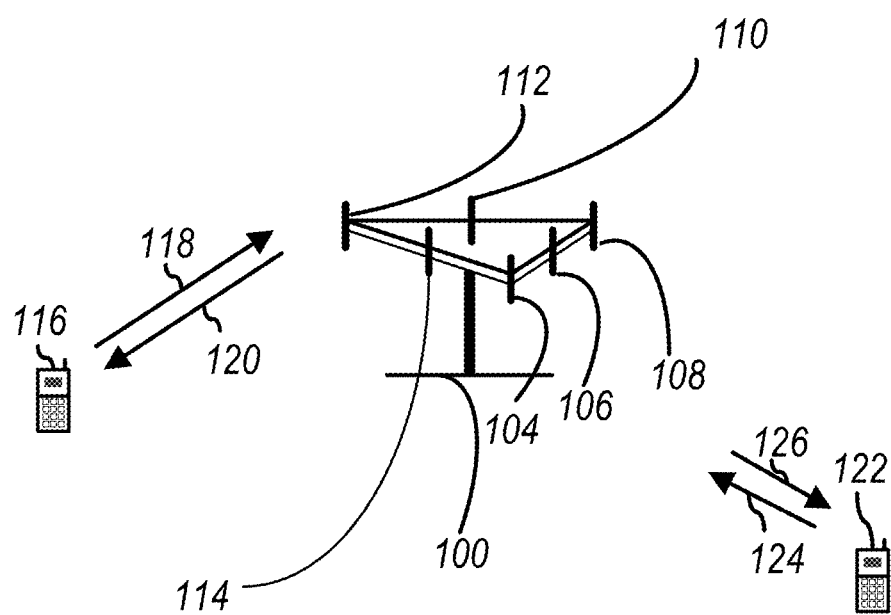
FIG. 1 shows a diagram of a wireless communication system according to one exemplary embodiment.

FIG. 1 shows a multiple access wireless communication system according to one embodiment of the invention. An access network 100 (AN) includes multiple antenna groups, one including 104 and 106, another including 108 and 110, and an additional including 112 and 114. In FIG. 1, only two antennas are shown for each antenna group, however, more or fewer antennas may be utilized for each antenna group. Access terminal 116 (AT) is in communication with antennas 112 and 114, where antennas 112 and 114 transmit information to access terminal 116 over forward link 120 and receive information from access terminal 116 over reverse link 118. Access terminal (AT) 122 is in communication with antennas 106 and 108, where antennas 106 and 108 transmit information to access terminal (AT) 122 over forward link 126 and receive information from access terminal (AT) 122 over reverse link 124. In a FDD system, communication links 118, 120, 124 and 126 may use different frequency for communication. For example, forward link 120 may use a different frequency then that used by reverse link 118.

Each group of antennas and/or the area in which they are designed to communicate is often referred to as a sector of the access network. In the embodiment, antenna groups each are designed to communicate to access terminals in a sector of the areas covered by access network 100.

In communication over forward links 120 and 126, the transmitting antennas of access network 100 may utilize beamforming in order to improve the signal-to-noise ratio of forward links for the different access terminals 116 and 122. Also, an access network using beamforming to transmit to access terminals scattered randomly through its coverage causes less interference to access terminals in neighboring cells than an access network transmitting through a single antenna to all its access terminals.

An access network (AN) may be a fixed station or base station used for communicating with the terminals and may also be referred to as an access point, a Node B, a base station, an enhanced base station, an evolved Node B (eNB), a network node, a network, or some other terminology. An access terminal (AT) may also be called user equipment (UE), a wireless communication device, terminal, access terminal or some other terminology.

Figure 2:
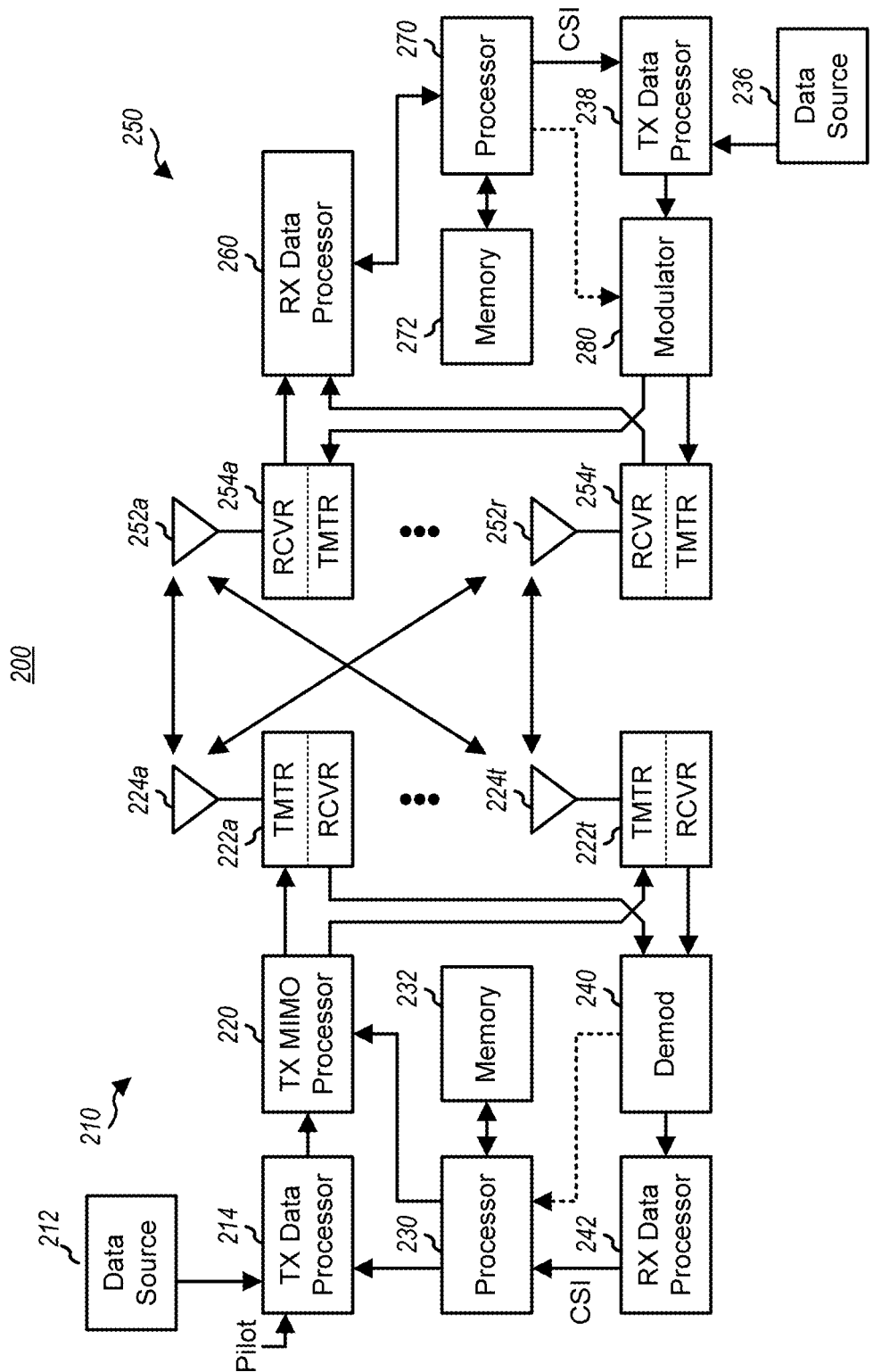
FIG. 2 is a block diagram of a transmitter system (also known as access network) and a receiver system (also known as user equipment or UE) according to one exemplary embodiment.

FIG. 2 is a simplified block diagram of an embodiment of a transmitter system 210 (also known as the access network) and a receiver system 250 (also known as access terminal (AT) or user equipment (UE)) in a MIMO system 200. At the transmitter system 210, traffic data for a number of data streams is provided from a data source 212 to a transmit (TX) data processor 214.

In one embodiment, each data stream is transmitted over a respective transmit antenna. TX data processor 214 formats, codes, and interleaves the traffic data for each data stream based on a particular coding scheme selected for that data stream to provide coded data.

The coded data for each data stream may be multiplexed with pilot data using OFDM techniques. The pilot data is typically a known data pattern that is processed in a known manner and may be used at the receiver system to estimate the channel response. The multiplexed pilot and coded data for each data stream is then modulated (i.e., symbol mapped) based on a particular modulation scheme (e.g., BPSK, QPSK, M-PSK, or M-QAM) selected for that data stream to provide modulation symbols. The data rate, coding, and modulation for each data stream may be determined by instructions performed by processor 230.

The modulation symbols for all data streams are then provided to a TX MIMO processor 220, which may further process the modulation symbols (e.g., for OFDM). TX MIMO processor 220 then provides $N_T$ modulation symbol streams to $N_T$ transmitters (TMTR) 222a through 222t. In certain embodiments, TX MIMO processor 220 applies beamforming weights to the symbols of the data streams and to the antenna from which the symbol is being transmitted.

Each transmitter 222 receives and processes a respective symbol stream to provide one or more analog signals, and further conditions (e.g., amplifies, filters, and upconverts) the analog signals to provide a modulated signal suitable for transmission over the MIMO channel. $N_T$ modulated signals from transmitters 222a through 222t are then transmitted from $N_T$ antennas 224a through 224t, respectively.

At receiver system 250, the transmitted modulated signals are received by $N_R$ antennas 252a through 252r and the received signal from each antenna 252 is provided to a respective receiver (RCVR) 254a through 254r. Each receiver 254 conditions (e.g., filters, amplifies, and downconverts) a respective received signal, digitizes the conditioned signal to provide samples, and further processes the samples to provide a corresponding "received" symbol stream.

An RX data processor 260 then receives and processes the $N_R$ received symbol streams from $N_R$ receivers 254 based on a particular receiver processing technique to provide $N_T$ "detected" symbol streams. The RX data processor 260 then demodulates, deinterleaves, and decodes each detected symbol stream to recover the traffic data for the data stream. The processing by RX data processor 260 is complementary to that performed by TX MIMO processor 220 and TX data processor 214 at transmitter system 210.

A processor 270 periodically determines which pre-coding matrix to use (discussed below). Processor 270 formulates a reverse link message comprising a matrix index portion and a rank value portion.

The reverse link message may comprise various types of information regarding the communication link and/or the received data stream. The reverse link message is then processed by a TX data processor 238, which also receives traffic data for a number of data streams from a data source 236, modulated by a modulator 280, conditioned by transmitters 254a through 254r, and transmitted back to transmitter system 210.

At transmitter system 210, the modulated signals from receiver system 250 are received by antennas 224, conditioned by receivers 222, demodulated by a demodulator 240, and processed by a RX data processor 242 to extract the reserve link message transmitted by the receiver system 250. Processor 230 then determines which pre-coding matrix to use for determining the beamforming weights then processes the extracted message.

Figure 3:
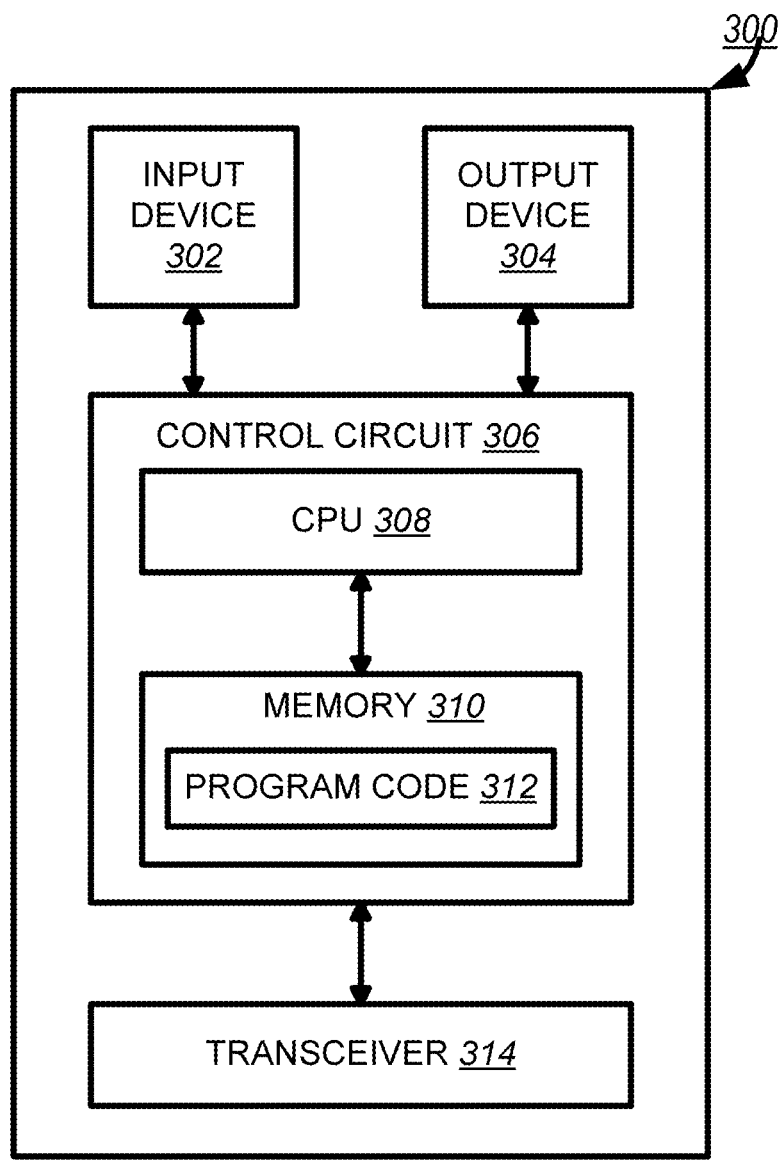
FIG. 3 is a functional block diagram of a communication system according to one exemplary embodiment.

Turning to FIG. 3, this figure shows an alternative simplified functional block diagram of a communication device according to one embodiment of the invention. As shown in FIG. 3, the communication device 300 in a wireless communication system can be utilized for realizing the UEs (or ATs) 116 and 122 in FIG. 1 or the base station (or AN) 100 in FIG. 1, and the wireless communications system is preferably the NR system. The communication device 300 may include an input device 302, an output device 304, a control circuit 306, a central processing unit (CPU) 308, a memory 310, a program code 312, and a transceiver 314. The control circuit 306 executes the program code 312 in the memory 310 through the CPU 308, thereby controlling an operation of the communications device 300. The communications device 300 can receive signals input by a user through the input device 302, such as a keyboard or keypad, and can output images and sounds through the output device 304, such as a monitor or speakers. The transceiver 314 is used to receive and transmit wireless signals, delivering received signals to the control circuit 306, and outputting signals generated by the control circuit 306 wirelessly. The communication device 300 in a wireless communication system can also be utilized for realizing the AN 100 in FIG. 1.

Figure 4:
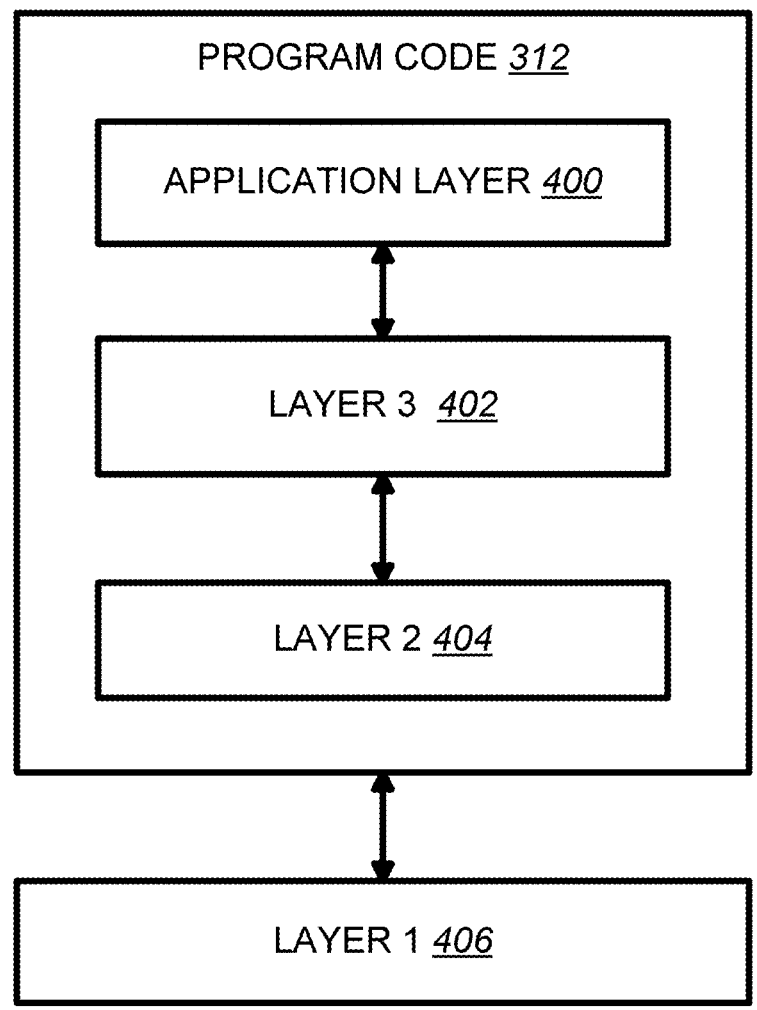
FIG. 4 is a functional block diagram of the program code of FIG. 3 according to one exemplary embodiment.

FIG. 4 is a simplified block diagram of the program code 312 shown in FIG. 3 in accordance with one embodiment of the invention. In this embodiment, the program code 312 includes an application layer 400, a Layer 3 portion 402, and a Layer 2 portion 404, and is coupled to a Layer 1 portion 406. The Layer 3 portion 402 generally performs radio resource control. The Layer 2 portion 404 generally performs link control. The Layer 1 portion 406 generally performs physical connections.

3GPP TS 38.331 introduces the following:
5.2 System Information
5.2.1 Introduction
System Information (SI) is divided into the MIB and a number of SIBs and posSIBs where:
  the MIB is always transmitted on the BCH with a periodicity of 80 ms and repetitions made within 80 ms (TS 38.212 [17], clause 7.1) and it includes parameters that are needed to acquire SIB1 from the cell. The first transmission of the MIB is scheduled in subframes as defined in TS 38.213 [13], clause 4.1 and repetitions are scheduled according to the period of SSB;
  the SIB1 is transmitted on the DL-SCH with a periodicity of 160 ms and variable transmission repetition periodicity within 160 ms as specified in TS 38.213 [13], clause 13. The default transmission repetition periodicity of SIB1 is 20 ms but the actual transmission repetition periodicity is up to network implementation. For SSB and CORESET multiplexing pattern 1, SIB1 repetition transmission period is 20 ms. For SSB and CORESET multiplexing pattern 2/3, SIB1 transmission repetition period is the same as the SSB period (TS 38.213 [13], clause 13). SIB1 includes information regarding the availability and scheduling (e.g. mapping of SIBs to SI message, periodicity, SI-window size) of other SIBs with an indication whether one or more SIBs are only provided on-demand and, in that case, the configuration needed by the UE to perform the SI request. SIB1 is cell-specific SIB;
  SIBs other than SIB1 and posSIBs are carried in System-Information (SI) messages, which are transmitted on the DL-SCH. Only SIBs or posSIBs having the same periodicity can be mapped to the same SI message. SIBs and posSIBs are mapped to the different SI messages. Each SI message is transmitted within periodically occurring time domain windows (referred to as SI-windows with same length for all SI messages). Each SI message is associated with an SI-window and the SI-windows of different SI messages do not overlap. That is, within one SI-window only the corresponding SI message is transmitted. An SI message may be transmitted a number of times within the SI-window. Any SIB or posSIB except SIB1 can be configured to be cell specific or area specific, using an indication in SIB1. The cell specific SIB is applicable only within a cell that provides the SIB while the area specific SIB is applicable within an area referred to as SI area, which consists of one or several cells and is identified by systemInformationAreaID;
  The mapping of SIBs to SI messages is configured in schedulingInfoList, while the mapping of posSIBs to SI messages is configured in pos-SchedulingInfoList;
  For a UE in RRC_CONNECTED, the network can provide system information through dedicated signalling using the RRCReconfiguration message, e.g. if the UE has an active BWP with no common search space configured to monitor system information, paging, or upon request from the UE.
  For PSCell and SCells, the network provides the required SI by dedicated signalling, i.e. within an RRCReconfiguration message. Nevertheless, the UE shall acquire MIB of the PSCell to get SFN timing of the SCG (which may be different from MCG). Upon change of relevant SI for SCell, the network releases and adds the concerned SCell. For PSCell, the required SI can only be changed with Reconfiguration with Sync.
  NOTE: The physical layer imposes a limit to the maximum size a SIB can take. The maximum SIB1 or SI message size is 2976 bits.
5.2.2 System Information Acquisition
5.2.2.1 General UE Requirements
[FIG. 5.2.2.1-1 of 3GPP TS 38.331 V16.2.0, Entitled "System Information Acquisition", is Reproduced as FIG. 5]

The UE applies the SI acquisition procedure to acquire the AS, NAS- and positioning assistance data information. The procedure applies to UEs in RRC_IDLE, in RRC_INACTIVE and in RRC_CONNECTED.

The UE in RRC_IDLE and RRC_INACTIVE shall ensure having a valid version of (at least) the MIB, SIB1 through SIB4, SIB5 (if the UE supports E-UTRA), SIB11 (if the UE is configured for idle/inactive measurements), SIB12 (if UE is capable of NR sidelink communication and is configured by upper layers to receive or transmit NR sidelink communication), and SIB13, SIB14 (if UE is capable of V2X sidelink communication and is configured by upper layers to receive or transmit V2X sidelink communication).
[ . . . ]

Figure 5:
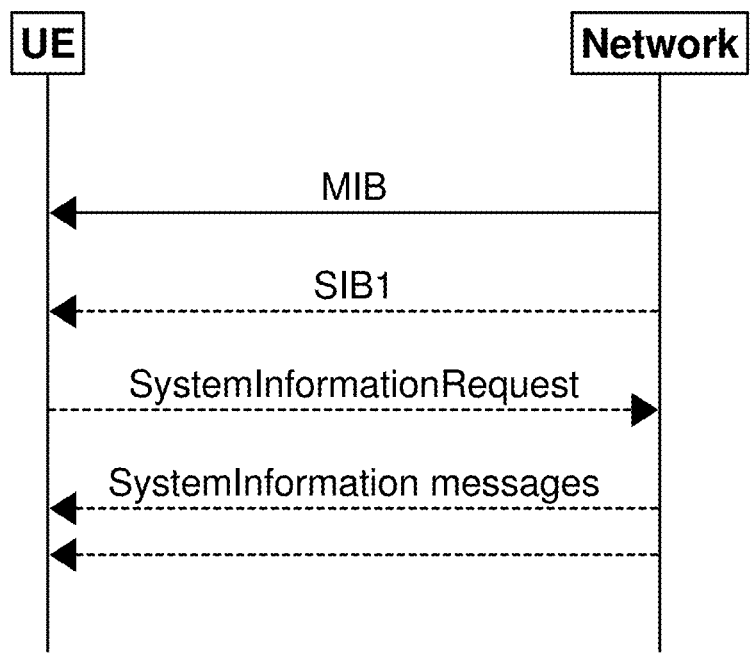
FIG. 5 is a reproduction of FIG. 5.2.2.1-1 of 3GPP TS 38.331 V16.2.0.
Figure 6:
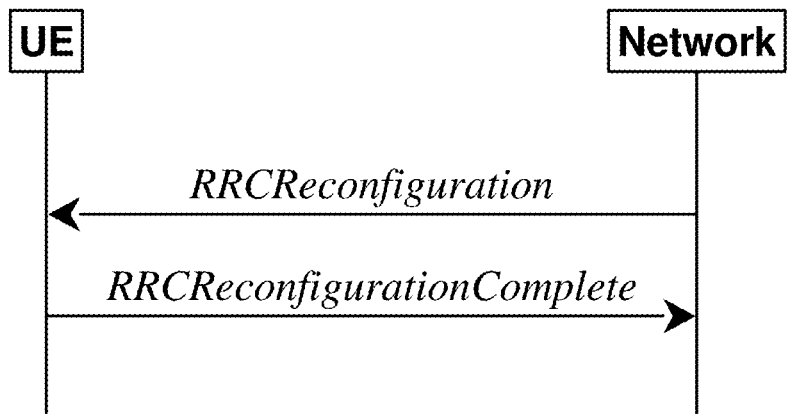
FIG. 6 is a reproduction of FIG. 5.3.5.1-1 of 3GPP TS 38.331 V16.2.0.

5.3.5 RRC Reconfiguration
5.3.5.1 General
[FIG. 5.3.5.1-1 of 3GPP TS 38.331 V16.2.0, Entitled "RRC Reconfiguration, Successful", is Reproduced as FIG. 6]
[ . . . ]
5.3.5.3 Reception of an RRCReconfiguration by the UE
The UE shall perform the following actions upon reception of the RRCReconfiguration, or upon execution of the conditional reconfiguration (CHO or CPC):
[ . . . ]
1> if the RRCReconfiguration message includes the dedicatedSystemInformationDelivery:
2> perform the action upon reception of System Information as specified in 5.2.2.4;
[ . . . ]

Figure 7:
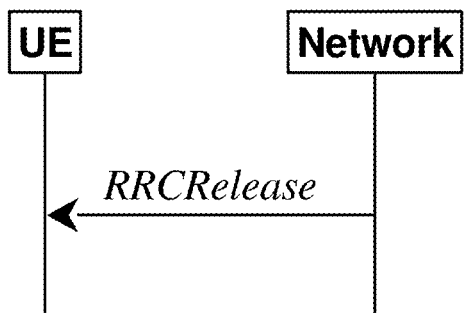
FIG. 7 is a reproduction of FIG. 5.3.8.1-1 of 3GPP TS 38.331 V16.2.0.

5.3.8 RRC Connection Release
5.3.8.1 General
[FIG. 5.3.8.1-1 of 3GPP TS 38.331 V16.2.0, Entitled "RRC Connection Release, Successful", is Reproduced as FIG. 7]
The purpose of this procedure is:
to release the RRC connection, which includes the release of the established radio bearers as well as all radio resources; or
to suspend the RRC connection only if SRB2 and at least one DRB or, for IAB, SRB2, are setup, which includes the suspension of the established radio bearers.

5.3.8.2 Initiation
The network initiates the RRC connection release procedure to transit a UE in RRC_CONNECTED to RRC_IDLE; or to transit a UE in RRC_CONNECTED to RRC_INACTIVE only if SRB2 and at least one DRB or, for IAB, SRB2, is setup in RRC_CONNECTED; or to transit a UE in RRC_INACTIVE back to RRC_INACTIVE when the UE tries to resume; or to transit a UE in RRC_INACTIVE to RRC_IDLE when the UE tries to resume. The procedure can also be used to release and redirect a UE to another frequency.

5.3.8.3 Reception of the RRCRelease by the UE
The UE shall:
1> delay the following actions defined in this sub-clause 60 ms from the moment the RRCRelease message was received or optionally when lower layers indicate that the receipt of the RRCRelease message has been successfully acknowledged, whichever is earlier;
1> stop timer T380, if running;
1> stop timer T320, if running;
1> if timer T316 is running;
2> stop timer T316;
2> clear the information included in VarRLF-Report, if any;
1> stop timer T350, if running;
1> if the AS security is not activated:
2> ignore any field included in RRCRelease message except waitTime;
2> perform the actions upon going to RRC_IDLE as specified in 5.3.11 with the release cause 'other' upon which the procedure ends;
[ . . . ]
1> if the RRCRelease includes suspendConfig:
2> apply the received suspendConfig;
2> remove all the entries within VarConditionalReconfig, if any;
2> for each measId, if the associated reportConfig has a reportType set to condTriggerConfig:
3> for the associated reportConfigId:
4> remove the entry with the matching reportConfigId from the reportConfigList within the VarMeasConfig;
3> if the associated measObjectId is only associated to a reportConfig with reportType set to condTriggerConfig:
4> remove the entry with the matching measObjectId from the measObjectList within the VarMeasConfig;
3> remove the entry with the matching measId from the measIdList within the VarMeasConfig;
2> reset MAC and release the default MAC Cell Group configuration, if any;
2> re-establish RLC entities for SRB1;
2> if the RRCRelease message with suspendConfig was received in response to an RRCResumeRequest or an RRCResumeRequest1:
3> stop the timer T319 if running;
3> in the stored UE Inactive AS context:
4> replace the $K_{gNB}$ and $K_{RRCint}$ keys with the current $K_{gNB}$ and $K_{RRCint}$ keys;
4> replace the C-RNTI with the temporary C-RNTI in the cell the UE has received the RRCRelease message;
4> replace the cellIdentity with the cellIdentity of the cell the UE has received the RRCRelease message;
4> replace the physical cell identity with the physical cell identity of the cell the UE has received the RRCRelease message;
2> else:
3> store in the UE Inactive AS Context the current $K_{gNB}$ and $K_{RRCint}$ keys, the ROHC state, the stored QoS flow to DRB mapping rules, the C-RNTI used in the source PCell, the cellIdentity and the physical cell identity of the source PCell, the spCellConfigCommon within ReconfigurationWithSync of the NR PSCell (if configured) and all other parameters configured except for:
parameters within ReconfigurationWithSync of the PCell;
parameters within ReconfigurationWithSync of the NR PSCell, if configured;
parameters within MobilityControlInfoSCG of the E-UTRA PSCell, if configured;
servingCellConfigCommonSIB;
NOTE 2: NR sidelink communication related configurations and logged measurement configuration are not stored as UE Inactive AS Context, when UE enters RRC_INACTIVE.
2> suspend all SRB(s) and DRB(s), except SRB0;
2> indicate PDCP suspend to lower layers of all DRBs;
2> if the t380 is included:
3> start timer T380, with the timer value set to t380;
2> if the RRCRelease message is including the waitTime:
3> start timer T302 with the value set to the waitTime;
3> inform upper layers that access barring is applicable for all access categories except categories '0' and '2';
2> if T390 is running:
3> stop timer T390 for all access categories;
3> perform the actions as specified in 5.3.14.4;

2> indicate the suspension of the RRC connection to upper layers;
2> enter RRC_INACTIVE and perform cell selection as specified in TS 38.304 [20];
[ . . . ]

Figure 8:
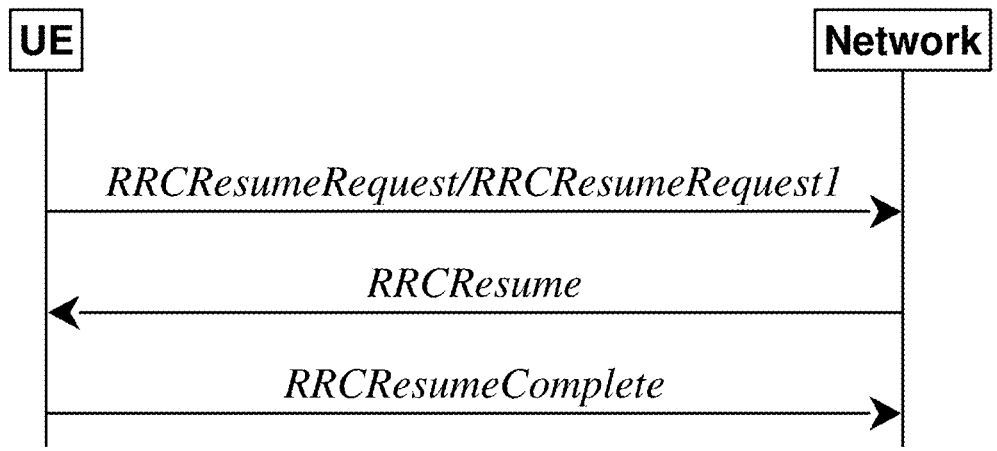
FIG. 8 is a reproduction of FIG. 5.3.13.1-1 of 3GPP TS 38.331 V16.2.0.
Figure 9:
FIG. 9 is a reproduction of FIG. 5.3.13.1-4 of 3GPP TS 38.331 V16.2.0.

5.3.13 RRC Connection Resume
5.3.13.1 General
[FIG. 5.3.13.1-1 of 3GPP TS 38.331 V16.2.0, Entitled "RRC Connection Resume, Successful", is Reproduced as FIG. 8]
[ . . . ]
[FIG. 5.3.13.1-4 of 3GPP TS 38.331 V16.2.0, Entitled "RRC Connection Resume Followed by Network Suspend, Successful", is Reproduced as FIG. 9]
[ . . . ]
The purpose of this procedure is to resume a suspended RRC connection, including resuming SRB(s) and DRB(s) or perform an RNA update.
5.3.13.1a Conditions for Resuming RRC Connection for Sidelink Communication
For NR sidelink communication an RRC connection is resumed only in the following cases:
　1> if configured by upper layers to transmit NR sidelink communication and related data is available for transmission:
　　2> if the frequency on which the UE is configured to transmit NR sidelink communication is included in sl-FreqInfoList within SIB12 provided by the cell on which the UE camps; and if the valid version of SIB12 does not include sl-TxPoolSelectedNormal for the concerned frequency;
For V2X sidelink communication an RRC connection resume is initiated only when the conditions specified for V2X sidelink communication in subclause 5.3.3.1a of TS 36.331 are met.
　NOTE: Upper layers initiate an RRC connection resume. The interaction with NAS is left to UE implementation.
5.3.13.2 Initiation
The UE initiates the procedure when upper layers or AS (when responding to RAN paging, upon triggering RNA updates while the UE is in RRC_INACTIVE, or for sidelink communication as specified in sub-clause 5.3.13.1a) requests the resume of a suspended RRC connection. The UE shall ensure having valid and up to date essential system information as specified in clause 5.2.2.2 before initiating this procedure.
Upon initiation of the procedure, the UE shall:
　1> if the resumption of the RRC connection is triggered by response to NG-RAN paging:
　　2> select '0' as the Access Category;
　　2> perform the unified access control procedure as specified in 5.3.14 using the selected Access Category and one or more Access Identities provided by upper layers;
　　　3> if the access attempt is barred, the procedure ends;
　1> else if the resumption of the RRC connection is triggered by upper layers:
　　2> if the upper layers provide an Access Category and one or more Access Identities:
　　　3> perform the unified access control procedure as specified in 5.3.14 using the Access Category and Access Identities provided by upper layers;
　　　　4> if the access attempt is barred, the procedure ends;
　　2> set the resumeCause in accordance with the information received from upper layers;
　1> else if the resumption of the RRC connection is triggered due to an RNA update as specified in 5.3.13.8:
　　2> if an emergency service is ongoing:
　NOTE: How the RRC layer in the UE is aware of an ongoing emergency service is up to UE implementation.
　　　3> select '2' as the Access Category;
　　　3> set the resumeCause to emergency;
　　2> else:
　　　3> select '8' as the Access Category;
　　2> perform the unified access control procedure as specified in 5.3.14 using the selected Access Category and one or more Access Identities to be applied as specified in TS 24.501 [23];
　　　3> if the access attempt is barred:
　　　　4> set the variable pendingRNA-Update to true;
　　　　4> the procedure ends;
　1> if the UE is in NE-DC or NR-DC:
　　2> if the UE does not support maintaining SCG configuration upon connection resumption:
　　　3> release the MR-DC related configurations (i.e., as specified in 5.3.5.10) from the UE Inactive AS context, if stored;
　1> if the UE does not support maintaining the MCG SCell configurations upon connection resumption:
　　2> release the MCG SCell(s) from the UE Inactive AS context, if stored;
　1> apply the default L1 parameter values as specified in corresponding physical layer specifications, except for the parameters for which values are provided in SIB1;
　1> apply the default SRB1 configuration as specified in 9.2.1;
　1> apply the default MAC Cell Group configuration as specified in 9.2.2;
　1> release delayBudgetReportingConfig from the UE Inactive AS context, if stored;
　1> stop timer T342, if running;
　1> release overheatingAssistanceConfig from the UE Inactive AS context, if stored;
　1> stop timer T345, if running;
　1> release idc-AssistanceConfig from the UE Inactive AS context, if stored;
　1> release drx-PreferenceConfig for all configured cell groups from the UE Inactive AS context, if stored;
　1> stop all instances of timer T346a, if running;
　1> release maxBW-PreferenceConfig for all configured cell groups from the UE Inactive AS context, if stored;
　1> stop all instances of timer T346b, if running;
　1> release maxCC-PreferenceConfig for all configured cell groups from the UE Inactive AS context, if stored;
　1> stop all instances of timer T346c, if running;
　1> release maxMIMO-LayerPreferenceConfig for all configured cell groups from the UE Inactive AS context, if stored;
　1> stop all instances of timer T346d, if running;
　1> release minSchedulingOffsetPreferenceConfig for all configured cell groups from the UE Inactive AS context, if stored;
　1> stop all instances of timer T346e, if running;
　1> release releasePreferenceConfig from the UE Inactive AS context, if stored;
　1> stop timer T346f, if running;
　1> apply the CCCH configuration as specified in 9.1.1.2;
　1> apply the timeAlignmentTimerCommon included in SIB1;
　1> start timer T319;
　1> set the variable pendingRNA-Update to false;

1> initiate transmission of the RRCResumeRequest message or RRCResumeRequest1 in accordance with 5.3.13.3.

5.3.13.3 Actions Related to Transmission of RRCResumeRequest or RRCResumeRequest1 Message The UE shall set the contents of RRCResumeRequest or RRCResumeRequest1 message as follows:

1> if field useFullResumeID is signalled in SIB1:
2> select RRCResumeRequest1 as the message to use;
2> set the resumeIdentity to the stored fulll-RNTI value;
1> else:
2> select RRCResumeRequest as the message to use;
2> set the resumeIdentity to the stored shortI-RNTI value;
1> restore the RRC configuration, RoHC state, the stored QoS flow to DRB mapping rules and the $K_{gNB}$ and $K_{RRCint}$ keys from the stored UE Inactive AS context except for the following:
masterCellGroup;
mrdc-SecondaryCellGroup, if stored; and
pdcp-Config;
1> set the resumeMAC-I to the 16 least significant bits of the MAC-I calculated:
2> over the ASN.1 encoded as per clause 8 (i.e., a multiple of 8 bits) VarResumeMAC-Input;
2> with the $K_{RRCint}$ key in the UE Inactive AS Context and the previously configured integrity protection algorithm; and
2> with all input bits for COUNT, BEARER and DIRECTION set to binary ones;
1> derive the $K_{gNB}$ key based on the current $K_{gNB}$ key or the NH, using the stored nextHopChainingCount value, as specified in TS 33.501 [11];
1> derive the $K_{RRCenc}$ key, the $K_{RRCint}$ key, the $K_{UPint}$ key and the KuPenc key;
1> configure lower layers to apply integrity protection for all radio bearers except SRB0 using the configured algorithm and the $K_{RRCint}$ key and $K_{UPint}$ key derived in this subclause immediately, i.e., integrity protection shall be applied to all subsequent messages received and sent by the UE;
NOTE 1: Only DRBs with previously configured UP integrity protection shall resume integrity protection.
1> configure lower layers to apply ciphering for all radio bearers except SRB0 and to apply the configured ciphering algorithm, the $K_{RRCenc}$ key and the $K_{UPenc}$ key derived in this subclause, i.e. the ciphering configuration shall be applied to all subsequent messages received and sent by the UE;
1> re-establish PDCP entities for SRB1;
1> resume SRB1;
1> submit the selected message RRCResumeRequest or RRCResumeRequest1 for transmission to lower layers.
NOTE 2: Only DRBs with previously configured UP ciphering shall resume ciphering.

If lower layers indicate an integrity check failure while T319 is running, perform actions specified in 5.3.13.5.

The UE shall continue cell re-selection related measurements as well as cell re-selection evaluation. If the conditions for cell re-selection are fulfilled, the UE shall perform cell re-selection as specified in 5.3.13.6.

[ . . . ]

5.3.13.8 RNA Update
In RRC_INACTIVE state, the UE shall:
1> if T380 expires; or
1> if RNA Update is triggered at reception of SIB1, as specified in 5.2.2.4.2:
2> initiate RRC connection resume procedure in 5.3.13.2 with resumeCause set to rna-Update;
1> if barring is alleviated for Access Category '8' or Access Category '2', as specified in 5.3.14.4:
2> if upper layers do not request RRC the resumption of an RRC connection, and
2> if the variable pendingRNA-Update is set to true:
3> initiate RRC connection resume procedure in 5.3.13.2 with resumeCause value set to rna-Update.

If the UE in RRC_INACTIVE state fails to find a suitable cell and camps on the acceptable cell to obtain limited service as defined in TS 38.304 [20], the UE shall:
1> perform the actions upon going to RRC_IDLE as specified in 5.3.11 with release cause 'other'.
NOTE: It is left to UE implementation how to behave when T380 expires while the UE is camped neither on a suitable nor on an acceptable cell.

5.3.13.9 Reception of the RRCRelease by the UE
The UE shall:
1> perform the actions as specified in 5.3.8.

[ . . . ]

6.2.1 General Message Structure
UL-CCCH-Message
The UL-CCCH-Message class is the set of 48-bits RRC messages that may be sent from the UE to the Network on the uplink CCCH logical channel.

```
-- ASN1START
-- TAG-UL-CCCH-MESSAGE-START
UL-CCCH-Message ::=            SEQUENCE {
   message                     UL-CCCH-MessageType
}
UL-CCCH-MessageType ::=        CHOICE {
   c1                CHOICE {
      ...
      rrcSystemInfoRequest     RRCSystemInfoRequest
   },
   messageClassExtension       SEQUENCE { }
}
-- TAG-UL-CCCH-MESSAGE-STOP
-- ASN1STOP
[. . .]
```

[ . . . ]
UL-DCCH-Message
The UL-DCCH-Message class is the set of RRC messages that may be sent from the UE to the network on the uplink DCCH logical channel.

```
-- ASN1START
-- TAG-UL-DCCH-MESSAGE-START
UL-DCCH-Message ::=            SEQUENCE {
   message                     UL-DCCH-MessageType
}
   UL-DCCH-MessageType ::=     CHOICE {
      c1             CHOICE {
         ...
      };
      messageClassExtension    CHOICE {
         c2              CHOICE {
            ...
            dedicatedSIBRequest-r16   DedicatedSIBRequest-r16,
            ...
         },
```

```
            messageClassExtensionFuture-r16    SEQUENCE { }
        }
    }
-- TAG-UL-DCCH-MESSAGE-STOP
-- ASN1STOP
[...]
```

[ . . . ]
BCCH-BCH-Message
The BCCH-BCH-Message class is the set of RRC messages that may be sent from the network to the UE via BCH on the BCCH logical channel.

```
-- ASN1START
-- TAG-BCCH-BCH-MESSAGE-START
BCCH-BCH-Message ::=           SEQUENCE {
    message                    BCCH-BCH-MessageType
}
BCCH-BCH-MessageType ::=       CHOICE {
    mib                        MIB,
    messageClassExtension      SEQUENCE { }
}
-- TAG-BCCH-BCH-MESSAGE-STOP
-- ASN1STOP
```

[ . . . ]
BCCH-DL-SCH-Message
The BCCH-DL-SCH-Message class is the set of RRC messages that may be sent from the network to the UE via DL-SCH on the BCCH logical channel.

```
-- ASN1START
-- TAG-BCCM-DL-SCH-MESSAGE-START
BCCH-DL-SCH-Message ::=        SEQUENCE {
    message                    BCCH-DL-SCH-MessageType
}
BCCH-DL-SCH-MessageType ::=    CHOICE {
    c1                         CHOICE {
        systemInformation              SystemInformation,
        systemInformationBlockType1    SIB1
    },
    messageClassExtension      SEQUENCE{ }
}
-- TAG-BCCH-DL-SCH-MESSAGE-STOP
-- ASN1STOP
```

[ . . . ]
6.2.2 Message Definitions
[ . . . ]
RRCResumeRequest
The RRCResumeRequest message is used to request the resumption of a suspended RRC connection or perform an RNA update.
    Signalling radio bearer: SRB0
    RLC-SAP: TM
    Logical channel: CCCH
    Direction: UE to Network
RRCResumeRequest Message

```
-- ASN1START
-- TAG-PRCRESUMEREQUEST1-START
RRCResumeRequest1 ::=          SEQUENCE {
    rrcResumeRequest1          RRCResumeRequest1-IEs
}
RRCResumeRequest1-IEs ::=      SEQUENCE {
    resumeIdentity             ShortI-RNTI-Value,
    resumeMAC-I                BIT STRING (SIZE (16))
    resumeCause                ResumeCause,
    spare                      BIT STRING (SIZE (1))
}
-- TAG-PRCRESUMEREQUEST1-STOP
-- ASN1START
```

| RRCResumeRequest-IEs field descriptions |
|---|
| resumeCause |
| Provides the resume cause for the RRC connection resume request as provided by the upper layers or RRC. The network is not expected to reject an RRCResumeRequest due to unknown cause value being used by the UE. |
| resumeIdentity |
| UE identity to facilitate UE context retrieval at gNB. |
| resumeMAC-1 |
| Authentication token to facilitate UE authentication at gNB. The 16 least significant bits of the MAC-I calculated using the AS security configuration as specified in 5.3.13.3. |

RRCResumeRequest1
The RRCResumeRequest1 message is used to request the resumption of a suspended RRC connection or perform an RNA update.
    Signalling radio bearer: SRB0
    RLC-SAP: TM
    Logical channel: CCCH1
    Direction: UE to Network
RRCResumeRequest1 Message

```
-- ASN1START
-- TAG-PRCRESUMEREQUEST1-START
RRCResumeRequest1 ::=          SEQUENCE {
    rrcResumeRequest1          RRCResumeRequest1-IEs
}
RRCResumeRequest1-IEs ::=      SEQUENCE {
    resumeIdentity             I-RNTI-Value,
    resumeMAC-I                BIT STRING (SIZE (16))
    resumeCause                ResumeCause,
    spare                      BIT STRING (SIZE (1))
}
-- TAG-PRCRESUMEREQUEST1-STOP
-- ASN1START
```

| RRCResumeRequest1-IEs field descriptions |
|---|
| resumeCause |
| Provides the resume cause for the RRCResumeRequest1 as provided by the upper layers or RRC. A gNB is not expected to reject an RRCResumeRequest1 due to unknown cause value being used by the UE. |
| resumeIdentity |
| UE identity to facilitate UE context retrieval at gNB. |
| resumeMAC-I |
| Authentication token to facilitate UE authentication at gNB. The 16 least significant bits of the MAC-I calculated using the AS security configuration as specified in 5.3.13.3. |

[ . . . ]
RRCResume
The RRCResume message is used to resume the suspended RRC connection.
    Signalling radio bearer: SRB1
    RLC-SAP: AM
    Logical channel: DCCH
    Direction: Network to UE RRCResume Message

```
-- ASN1START
-- TAG-RRCRESUME-START
RRCResume ::=                   SEQUENCE {
    rrc-TransactionIdentifier       RRC-TransactionIdentifier,
    criticalExtensions              CHOICE {
        rrcResume                       RRCResume-IEs,
        criticalExtensionsFuture        SEQUENCE { }
    }
}
RRCResume-IEs ::=       SEQUENCE {
    radioBearerConfig       RadioBearerConfig                       OPTIONAL, -- Need M
    masterCellGroup         OCTET STRING (CONTAINING CellGroupConfig)    OPTIONAL, -- Need M
    measConfig              MeasConfig                              OPTIONAL, -- Need M
    fullConfig              ENUMERATED {true}                       OPTIONAL, -- Need N
    lateNonCriticalExtension    OCTET STRING                        OPTIONAL,
    nonCriticalExtension    RRCResume-v1560-IEs                     OPTIONAL
}
RRCResume-v1560-IEs ::=     SEQUENCE {
    radioBearerConfig2      OCTET STRING (CONTAINING RadioBearerConfig)  OPTIONAL, -- Need M
    sk-Counter              SK-Counter                              OPTIONAL, -- Need N
    nonCriticalExtension    RRCResume-v1610-IEs                     OPTIONAL
}
RRCResume-v1610-IEs ::=     SEQUENCE {
    idleModeMeasurementReq-r16      ENUMERATED {true}               OPTIONAL, -- Need N
    restoreMCG-SCells-r16           ENUMERATED {true}               OPTIONAL, -- Need N
    restoreSCG-r16                  ENUMERATED {true}               OPTIONAL, -- Need N
    mrdc-SecondaryCellGroup-r16     CHOICE {
        nr-SCG-r16              OCTET STRING (CONTAINING RRCReconfiguration),
        eutra-SCG-r16           OCTET STRING
    }                                                               OPTIONAL, -- Cond RestoreSCG
    needForGapsConfigNR-r16     SetupRelease {NeedForGapsConfigNR-r16}  OPTIONAL, --Need M
    nonCriticalExtension    SEQUENCE{ }                             OPTIONAL
}
-- TAG-PRCRESUME-STOP
-- AS1STOP
```

[ . . . ]

RRCResumeComplete

The RRCResumeComplete message is used to confirm the successful completion of an RRC connection resumption.

Signalling radio bearer: SRB1
RLC-SAP: AM
Logical channel: DCCH
Direction: UE to Network RRCResumeComplete Message

```
-- ASN1START
-- TAG-RRCRESUMECOMPLETE-START
RRCResumeComplete ::=               SEQUENCE {
    rrc-TransactionIdentifier           RRC-TransactionIdentifier,
    criticalExtensions                  CHOICE {
        rrcResumeComplete                   RRCResumeComplete-IEs,
        criticalExtensionsFuture            SEQUENCE { }
    }
}
RRCResumeComplete-IEs ::=       SEQUENCE {
    dedicatedNAS-Message            DedicatedNAS-Message            OPTIONAL,
    selectedPLMN-Identity           INTEGER (1..maxPLMN)            OPTIONAL
    uplinkTxDirectCurrentList       UplinkTxDirectCurrentList       OPTIONAL,
    lateNonCriticalExtension        OCTET STRING                    OPTIONAL,
    nonCriticalExtension            RRCResumeComplete-v1610-IEs     OPTIONAL
}
RRCResumeComplete-v1610-IEs ::=     SEQUENCE {
    idleMeasAvailable-r16           ENUMERATED {true}               OPTIONAL,
    measResultIdleEUTRA-r16         MeasResultIdleEUTRA-r16
```

```
OPTIONAL,
    measResultIdleNR-r16        MeasResultIdleNR-r16
OPTIONAL,
    scg-Response-r16            CHOICE {
        nr-SCG-Response             OCTET STRING (CONTAINING
RRCReconfigurationComplete),
        eutra-SCG-Response          OCTET STRING
    }
                                                            OPTIONAL,
    ue-MeasurementsAvailable-r16    UE-MeasurementsAvailable-r16
OPTIONAL,
    mobilityHistoryAvail-r16        ENUMERATED {true}
OPTIONAL,
    mobilityState-r16               ENUMERATED {normal, medium, high, spare}
OPTIONAL,
    needForGapsInfoNR-r16           NeedForGapsInfoNR-r16
OPTIONAL,
    nonCriticalExtension            SEQUENCE{
}                                   OPTIONAL
}
-- TAG-RRCRESUMECOMPLETE-STOP
-- ASN1STOP
```

[ . . . ]

RRCRelease

The RRCRelease message is used to command the release of an RRC connection or the suspension of the RRC connection.

Signalling radio bearer: SRB1
RLC-SAP: AM
Logical channel: DCCH
Direction: Network to UE RRCRelease Message

```
-- ASN1START
-- TAG-RRCRELEASE-START
RRCRelease ::=                      SEQUENCE {
    rrc-TransactionIdentifier           RRC-TransactionIdentifier,
    criticalExtensions                  CHOICE {
        rrcRelease                          RRCRelease-IEs,
        criticalExtensionsFuture            SEQUENCE { }
    }
}
RRCRelease-IEs ::=                  SEQUENCE {
    ...
    suspendConfig                       SuspendConfig                       OPTIONAL, --
Need R
    ...
}
...
SuspendConfig ::=                   SEQUENCE {
    fullI-RNTI                          I-RNTI-Value,
    shortI-RNTI                         ShortI-RNTI-Value,
    ran-PagingCycle                     PagingCycle,
    ran-NotificationAreaInfo            RAN-NotificationAreaInfo            OPTIONAL,
-- Need M
    t380                    PeriodicRNAU-TimerValue                         OPTIONAL,  -- Need
R
    nextHopChainingCount            NextHopChainingCount,
    ...
}
...
PagingCycle ::=         ENUMERATED {rf32, rf64, rf128, rf256}
...
RAN-NotificationAreaInfo ::=        CHOICE {
    cellList                PLMN-RAN-AreaCellList,
    ran-AreaConfigList          PLMN-RAN-AreaConfigList,
    ...
}
PLMN-RAN-AreaCellList ::=       SEQUENCE (SIZE (1.. maxPLMNIdentities)) OF PLMN-RAN-
AreaCell
PLMN-RAN-AreaCell ::=           SEQUENCE {
    plmn-Identity                   PLMN-Identity                           OPTONAL,  -- Need S
    ran-AreaCells                   SEQUENCE (SIZE (1..32)) OF CellIdentity
}
PLMN-RAN-AreaConfigList ::=     SEQUENCE (SIZE (1..maxPLMNIdentities)) OF PLMN-RAN-
AreaConfig
PLMN-RAN-AreaConfig ::=         SEQUENCE {
    plmn-Identity                   PLMN-Identity                           OPTIONAL,  -- Need S
    ran-Area                        SEQUENCE (SIZE (1..16)) OF RAN-AreaConfig
```

-continued

```
}
RAN-AreaConfig ::=        SEQUENCE {
    trackingAreaCode          TrackingAreaCode,
    ran-AreaCodeList          SEQUENCE (SIZE (1..32)) OF RAN-AreaCode
OPTIONAL,   -- Need R
}
-- TAG-RRCRELEASE-STOP
-- ASN1STOP
```

RRCRelease-IEs field descriptions suspendConfig
Indicates configuration for the RRC_INACTIVE state. The network does not configure suspendConfig when the network redirect the UE to an inter-RAT carrier frequency or if the UE is configured with a DAPS bearer.

[ . . . ]

RAN-NotificationAreaInfo field descriptions cellList
A list of cells configured as RAN area.
ran-AreaConfigList
A list of RAN area codes or RA code(s) as RAN area.

PLMN-RAN-AreaConfig field descriptions plmn-Identity
PLMN Identity to which the cells in ran-Area belong. If the field is absent the UE uses the ID of the registered PLMN.
ran-AreaCodeList
The total number of RAN-AreaCodes of all PLMNs does not exceed 32.
ran-Area
Indicates whether TA code(s) or RAN area code(s) are used for the RAN notification area.
The network uses only TA code(s) or both TA code(s) and RAN area code(s) to configure a UE. The total number of TACs across all PLMNs does not exceed 16.

PLMN-RAN-AreaCell field descriptions plmn-Identity
PLMN Identity to which the cells in ran-AreaCells belong. If the field is absent the UE uses the ID of the registered PLMN.
ran-AreaCells
The total number of cells of all PLMNs does not exceed 32.

SuspendConfig field descriptions ran-NotificationAreaInfo
Network ensures that the UE in RRC_INACTIVE always has a valid ran-NotificationAreaInfo.
ran-PagingCycle
Refers to the UE specific cycle for RAN-initiated paging. Value rf32 corresponds to 32 radio frames, value rf64 corresponds to 64 radio frames and so on.
t380
Refers to the timer that triggers the periodic RNAU procedure in UE. Value min5 corresponds to 5 minutes, value min10 corresponds to 10 minutes and so on.

[ . . . ]

RRCReconfiguration

The RRCReconfiguration message is the command to modify an RRC connection. It may convey information for measurement configuration, mobility control, radio resource configuration (including RBs, MAC main configuration and physical channel configuration) and AS security configuration.

Signalling radio bearer: SRB1 or SRB3
RLC-SAP: AM
Logical channel: DCCH
Direction: Network to UE
RRCReconfiguration Message

```
-- ASN1START
-- TAG-RRCRECONFIGURATION-START
...
RRCReconfiguration-v1530-IEs ::=        SEQUENCE {
    ...
    dedicatedSIB1-Delivery              OCTET STRING (CONTAINING SIB1)
OPTIONAL, -- Need N
    dedicatedSystemInformationDelivery  OCTET STRING (CONTAINING SystemInformation)
OPTIONAL, -- Need N
    ...
}
```

[ . . . ]

| RRCReconfiguration-IEs field descriptions |
| --- |
| dedicatedSIB1-Delivery |
| This field is used to transfer SIB1 to the UE.<br>The field has the same values as the corresponding configuration in servingCellConfigCommon. |
| dedicatedSystemInformationDelivery |
| This field is used to transfer SIB6, SIB7, SIB8 to the UE with an active BWP with no common serach space configured.<br>For UEs in RRC_CONNECTED, this field is used to transfer the SIBs requested on-demand. |

[ . . . ]

SystemInformation

The SystemInformation message is used to convey one or more System Information Blocks or Positioning System Information Blocks. All the SIBs or posSIBs included are transmitted with the same periodicity.

Signalling radio bearer: N/A

RLC-SAP: TM

Logical channels: BCCH

Direction: Network to UE:

SystemInformation Message

```
-- ASN1START
-- TAG-SYSTEMINFORMATION-START
SystemInformation ::=          SEQUENCE {
    criticalExtensions         CHOICE {
        systemInformation          SystemInformation-IEs,
        criticalExtensionsFuture-r16   CHOICE{
            posSystemInformation-r16      PosSystemInformation-r16-IEs,
            criticalExtensionsFuture     SEQUENCE { }
        }
    }
}
SystemInformation-IEs ::=      SEQUENCE {
    sib-TypeAndInfo            SEQUENCE (SIZE (1..maxSIB)) OF CHOICE {
        sib2                   SIB2,
        sib3                   SIB3,
        sib4                   SIB4,
        sib5                   SIB5,
        sib6                   SIB6,
        sib7                   SIB7,
        sib8                   SIB8,
        sib9                   SIB9,
        ...,
        sib10-v1610            SIB10-r16,
        sib11-v1610            SIB11-r16,
        sib12-v1610            SIB12-r16,
        sib13-v1610            SIB13-r16,
        sib14-v1610            SIB14-r16
    },
    lateNonCriticalExtension   OCTET STRING            OPTIONAL,
    nonCriticalExtension       SEQUENCE { }            OPTIONAL
}
-- TAG-SYSTEMINFORMATION-STOP
-- ASN1STOP
```

[ . . . ]

MIB

The MIB includes the system information transmitted on BCH.

Signalling radio bearer: N/A

RLC-SAP: TM

Logical channel: BCCH

Direction: Network to UE

MIB

```
-- ASN1START
-- TAG-MIB-START
MIB ::=             SEQUENCE {
    systemFrameNumber          BIT STRING (SIZE (6)),
    subCarrierSpacingCommon        ENUMERTED {scs15or60, scs30or120},
    ssb-SubcarrierOffset       INTEGER (0..15),
    dmrs-TypeA-Position        ENUMERATED {pos2, pos3},
    pdcch-ConfigSIB1           PDCCH-ConfigSIB1,
    cellBarred             ENUMERATED {barred, notBarred},
```

```
    intraFreqReselection         ENUMERATED {allowed, notAllowed},
    spare                  BIT STRING (SIZE (1)),
}
-- TAG-MIB-STOP
-- ASN1STOP
```

[ . . . ]

SIB1

SIB1 contains information relevant when evaluating if a UE is allowed to access a cell and defines the scheduling of other system information. It also contains radio resource configuration information that is common for all UEs and barring information applied to the unified access control.

Signalling radio bearer: N/A

RLC-SAP: TM

Logical channels: BCCH

Direction: Network to UE

SIB1 Message

```
-- ASN1START
-- TAG-SIB1-START
SIB1 ::=       SEQUENCE {
    cellSelectionInfo            SEQUENCE {
        q-RxLevMin               Q-RxLevMin,
        q-RxLevMinOffset             INTEGER (1..8)           OPTIONAL,  -- Need S
        q-RxLevMinSUL            Q-RxLevMin                OPTIONAL,  -- Need R
        q-QualMin                Q-QualMin                 OPTIONAL,  -- Need S
        q-QualMinOffset          INTEGER (1..8)            OPTIONAL,  -- Need S
    }                                               OPTIONAL,  -- Cond Standalone
    cellAccessRelatedInfo        CellAccessRelatedInfo,
    connEstFailureControl        ConnEstFailureControl                  OPTIONAL, -- Need R
    si-SchedulingInfo            SI-SchedulingInfo                      OPTIONAL,  -- Need R
    servingCellConfigCommon          ServingCellConfigCommonSIB    OPTIONAL,  -- Need R
    ims-EmergencySupport             ENUMERATED {true}             OPTIONAL, -- Need R
    eCallOverIMS-Support             ENUMERATED {true}             OPTIONAL, -- Need R
    ue-TimersAndConstants            UE-TimersAndConstants              OPTIONAL, -- Need R
    uac-BarringInfo         SEQUENCE {
        uac-BarringForCommon        UAC-BarringPerCatList              OPTIONAL, -- Need S
        uac-BarringPerPLMN-List     UAC-BarringPerPLMN-List   OPTIONAL,  -- Need S
        uac-BarringInfoSetList      UAC-BarringInfoSetList,
        uac-AccessCategory1-SelectionAssistanceInfo   CHOICE {
            plmnCommon           UAC-AccessCategory1-SelectionAssistanceInfo,
            individualPLMNList           SEQUENCE (SIZE (2..maxPLMN)) OF UAC-AccessCategory1-SelectionAssistanceInfo
        }                                               OPTIONAL,  -- Need S
    }                                               OPTIONAL,  -- Need R
    useFullResumeID         ENUMERATED {true}                       OPTIONAL, -- Need R
    lateNonCriticalExtension     OCCTET STRING                      OPTIONAL,
    nonCriticalExtension         SIB1-v1610-IEs                     OPTIONAL
}
SIB1-v1610-IEs ::=       SEQUENCE {
    idleModeMeasurementsEUTRA-r16        ENUMERATED {true}    OPTIONAL,  -- Need R
    idleModeMeasurementsNR-r16           ENUMERATED {true}    OPTIONAL,  -- Need R
    posSI-SchedulingInfo-r16         PosSI-SchedulingInfo-r16           OPTIONAL, -- Need R
    nonCriticalExtension         SEQUENCE { }                       OPTIONAL
}
UAC-AccessCategory1-SelectionAssistanceInfo ::=    ENUMERATED {a, b, c}
-- TAG-SIB1-STOP
-- ASN1STOP
```

| SIB1 field descriptions |
|---|
| cellSelectionInfo |
| Parameters for cell selection related to the serving cell. |
| eCallOverIMS-Support |
| Indicates whether the cell supports eCall over IMS services as defined in TS 23.501 [32]. If absent, eCall over IMS is not supported by the network in the cell. |
| idleModeMeasurementsEUTRA |
| This field indicates that a UE that is configured for EUTRA idle/inactive measurements shall perform the measurements while camping in this cell and report availability of these measurements when establishing or resuming a connection in this cell. If absent, a UE is not required to perform EUTRA idle/inactive measurements. |
| idleModeMeasurementsNR |
| This field indicates that a UE that is configured for NR idle/inactive measurements shall perform the measurements while camping in this cell and report availability of these measurements when establishing or resuming a connection in this cell. If absent, a UE is not required to perform NR idle/inactive measurements. |
| ims-EmergencySupport |
| Indicates whether the cell supports IMS emergency bearer services for UEs in limited service mode. If absent, IMS emergency call is not supported by the network in the cell for UEs in limited service mode. |
| q-QualMin |
| Parameter "$Q_{qualmin}$" in TS 38.304 [20], applicable for serving cell. If the field is absent, the UE applies the (default) value of negative infinity for $Q_{qualmin}$. |
| q-QualMinOffset |
| Parameter "$Q_{qualminoffset}$" in TS 38.304 [20]. Actual value $Q_{qualminoffset}$ = field value [dB]. If the field is absent, the UE applies the (default) value of 0 dB for n $Q_{qualminoffset}$. Affects the minimum required quality level in the cell. |
| q-RxLevMin |
| Parameter "$Q_{rxlevmin}$" in TS 38.304 [20], applicable for serving cell. |
| q-RxLevMinOffset |
| Parameter "$Q_{rxlevminoffset}$" in TS 38.304 [20]. Actual value $Q_{rxlevminoffset}$ = field value * 2 [dB]. If absent, the UE applies the (default) value of 0 dB for $Q_{rxlevminoffset}$. Affects the minimum required Rx level in the cell. |
| q-RxLevMinSUL |
| Parameter "$Q_{rxlevmin}$" in TS 38.304 [20], applicable for serving cell. |
| servingCellConfigCommon |
| Configuration of the serving cell. |
| uac-AccessCategory1-SelectionAssistanceInfo |
| Information used to determine whether Access Category 1 applies to the UE, as defined in TS 22.261 [25]. |
| uac-BarringForCommon |
| Common access control parameters for each access category. Common values are used for all PLMNs, unless overwritten by the PLMN specific configuration provided in uac-BarringPerPLMN-List. The parameters are specified by providing an index to the set of configurations (uac-BarringInfoSetList). UE behaviour upon absence of this field is specified in clause 5.3.14.2. |
| ue-TimersAndConstants |
| Timer and constant values to be used by the UE. The cell operating as PCell always provides this field. |
| useFullResumeID |
| Indicates which resume identifier and Resume request message should be used. UE uses fullI-RNTI and RRCResumeRequest1 if the field is present, or shortI-RNTI and RRCResumeRequest if the field is absent. |

6.3.2 Radio Resource Control Information Elements
[ . . . ]
CellAccessRelatedInfo
The IE CellAccessRelatedInfo indicates cell access related information for this cell.
CellAccessRelatedInfo Information Element

```
-- ASN1START
-- TAG-CELLACCESSRELATEDINFO-START
CellAccessRelatedInfo ::=        SEQUENCE {
    plmn-IdentityList            PLMN-IdentityInfoList,
    cellReservedForOtherUse          ENUMERATED {true}       OPTIONAL,   -- Need R
    ...,
    [[
    cellReservedForFutureUse-r16     ENUMERATED {true}       OPTIONAL,   -- Need R
    npn-IdentityInfoList-r16         NPN-IdentityInfoList-r16  OPTIONAL    -- Need R
    ]]
}
-- TAG-CELLACCESSRELATEDINFO-STOP
-- ASN1STOP
```

| CellAccessRelatedInfo field descriptions |
|---|
| cellReservedForFutureUse |
| Indicates whether the cell is reserved, as defined in 38.304 [20] for future use. The field is applicable to all PLMNs and NPNs. This field is ignored by IAB-MT. |
| cellReservedForOtherUse |
| Indicates whether the cell is reserved, as defined in 38.304 [20]. The field is applicable to all PLMNs. This field is ignored by IAB-MT for cell barring determination, but still considered by NPN capable IAB-MT for determination of an NPN-only cell. |
| npn-IdentityInfoList |
| The npn-IdentityInfoList is used to configure a set of NPN-IdentityInfo elements. Each of those elements contains a list of one or more NPN Identities and additional information associated with those NPNs. The total number of PLMNs (identified by a PLMN identity in plmn - IdentityList), PNI-NPNs (identified by a PLMN identity and a CAG-ID), and SNPNs (identified by a PLMN identity and a NID) together in the PLMN-IdentityInfoList and NPN-IdentityInfoList does not exceed 12, except for the NPN-only cells. In case of NPN-only cells the PLMN-IdentityList contains a single element that does not count to the limit of 12. The NPN index is defined as $B + c1 + c2 + \ldots + c(n-1) + d1 + d2 + \ldots + d(m-1) + e(i)$ for the NPN identity included in the n-th entry of NPN-IdentityInfoList and in the m-th entry of NPN-Identitylist within that npn-IdentityInfoList entry, and the i-th entry of its corresponding NPN-Identity, where B is the index used for the last PLMN in the PLMN-IdentittyInfoList; in NPN-only cells B is considered 0; $c(j)$ is the number of NPN index values used in the j-th NPN-IdentityInfoList entry; $d(k)$ is the number of NPN index values used in the k-th npn-IdentityList entry within the n-th NPN-IdentityInfoList entry; $e(i)$ is i if the n-th entry of NPN-IdentityInfoList entry is for SNPN(s); 1 if the n-th entry of NPN-IdentityInfoList entry is for PNI-NPN(s). |
| plmn-IdentityList |
| The plmn-IdentityList is used to configure a set of PLMN-IdentityInfo elements. Each of those elements contains a list of one or more PLMN Identities and additional information associated with those PLMNs. A PLMN-identity can be included only once, and in only one entry of the PLMN-IdentityInfoList. The PLMN index is defined as $b1 + b2 + \ldots + b(n-1) + i$ for the PLMN included at the n-th entry of PLMN-IdentityInfoList and the i-th entry of its corresponding PLMN-IdentityInfo, where $b(j)$ is the number of PLMN-Identity entries in each PLMN-IdentityInfo, respectively. |

PLMN-IdentityInfoList
The IE PLMN-IdentityInfoList includes a list of PLMN identity information.
PLMN-IdentityInfoList Information Element

```
-- ASN1START
-- TAG-PLMN-IDENTITYINFOLIST-START
PLMN-IdentityInfoList ::=    SEQUENCE (SIZE (1..maxPLMN)) OF PLMN-IdentityInfo
PLMN-IdentityInfo ::=        SEQUENCE {
    plmn-IdentityList        SEQUENCE (SIZE (1..maxPLMN)) OF PLMN-Identity,
```

-continued

```
    trackingAreaCode         TrackingAreaCode                          OPTIONAL,  --
Need R
    ranac                    RAN-AreaCode                              OPTIONAL,  -- Need R
    cellIdentity             CellIdentity,
    cellReservedForOperatorUse    ENUMERATED {reserved, notReserved},
    ...,
    [[
    iab-Support-r16          ENUMERATED {true}                         OPTIONAL,  --
Need S
    ]]
}
-- TAG-PLMN-IDENTITYINFOLIST-STOP
-- ASN1STOP
```

| PLMN-IdentityInfo field descriptions |
| --- |
| cellReservedForOperatorUse |
| Indicates whether the cell is reserved for operator use (per PLMN), as defined in TS 38.304 [20]. This field is ignored by IAB-MT. |
| iab-Support |
| This field combines both the support of IAB and the cell status for IAB. If the field is present, the cell supports IAB and the cell is also considered as a candidate for cell (re)selection for IAB-node; if the field is absent, the cell does not support IAB and/or the cell is barred for IAB-node. |
| trackingAreaCode |
| Indicates Tracking Area Code to which the cell indicated by cellIdentity field belongs. The absence of the field indicates that the cell only supports PSCell/SCell functionality (per PLMN). |

7.4 UE Variables
[ . . . ]
VarResumeMAC-Input
The UE variable VarResumeMAC-Input specifies the input used to generate the resumeMAC-I during RRC Connection Resume procedure.
VarResumeMAC-Input Variable

```
-- ASN1START
-- TAG-VARRESUMEMAC-INPUT-START
VarResumeMAC-Input ::=    SEQUENCE {
    sourcePhysCellId         PhysCellId,
    targetCellIdentity       CellIdentity,
    source-c-RNTI            RNTI-Value
}
-- TAG-VARRESUMEMAC-INPUTSTOP
-- ASN1STOP
```

| VarResumeMAC-Input field descriptions |
| --- |
| targetCellIdentity |
| An input variable used to calculate the resumeMAC-I. Set to the cellIdentity of the first PLMN-Identity included in the PLMN-IdentityInfoList broadcasted in SIB1 of the target cell i.e. the cell the UE is trying to resume. |
| source-c-RNTI |
| Set to C-RNTI that the UE had in the PCell it was connected to prior to suspension of the RRC connection. |
| sourcePhysCellId |
| Set to the physical cell identity of the PCell the UE was connected to prior to suspension of the RRC connection. |

3GPP TS 38.300 introduces the following:
7.3 System Information Handling
7.3.1 Overview
System Information (SI) consists of a MIB and a number of SIBs, which are divided into Minimum SI and Other SI:
Minimum SI comprises basic information required for initial access and information for acquiring any other SI. Minimum SI consists of:
MIB contains cell barred status information and essential physical layer information of the cell required to receive further system information, e.g. CORESET #0configuration. MIB is periodically broadcast on BCH.
SIB1 defines the scheduling of other system information blocks and contains information required for initial access. SIB1 is also referred to as Remaining Minimum SI (RMSI) and is periodically broadcast on DL-SCH or sent in a dedicated manner on DL-SCH to UEs in RRC_CONNECTED.

Other SI encompasses all SIBs not broadcast in the Minimum SI. Those SIBs can either be periodically broadcast on DL-SCH, broadcast on-demand on DL-SCH (i.e. upon request from UEs in RRC_IDLE or RRC_INACTIVE), or RRC_CONNECTED, or sent in a dedicated manner on DL-SCH to UEs in RRC_CONNECTED (i.e., upon request from UEs in RRC_CONNECTED or when the UE has an active BWP with no common search space configured). Other SI consists of:

SIB2 contains cell re-selection information, mainly related to the serving cell;

SIB3 contains information about the serving frequency and intra-frequency neighbouring cells relevant for cell re-selection (including cell re-selection parameters common for a frequency as well as cell specific re-selection parameters);

SIB4 contains information about other $N_R$ frequencies and inter-frequency neighbouring cells relevant for cell re-selection (including cell re-selection parameters common for a frequency as well as cell specific re-selection parameters);

SIB5 contains information about E-UTRA frequencies and E-UTRA neighbouring cells relevant for cell re-selection (including cell re-selection parameters common for a frequency as well as cell specific re-selection parameters);

SIB6 contains an ETWS primary notification;

SIB7 contains an ETWS secondary notification;

SIB8 contains a CMAS warning notification;

SIB9 contains information related to GPS time and Coordinated Universal Time (UTC).

For sidelink, Other SI also includes:

SIB12 contains information related to NR sidelink communication;

SIB13 contains information related to SystemInformationBlockType21 for V2X sidelink communication as specified in TS 36.331 clause 5.2.2.28 [29];

SIB14 contains information related to SystemInformationBlockType26 for V2X sidelink communication as specified in TS 36.331 clause 5.2.2.33 [29].

FIGS. 7.3-1 below summarises System Information provisioning.

Figure 10:
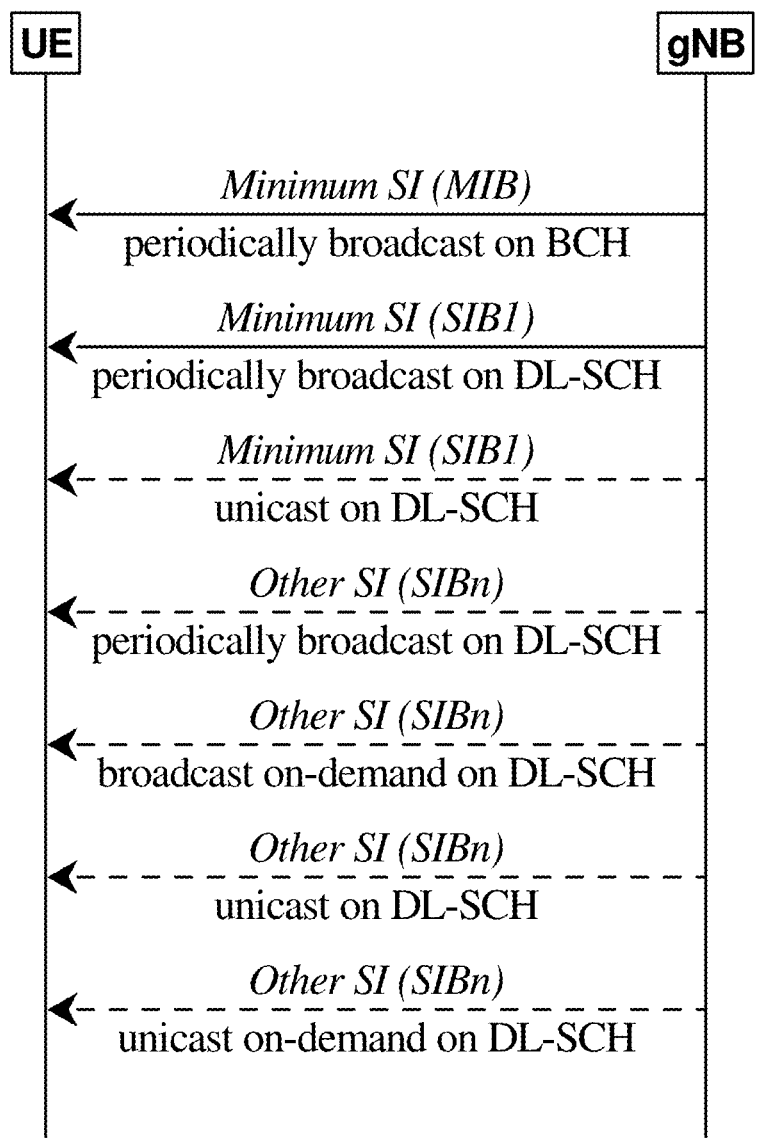
FIG. 10 is a reproduction of FIGS. 7.3-1 of 3GPP TS 38.300 V16.1.0.

[FIGS. 7.3-1 of 3GPP TS 38.300 V16.1.0, Entitled "System Information Provisioning", is Reproduced as FIG. 10]

For a cell/frequency that is considered for camping by the UE, the UE is not required to acquire the contents of the minimum SI of that cell/frequency from another cell/frequency layer. This does not preclude the case that the UE applies stored SI from previously visited cell(s). If the UE cannot determine the full contents of the minimum SI of a cell by receiving from that cell, the UE shall consider that cell as barred.

In case of BA, the UE only acquires SI on the active BWP.

7.3.2 Scheduling

The MIB is mapped on the BCCH and carried on BCH while all other SI messages are mapped on the BCCH, where they are dynamically carried on DL-SCH. The scheduling of SI messages part of Other SI is indicated by SIB1.

For UEs in RRC_IDLE and RRC_INACTIVE, a request for Other SI triggers a random access procedure (see clause 9.2.6) where MSG3 includes the SI request message unless the requested SI is associated to a subset of the PRACH resources, in which case MSG1 is used for indication of the requested Other SI. When MSG1 is used, the minimum granularity of the request is one SI message (i.e. a set of SIBs), one RACH preamble and/or PRACH resource can be used to request multiple SI messages and the gNB acknowledges the request in MSG2. When MSG 3 is used, the gNB acknowledges the request in MSG4.

For UEs in RRC_CONNECTED, a request for Other SI may be sent to the network in a dedicated manner (i.e., via UL-DCCH) and the granularity of the request is one SIB. The gNB may respond with an RRCReconfiguration including the requested SIB(s). It is a network choice to decide which requested SIBs are delivered in a dedicated or broadcasted manner.

The Other SI may be broadcast at a configurable periodicity and for a certain duration. The Other SI may also be broadcast when it is requested by UE in RRC_IDLE/RRC_INACTIVE.

For a UE to be allowed to camp on a cell it must have acquired the contents of the Minimum SI from that cell. There may be cells in the system that do not broadcast the Minimum SI and where the UE therefore cannot camp.

7.3.3 SI Modification

Change of system information (other than for ETWS/CMAS, see clause 16.4) only occurs at specific radio frames, i.e. the concept of a modification period is used. System information may be transmitted a number of times with the same content within a modification period, as defined by its scheduling. The modification period is configured by system information. When the network changes (some of the) system information, it first notifies the UEs about this change, i.e. this may be done throughout a modification period. In the next modification period, the network transmits the updated system information. Upon receiving a change notification, the UE acquires the new system information from the start of the next modification period. The UE applies the previously acquired system information until the UE acquires the new system information.

[ . . . ]

9.2.2 Mobility in RRC_INACTIVE 9.2.2.1 Overview

RRC_INACTIVE is a state where a UE remains in CM-CONNECTED and can move within an area configured by NG-RAN (the RNA) without notifying NG-RAN. In RRC_INACTIVE, the last serving gNB node keeps the UE context and the UE-associated NG connection with the serving AMF and UPF.

If the last serving gNB receives DL data from the UPF or DL UE-associated signalling from the AMF (except the UE Context Release Command message) while the UE is in RRC_INACTIVE, it pages in the cells corresponding to the RNA and may send XnAP RAN Paging to neighbour gNB(s) if the RNA includes cells of neighbour gNB(s).

Upon receiving the UE Context Release Command message while the UE is in RRC_INACTIVE, the last serving gNB may page in the cells corresponding to the RNA and may send XnAP RAN Paging to neighbour gNB(s) if the RNA includes cells of neighbour gNB(s), in order to release UE explicitly.

Upon receiving the NG RESET message while the UE is in RRC_INACTIVE, the last serving gNB may page involved UEs in the cells corresponding to the RNA and may send XnAP RAN Paging to neighbour gNB(s) if the RNA includes cells of neighbour gNB(s) in order to explicitly release involved UEs.

Upon RAN paging failure, the gNB behaves according to TS 23.501 [3].

The AMF provides to the NG-RAN node the Core Network Assistance Information to assist the NG-RAN node's decision whether the UE can be sent to RRC_INACTIVE. The Core Network Assistance Information includes the registration area configured for the UE, the Periodic Registration Update timer, and the UE Identity Index value, and may include the UE specific DRX, an indication if the UE is configured with Mobile Initiated Connection Only (MICO) mode by the AMF, and the Expected UE Behaviour. The UE registration area is taken into account by the NG-RAN node when configuring the RNA. The UE specific DRX and UE Identity Index value are used by the NG-RAN node for RAN paging. The Periodic Registration Update timer is taken into account by the NG-RAN node to configure Periodic RNA Update timer. The NG-RAN node takes into account the Expected UE Behaviour to assist the UE RRC state transition decision.

[ . . . ]

A UE in the RRC_INACTIVE state is required to initiate RNA update procedure when it moves out of the configured RNA. When receiving RNA update request from the UE, the receiving gNB triggers the XnAP Retrieve UE Context procedure to get the UE context from the last serving gNB and may decide to send the UE back to RRC_INACTIVE state, move the UE into RRC_CONNECTED state, or send the UE to RRC_IDLE. In case of periodic RNA update, if the last serving gNB decides not to relocate the UE context, it fails the Retrieve UE Context procedure and sends the UE back to RRC_INACTIVE, or to RRC_IDLE directly by an encapsulated RRCRelease message.

[ . . . ]

9.2.2.3 RAN-Based Notification Area

A UE in the RRC_INACTIVE state can be configured by the last serving NG-RAN node with an RNA, where:
  the RNA can cover a single or multiple cells, and shall be contained within the CN registration area; in this release Xn connectivity should be available within the RNA;
  a RAN-based notification area update (RNAU) is periodically sent by the UE and is also sent when the cell reselection procedure of the UE selects a cell that does not belong to the configured RNA.

There are several different alternatives on how the RNA can be configured:
  List of cells:
    A UE is provided an explicit list of cells (one or more) that constitute the RNA.
  List of RAN areas:
    A UE is provided (at least one) RAN area ID, where a RAN area is a subset of a CN Tracking Area or equal to a CN Tracking Area. A RAN area is specified by one RAN area ID, which consists of a TAC and optionally a RAN area Code;
    A cell broadcasts one or more RAN area IDs in the system information. NG-RAN may provide different RNA definitions to different UEs but not mix different definitions to the same UE at the same time. UE shall support all RNA configuration options listed above.

[ . . . ]

9.2.5 Paging

Paging allows the network to reach UEs in RRC_IDLE and in RRC_INACTIVE state through Paging messages, and to notify UEs in RRC_IDLE, RRC_INACTIVE and RRC_CONNECTED state of system information change (see clause 7.3.3) and ETWS/CMAS indications (see clause 16.4) through Short Messages. Both Paging messages and Short Messages are addressed with P-RNTI on PDCCH, but while the former is sent on PCCH, the latter is sent over PDCCH directly (see clause 6.5 of TS 38.331 [12]).

While in RRC_IDLE the UE monitors the paging channels for CN-initiated paging; in RRC_INACTIVE the UE also monitors paging channels for RAN-initiated paging. A UE need not monitor paging channels continuously though; Paging DRX is defined where the UE in RRC_IDLE or RRC_INACTIVE is only required to monitor paging channels during one Paging Occasion (PO) per DRX cycle (see TS 38.304 [10]). The Paging DRX cycles are configured by the network:
  1) For CN-initiated paging, a default cycle is broadcast in system information;
  2) For CN-initiated paging, a UE specific cycle can be configured via NAS signalling;
  3) For RAN-initiated paging, a UE-specific cycle is configured via RRC signalling;
    The UE uses the shortest of the DRX cycles applicable i.e. a UE in RRC_IDLE uses the shortest of the first two cycles above, while a UE in RRC_INACTIVE uses the shortest of the three.

The POs of a UE for CN-initiated and RAN-initiated paging are based on the same UE ID, resulting in overlapping POs for both. The number of different POs in a DRX cycle is configurable via system information and a network may distribute UEs to those POs based on their IDs. When in RRC_CONNECTED, the UE monitors the paging channels in any PO signalled in system information for SI change indication and PWS notification. In case of BA, a UE in RRC_CONNECTED only monitors paging channels on the active BWP with common search space configured.

For operation with shared spectrum channel access, a UE can be configured for an additional number of PDCCH monitoring occasions in its PO to monitor for paging. However, when the UE detects a PDCCH transmission within the UE's PO addressed with P-RNTI, the UE is not required to monitor the subsequent PDCCH monitoring occasions within this PO.

Paging optimization for UEs in CM_IDLE: at UE context release, the NG-RAN node may provide the AMF with a list of recommended cells and NG-RAN nodes as assistance info for subsequent paging. The AMF may also provide Paging Attempt Information consisting of a Paging Attempt Count and the Intended Number of Paging Attempts and may include the Next Paging Area Scope. If Paging Attempt Information is included in the Paging message, each paged NG-RAN node receives the same information during a paging attempt. The Paging Attempt Count shall be increased by one at each new paging attempt. The Next Paging Area Scope, when present, indicates whether the AMF plans to modify the paging area currently selected at next paging attempt. If the UE has changed its state to CM CONNECTED the Paging Attempt Count is reset.

Paging optimization for UEs in RRC_INACTIVE: at RAN Paging, the serving NG-RAN node provides RAN Paging area information. The serving NG-RAN node may also provide RAN Paging attempt information. Each paged NG-RAN node receives the same RAN Paging attempt information during a paging attempt with the following content: Paging Attempt Count, the intended number of paging attempts and the Next Paging Area Scope. The Paging Attempt Count shall be increased by one at each new paging attempt. The Next Paging Area Scope, when present, indicates whether the serving NG_RAN node plans to modify the RAN Paging Area currently selected at next paging attempt. If the UE leaves RRC_INACTIVE state the Paging Attempt Count is reset.

[ . . . ]

I-RNTI Reference Profiles

The I-RNTI provides the new NG-RAN node a reference to the UE context in the old NG-RAN node. How the new NG-RAN node is able to resolve the old NG-RAN ID from the I-RNTI is a matter of proper configuration in the old and new NG-RAN node.

Table C-1 below provides some typical partitioning of a 40 bit I-RNTI, assuming the following content:

UE specific reference: reference to the UE context within a logical NG-RAN node;

NG-RAN node address index: information to identify the NG-RAN node that has allocated the UE specific part;

NOTE: RAT-specific information may be introduced in a later release, containing information to identify the RAT of the cell within which the UE was sent to RRC_INACTIVE. This version of the specification only supports intra-RAT mobility of UEs in RRC_I-NACTIVE.

PLMN-specific information: information supporting network sharing deployments, providing an index to the PLMN ID part of the Global NG-RAN node identifier.

[Table C-1 of 3GPP TS 38.300 V16.1.0, Entitled "I-RNTI Reference Profiles", is Reproduced as FIG. 11]

3GPP TR 23.752 introduces the following:

6.3 Solution #3: Solution for ProSe 5G Direct Discovery Using PC5 Communication Channel 6.3.1 Description ProSe 5G Direct Discovery using PC5 communication channel relies on signalling messages that are carried within the same layer-2 frames as those used for V2X direct communication over $N_R$ PC5 reference point defined in TS 23.287 [5], clause 6.1.1 and 6.1.2.

Figure 12:
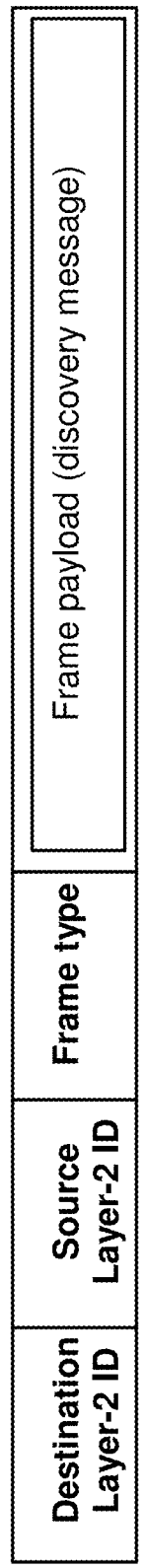
FIG. 12 is a reproduction of FIG. 6.3.1-1 of 3GPP TR 23.752 V0.5.1.

[FIG. 6.3.1-1 of 3GPP TR 23.752 V0.5.1, Entitled "Layer-2 Frame Format for ProSe 5G Direct Discovery", is Reproduced as FIG. 12]

A simplified layer-2 frame format for ProSe Direct Discovery is shown in FIG. 6.3.1-1. In reference to the header fields the following applies:

NOTE 1: The exact frame format for the discovery messages will be specified together with RAN WG2 and CT WG1.

The Destination Layer-2 ID that can be set to a unicast, groupcast or broadcast identifier.

The Source Layer-2 ID that is always set to a self-assigned unicast identifier of the transmitter.

Frame type indicates that it is a ProSe Direct Discovery message.

NOTE 2: Which protocol identifier in the Access Stratum the Frame Type field corresponds to will be decided by RAN WG2. Otherwise, the Frame Type is assumed to be transparent to Access Stratum.

The following ProSe Direct Discovery messages are needed:

Announcement message (for Model A discovery as defined in TS 23.303 [9]).

Solicitation message (for Model B discovery as defined in TS 23.303 [9]).

Response message (for Model B discovery as defined in TS 23.303 [9]).

The information contained in each discovery message is similar to what is described in TS 23.303 [9] clause 4.6.4.

NOTE 3: Depending on the use cases to be supported in ProSe 5G, not all information elements defined in TS 23.303 [9] need to be supported. For example, if only restricted, UE-to-UE Relay Discovery and UE-to-Network Relay Discovery need to be supported, there is no need for ProSe Application Code that is only used for open discovery.

6.3.2 Procedures 6.3.2.1 Procedures for Direct Discovery Model A and B

Depicted in FIG. 6.3.2.1-1 is the procedure for ProSe Direct Discovery with Model A.

Figure 13:
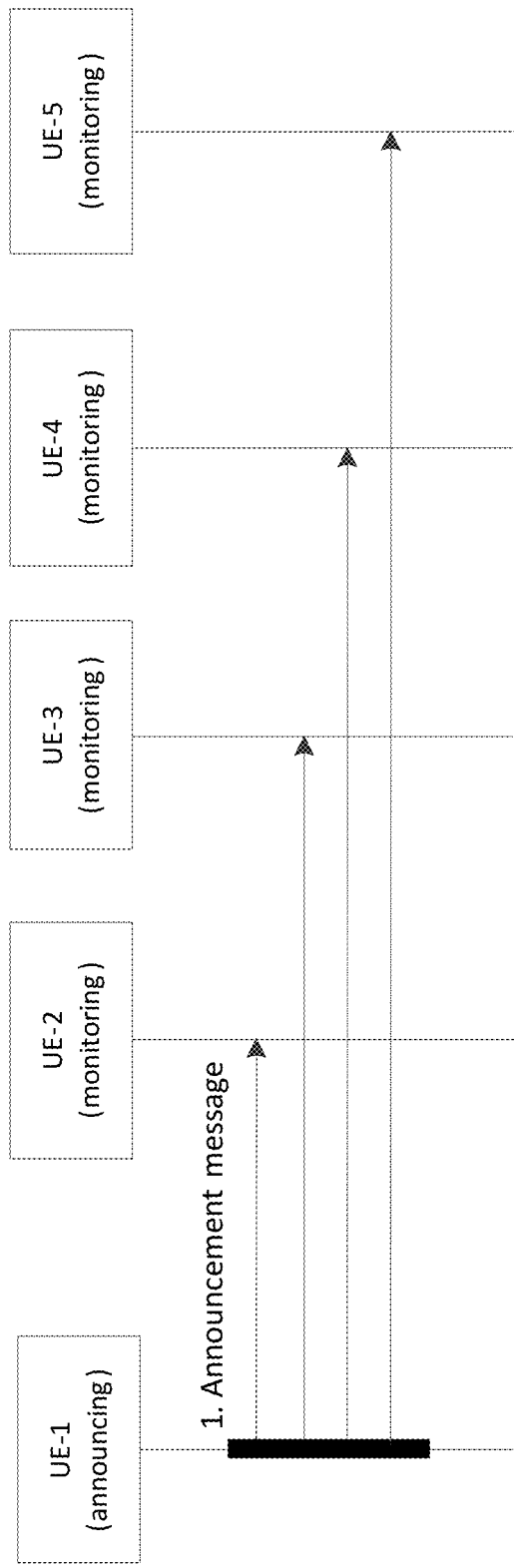
FIG. 13 is a reproduction of FIG. 6.3.2.1-1 of 3GPP TR 23.752 V0.5.1.

[FIG. 6.3.2.1-1 of 3GPP TR 23.752 V0.5.1, Entitled "ProSe Direct Discovery with Model A", is Reproduced as FIG. 13]

Depicted in FIG. 6.3.2.1-2 is the procedure for ProSe Direct Discovery with Model B.

Figure 14:
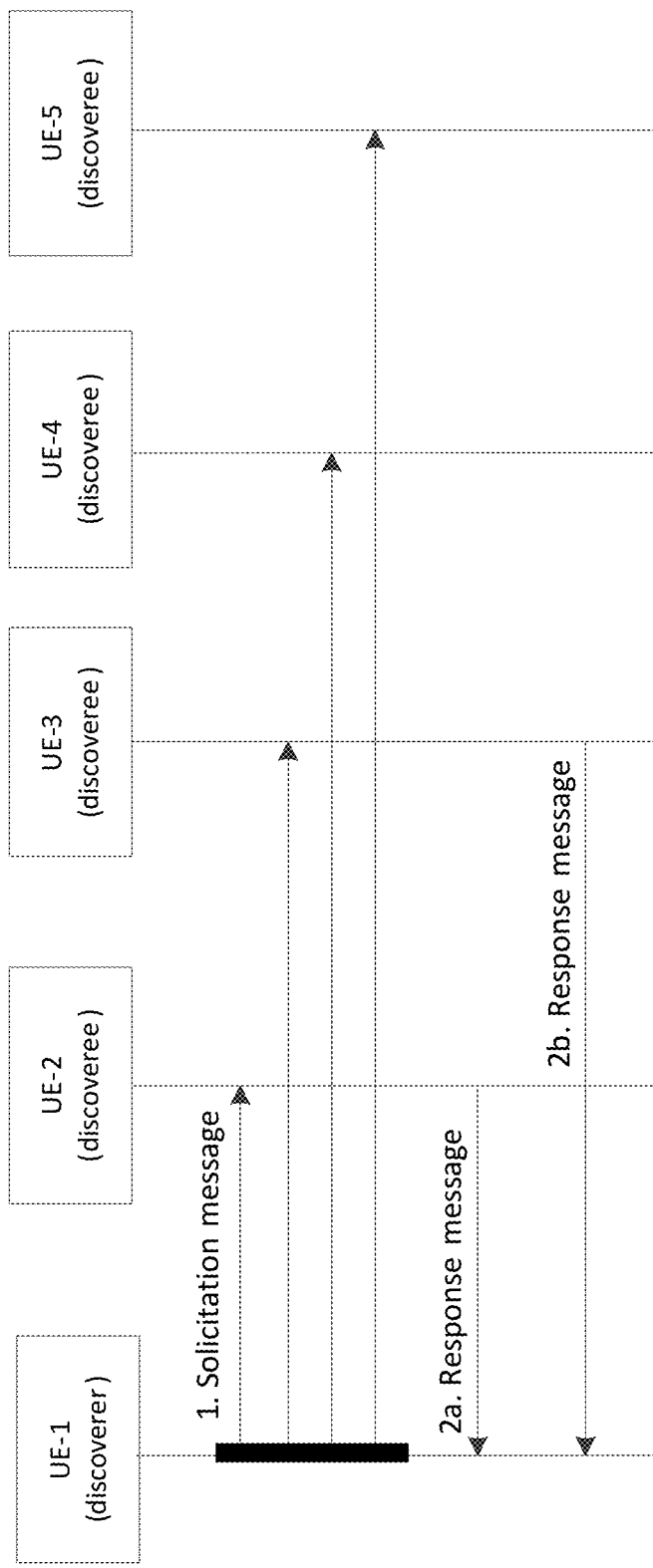
FIG. 14 is a reproduction of FIG. 6.3.2.1-2 of 3GPP TR 23.752 V0.5.1.

[FIG. 6.3.2.1-2 of 3GPP TR 23.752 V0.5.1, Entitled "ProSe Direct Discovery with Model B", is Reproduced as FIG. 14]

[ . . . ]

6.7 Solution #7: Indirect Communication via Layer 2 UE-to-Network Relay UE 6.7.1 Introduction The solution addresses the following aspect highlighted in key issue #3 (Support UE-to-Network Relay UE):

How to transfer data between the Remote UE and the network over the UE-to-Network Relay UE.

The solution proposes a protocol architecture to support a Layer 2 UE-to-Network Relay UE (see Annex A).

This solution works only for NR/5GC network relays. It does not apply when the UE-to-Network Relay UE is out of coverage of NR/5GC.

6.7.2 Functional Description 6.7.2.1 General

In this clause, the protocol architecture supporting a L2 UE-to-Network Relay UE is provided. The L2 UE-to-Network Relay UE provides forwarding functionality that can relay any type of traffic over the PC5 link.

The L2 UE-to-Network Relay UE provides the functionality to support connectivity to the 5GS for Remote UEs. A UE is considered to be a Remote UE if it has successfully established a PC5 link to the L2 UE-to-Network Relay UE. A Remote UE can be located within NG-RAN coverage or outside of NG-RAN coverage.

6.7.2.2 Control and User Plane Protocols

The control and user plane protocols stacks are based on the architectural reference model described in Annex A.

6.7.2.3 Network Selection

Network selection comprises PLMN selection and access network selection. Access network selection for a Remote UE comprises UE-to-Network relay discovery and selection. The Remote UE performs PLMN selection in accordance with the PLMN selected by the UE-to-Network Relay. The Relay UE provides serving PLMN information and other PLMNs information in System Information to the Remote UE in order to perform PLMN selection during discovery.

Editor's note: It is FFS which and how many PLMNs a L2 UE-to-Network Relay is expected to support and advertise. For instance whether it is only its registered PLMN, its registered PLMN and equivalent to the registered PLMN or it can be (hard) configured to include any PLMN similar to MOCN configuration.

The Remote UE and UE-to-Network Relay UE are by definition served by the same NG-RAN.

6.7.2.4 Authorization and Provisioning

In order to enable a (Remote) UE out of coverage to gain connectivity to the network, it is important to allow such UE by means of (pre) configuration to discover potential UE-to-Network Relay UEs through which it could gain access to the 5GS. To do so:

Parameters for UE-to-Network Relay UE discovery and for communication over NR PC5 may be made available to the Remote UE as follows:
 Pre-configured in the ME and/or configured in the UICC;
 Provided or updated by the PCF to the UE in the serving PLMN.

It is also important that a UE be authorized to operate as a UE-to-Network Relay UE. A UE may only operate as a UE-to-Network Relay UE when served by the network.

Parameters for a UE to operate as a UE-to-Network Relay UE, for discovery of Remote UEs over NR PC5 and for communication over NR PC5 may be made available to the UE as follows:
 Pre-configured in the ME and/or configured in the UICC;
 Provided or updated by the PCF to the UE in the serving PLMN.

It should be possible for the HPLMN PCF to provide authorization for a UE to operate as a Remote UE or as a UE-to-Network Relay UE on a per PLMN basis. It should also be possible for the Serving PLMN to provide/revoke such authorization in which case it shall override any corresponding information provided by the HPLMN.

PCF based service authorization and provisioning solution for Layer-2 UE-to-Network Relay could reuse Solution #35.

6.7.2.5 Registration and Connection Management 6.7.2.5.1 Registration Management Registration Management for the UE-to-Network Relay UE follows the principles and procedures defined in TS 23.501 [6] and TS 23.502 [8]. The UE-to-Network Relay is served by a first AMF.

Registration Management for the Remote UE follows the principles and procedures defined in TS 23.501 [6] and TS 23.502 [8]. The Remote UE is served by a second AMF that may or may not be the same as the first AMF.
 NOTE: The UE is authorized to act as a UE-to-Network Relay only if the Network (including RAN/CN) does not restrict it, e.g. authorization, Unified Access Control, and Remote UE and UE-to-Network Relay are in the same rPLMN or ePLMN.

6.7.2.5.2 Connection Management

Connection Management for the UE-to-Network Relay UE follows at least the principles and procedures defined in TS 23.501 [6] and TS 23.502 [8].

Connection Management for the Remote UE follows the principles and procedures defined in TS 23.501 [6] and TS 23.502 [8].

The UE-to-Network Relay may only relay data/signaling for the Remote UE(s) when the UE-to-Network Relay is in CM-CONNECTED/RRC Connected states. If the UE-to-Network Relay in CM_IDLE state receives the PC5 connection request from the Remote UE for relay, the UE-to-Network Relay shall trigger Service Request procedure to enter CM_CONNECTED state before relaying the signalling.
 If any Remote UE connected to the UE-to-Network Relay UE is CM-CONNECTED, the UE-to-Network Relay UE should remain CM-CONNECTED state.
 If all Remote UEs connected to the UE-to-Network Relay UE enter CM-IDLE, the UE-to-Network Relay UE may enter CM-IDLE state.
 NOTE: The applied state needs to be coordinated and confirmed by RAN WG2. Impact on RRC Inactive will also be studied by RAN WG2.
 When Remote UE is CM-IDLE or CM-CONNECTED, Relay UE and Remote UE keeps the PC5 link. For paging Remote UE, the concluded solution in clause 6.6.2 of TR 23.733 can be reused based on the assumption that option 2 of TR 36.746 is adopted by RAN WG2.
  Editor's note: Whether paging option 2 of TR 36.746 will be adopted for 5G ProSe by RAN WG2 needs to be confirmed by RAN group.

6.7.2.5.3 NAS level Congestion Control

The UE-to-Network Relay may experience NAS level congestion control, as specified in clause 5.19.7 of TS 23.501 [6].

When NAS Mobility Management congestion control is activated, i.e. the UE-to-Network Relay receives Mobility Management back-off timer from the AMF, the UE-to-Network Relay is not able to properly serve the Remote UE after the UE-to-Network Relay enters CM_IDLE state. In that case, the UE-to-Network Relay needs to inform the Remote UE that there is a Mobility Management back-off timer running at the UE-to-Network Relay, so that the Remote UE is able to (re) select to another UE-to-Network Relay.

The Remote UE may also subject to NAS level congestion control. The existing behavior defined in TS 23.501 [6] shall apply.

6.7.2.6 Qos

As shown in Annex A, the NAS endpoints between a Remote UE and the network are as currently specified such that the operation via a UE-to-Network Relay UE should be transparent to the network NAS, with the exception of authorization/provisioning identified in clause 6.7.2.4.

This means that the 5GS flow-based QoS concept in particular should be reused between the Remote UE and the network, with necessary adaptation over the radio interface i.e. PC5 (for the Remote UE and UE-to-Network Relay UE) and Uu (for the UE-to-Network Relay UE). RAN performs QoS enforcement for PC5 interface and Uu interfaces when it gets QoS profile from the CN. For example, RAN performs QoS enforcement with AS layer configuration with necessary adaptation over PC5 interface and Uu interface. In other words, QoS flows established between the network and the Remote UE will be mapped to PC5 "radio bearers" seen by the Remote UE and to normal Uu radio bearers seen by the network, whereby the UE-to-Network Relay UE performs the necessary adaptation between Uu and PC5.
 Editor's note: How to perform AS layer configuration for PC5 interface and Uu interface depends on RAN.

6.7.2.7 Mobility 6.7.2.7.1 Mobility Restrictions

The Remote UE is expected to operate within the boundaries of the Mobility Restrictions applicable to the UE to Network Relay UE.

Mobility restriction in CM-IDLE state is executed by the UE based on the information received from the network. For the UE-to-Network Relay case, the Remote UE may not obtain the mobility restrictions related information if Remote UE is out of coverage. The Remote UE can get the mobility restrictions related information, e.g., tracking area, from the Relay UE, and the Remote UE itself performs network selection and access control in CM_IDLE state based on the received information.

RAT Restriction:
 If Remote UE is restricted to use some RAT in a PLMN, the Remote UE is not allowed to access via UE-to-Network Relay using that RAT in that PLMN. If UE-to-Network Relay is restricted to use some RAT in a PLMN, the UE-to-Network Relay is not allowed to perform the Relay operation using that RAT in that PLMN.

Forbidden Area:
  If UE-to-Network Relay is in Forbidden Area, it is not allowed to perform the Relay operation. If the UE-to-Network Relay operates in a Forbidden Area of the Remote UE, the Remote UE is not allowed to access the network via this UE-to-Network Relay.
  A UE-to-Network Relay shall indicate to Remote UEs the Tracking Area of the cell to which the UE-to-Network Relay is connected. The indication is provided during discovery.
Service Area Restriction: Allowed Area, Non-Allowed Area
  Allowed Area applies as is for a UE-to-Network Relay and Remote UE. A UE-to-Network Relay (resp. Remote UE) is allowed to initiate communication with the network (resp. with the network via a UE-to-Network Relay) as allowed by subscription.
  A UE-to-Network Relay may only perform UE-to-Network Relay operation in an Allowed Area.
  Non-allowed Area applies as is for a UE-to-Network Relay and Remote UE. The UE (UE-to-Network Relay or Remote UE) and the network are not allowed to initiate Service Request or SM signalling to obtain user services (both in CM-IDLE and in CM-CONNECTED states). RM procedures for non-3GPP access aspects are not applicable for the Remote UE.
  When the UE-to-Network Relay UE enters a non-allowed Area and the UE-to-Network Relay cannot provide relay service, it may release the PC5 unicast connection with a cause code informing the remote UE of UE-to-Network Relay in Non-allowed area.
  NOTE 1: The above bullet on Service Area Restriction changing due to UE-to-Network Relay's mobility will be evaluated separately from other parts of solution #7.
Core Network Type Restriction:
  The CN type restriction applies as is to a UE-to-Network Relay and Remote UE. A UE-to-Network Relay or Remote UE may only operate as such when not restricted to use 5GC.
Closed Access Group Information:
  A UE permitted (resp. not permitted) to access a CAG cell is implicitly permitted (resp. not permitted) to access this CAG cell as a Remote UE via a UE-to-Network Relay. The Allowed CAG list and CAG-only indication of a UE apply to this UE when it is a Remote UE.
  A UE permitted (resp. not permitted) to access a CAG cell is implicitly permitted (resp. not permitted) to access this CAG cell as a UE-to-Network Relay. The Allowed CAG list and CAG-only indication of a UE apply to this UE when it operates as a UE-to-Network Relay.
  A UE-to-Network Relay shall indicate to Remote UEs the CAG identifiers of the CAG the UE-to-Network Relay is permitted to access via the cell to which it is connected. The indication is provided during discovery.
  A UE-to-Network Relay shall provide its CAG-only indication to Remote UE if the UE-to-Network Relay is only permitted to access a CAG cell. The CAG identifiers and CAG-only indication are provided to Remote UEs for UE-to-Network Relay selection during discovery procedure.
  A UE-to-Network Relay may send an update of the CAG identifiers and CAG-only indication to the remote UEs due to UE-to-Network Relay's mobility or UE-to-Network Relay's configuration change, e.g. UE Configuration Update procedure described in TS 23.502 [8] in clause 4.2.4.2. In this case, the Remote UE may tear down the PC5 connection and re-select another UE-to-Network Relay if the Remote UE determines that it is not allowed anymore to access the network via the current UE-to-Network Relay or may re-select the same UE-to-Network Relay if it is still allowed considering the new configuration.
  NOTE 2: The above two bullets on CAG identifiers changing and CAG-only indication will be evaluated separately from other part of solution 7.

6.7.2.7.2 Other

Mobility of a Remote UE within an NG-RAN node will be handled by the NG-RAN and the UE-to-Network Relay, allowing the Remote UE to maintain service when changing from a direct network connection to an indirect network connection (i.e. via L2 UE-to-Network Relay UE) and vice-versa without 5GC involvement.

Figure 15:
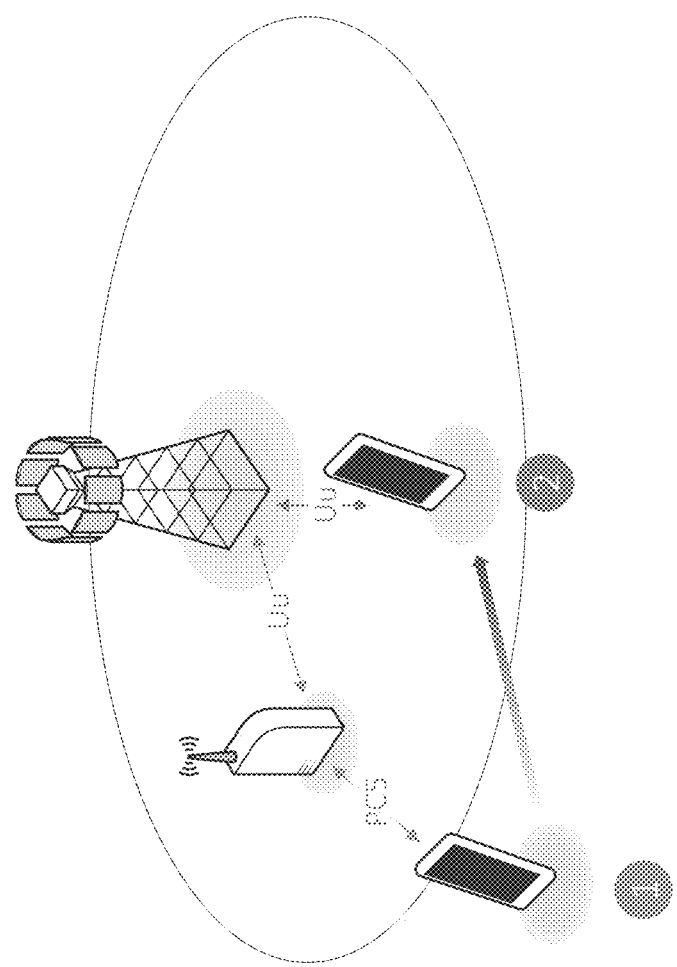
FIG. 15 is a reproduction of FIG. 6.7.2.6-1 of 3GPP TR 23.752 V0.5.1.

[FIG. 6.7.2.6-1 of 3GPP TR 23.752 V0.5.1, Entitled "Intra-NG-RAN Mobility (No 5GC Involvement)", is Reproduced as FIG. 15]

Inter-NG-RAN mobility is depicted below. Mobility is expected to be possible with no impact on NAS and most impact on lower layers i.e. RAN WG2.

Figure 16:
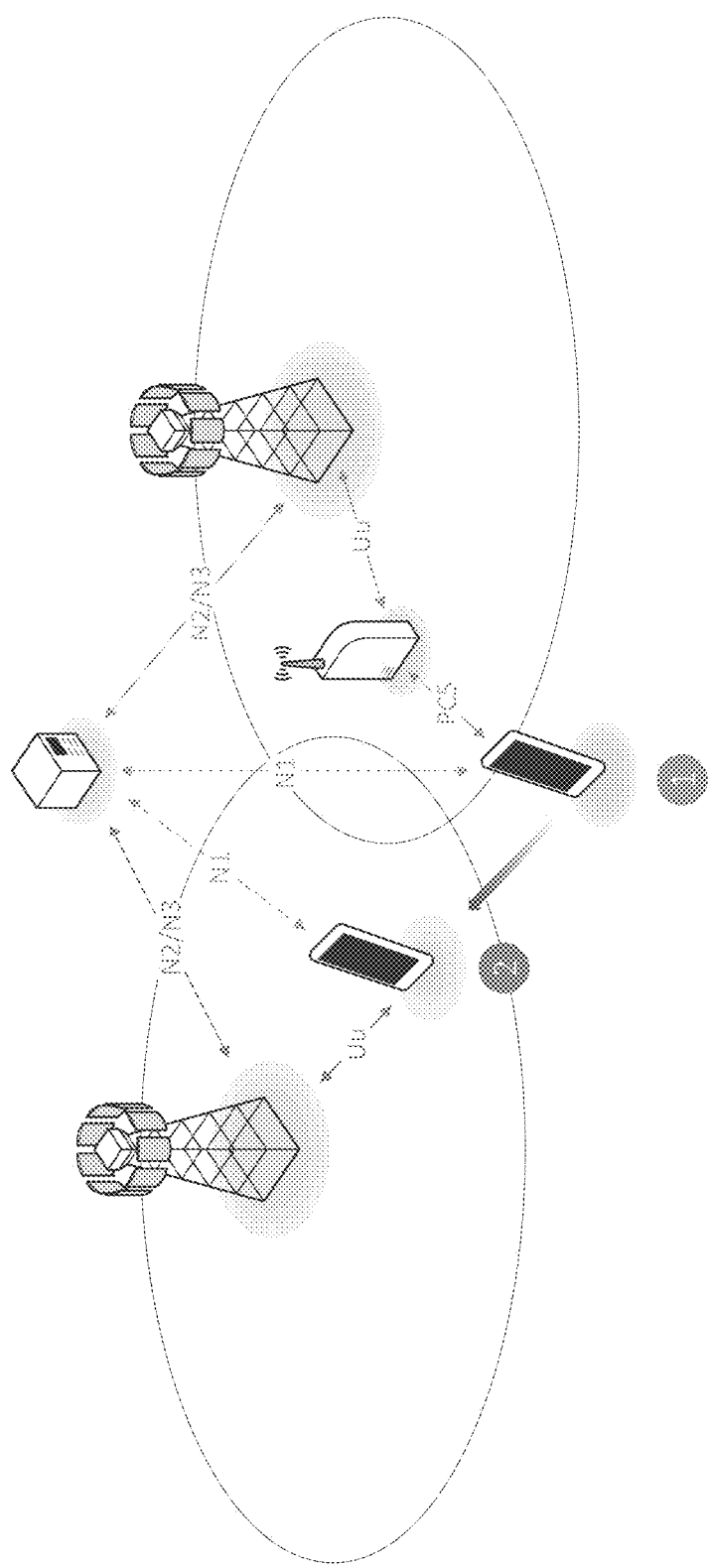
FIG. 16 is a reproduction of FIG. 6.7.2.6-2 of 3GPP TR 23.752 V0.5.1.

[FIG. 6.7.2.6-2 of 3GPP TR 23.752 V0.5.1, Entitled "Inter-NG-RAN Mobility", is Reproduced as FIG. 16]

6.7.2.8 Security

Security (confidentiality and integrity protection) is enforced at the PDCP layer between the endpoints at the Remote UE and the gNB. The PDCP traffic is relayed securely over two links, one between the Remote UE and the UE-to-Network Relay UE and the other between the UE-to-Network Relay UE to the gNB without exposing any of the Remote UE's plaintext data to the UE-to-Network Relay.

UP integrity protection is separated for direct PC5 communication and indirect communication. For indirect communication, the NG-RAN and Remote UE are the nodes that enforce the UP integrity protection for data transmission between NG-RAN and Remote UE.

For direct PC5 communication, the UE-to-Network Relay UE and Remote UE are the nodes that enforce the UP integrity protection for data transmission between UE-to-Network Relay UE and Remote UE.

NOTE: Further analysis of security requirements will be done in SA WG3.

6.7.2.9 UE-to-Network Relay Discovery and Selection

Model A and Model B can be applied for Layer-2 UE-to-Network Relay discovery. The detailed UE-to-Network Relay discovery and selection solution for Layer-2 UE-to-Network Relay could reuse Solution #19, with the difference that slicing and DNN information do not need to be considered. In addition, mobility restrictions related information such as CAG cell and TA may to be included in the discovery message.

Editor's note: How the Relay discovery can be performed with the PLMN selection for the Remote UE will be addressed in separate solution for KI #3.

6.7.2.10 Path Selection

For initial access, Remote UE may perform communication path selection between direct Uu path and indirect Uu path based on the link quality and the configured threshold (pre-configured or provided by NG-RAN). For example, if Uu link quality exceeds configured threshold, the direct Uu path is selected. Otherwise, the indirect Uu path is selected by performing the UE-to-Network Relay discovery and selection.

For path switch case, NG-RAN may perform communication path selection based on the signal level/quality of different paths, which may be based on the path switch solution.

Editor's note: The final solution should be coordinated with RAN WG, and the specific radio criteria and corresponding thresholds are subject to RAN WG definition.

6.7.3 Procedures

Figure 17:
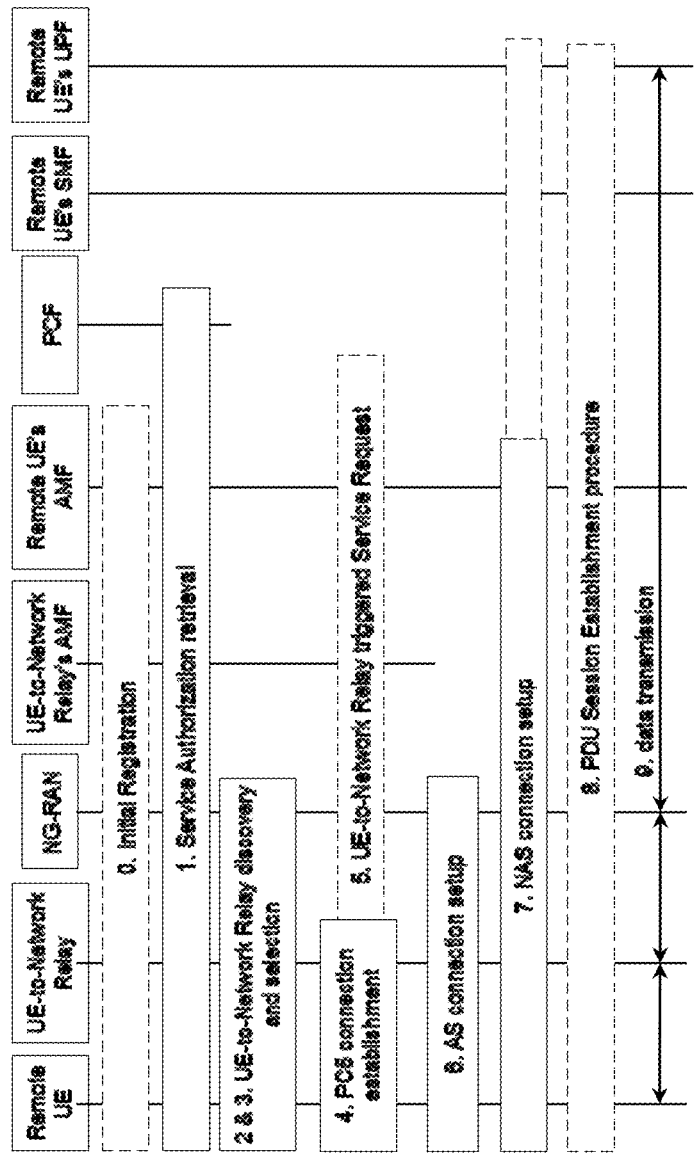
FIG. 17 is a reproduction of FIG. 6.7.3-1 of 3GPP TR 23.752 V0.5.1.

[FIG. 6.7.3-1 of 3GPP TR 23.752 V0.5.1, Entitled "Connection Establishment for Indirect Communication Via UE-to-Network Relay UE", is Reproduced as FIG. 17]

0. If in coverage, the Remote UE and UE-to-Network Relay UE may independently perform the initial registration to the network according to registration procedures in TS 23.502 [8]. The allocated 5G GUTI of the Remote UE is maintained when later NAS signalling between Remote UE and Network is exchanged via the UE-to-Network Relay UE.

NOTE 1: The current procedures shown here assume a single hop relay.

1. If in coverage, the Remote UE and UE-to-Network Relay UE independently get the service authorization for indirect communication from the network. Service authorization and parameters provisioning for UE-to-Network Relay operation are performed for the UE-to-Network Relay UE and Remote UE as specified in clause 6.7.2.4.

If the Remote UE is not in coverage, the pre-configured information will be used. If needed, the PCF could update the authorization information after step 7.

If Remote UE has not performed the Initial Registration, the Remote UE can perform the Initial Registration via the Indirect Network Communication in step 7.

2-3. The Remote UE and UE-to-Network Relay UE perform UE-to-Network Relay UE discovery and selection. Relay UE can perform UE-to-Network Relay discovery in both CM_IDLE and CM_CM-CONNECTED.

For details of UE-to-Network Relay discovery and selection for Layer-2 UE-to-Network Relay see clause 6.7.2.9 and Solution #19, Solution #41.

4. Remote UE initiates a one-to-one communication connection with the selected UE-to-Network Relay UE over PC5 using the procedure as described in TS 23.287 [5].

5. If the UE-to-Network Relay UE is in CM_IDLE state, triggered by the communication request received from the Remote UE, the UE-to-Network Relay UE sends a Service Request message to its serving AMF.

The Relay's AMF may perform authentication of the UE-to-Network Relay UE based on NAS message validation and if needed the AMF will check the subscription data.

How to keep the Relay UE in CM_CONNECTED state is proposed in the clause 6.7.2.5.2.

6. Remote UE sends AS messages to the NG-RAN via the UE-to-NW Relay UE, to establish an AS Connection with the same NG-RAN serving the Relay UE.

7. Remote UE sends a NAS message to the serving AMF. The NAS message is encapsulated in an RRC message that is sent over PC5 to the UE-to-Network Relay UE, and the UE-to-Network Relay UE forwards the message to the NG-RAN. The NG-RAN derives Remote UE's serving AMF and forwards the NAS message to this AMF.

If Remote UE has not performed the initial registration to the network in step 0, the NAS message is initial registration message. Otherwise, the NAS message is either a service request message, or a mobility or periodic Registration message.

Editor's note: How the UE-to-Network Relay UE forwards the message to the NG-RAN depends on RAN specified L2 relay method.

If the Remote UE performs initial registration via the UE-to-Network relay, the Remote UE's serving AMF may perform authentication of the Remote UE based on NAS message validation and if needed the Remote UE's AMF checks the subscription data.

For service request case, User Plane connection for PDU Sessions can also be activated. The other steps follow the clause 4.2.3.2 in TS 23.502 [8].

8. Remote UE may trigger the PDU Session Establishment procedure as defined in clause 4.3.2.2 of TS 23.502 [8]. Remote UE allowed PDU session related attributes while operating via the UE-to-NW Relay UE are provided during the registration procedure or through pre-configuration as described in step 0.

9. The data is transmitted between Remote UE and UPF via UE-to-Network Relay UE and NG-RAN. The UE-to-Network Relay UE forwards all the data messages between the Remote UE and NG-RAN using RAN specified L2 relay method.

NOTE 2: If the UE-to-Network Relay disconnects, the NG-RAN will trigger the AN release procedure of the Remote UE and the Remote UE goes to CM-IDLE.

6.7.4 Impacts on Services, Entities and Interfaces

The solution has impacts in the following entities:

AMF:
  Not initiate the release of the signalling connection based on authorization of Relay UE.

RAN:
  Needs to support L2 relay functionality for forwarding the signalling and user data of the Remote UE.
  (If paging option 2 of TR 36.746 is confirmed by RAN WG2), RAN needs to handle paging request for Remote UE when the Relay UE is CM-CONNECTED.

UE-to-Network Relay UE:
  Needs to support L2 relay functionality for forwarding the signalling and user data between the Remote UE and RAN.
  (If paging option 2 of TR 36.746 is confirmed by RAN WG2) need to monitor multiple paging occasions for itself and the remote UEs.

[ ... ]

6.41 Solution #41: Combination of Relay selection and PLMN selection for Layer 2 based UE-to Network relay 6.41.1 Description In Layer-2 based UE-to-Network relay solution proposed as solution #7, the Remote UE is connected to the AN and CN via the Relay with end-to-end PDAP layer. The solution can also support Remote UE and Relay UE is from different PLMNs when RAN sharing is deployed, which is can be shown in the following FIG. 6.41.1-1, in which the redline means the Relay communicates with 5GC_relay and the blue redline means the Remote UE traffic routing. In order to implement Layer-2 relay the UE-to Network Relay needs to initiate Service Request procedure and establish relay bearer on Uu interface. This will consume the Relay's CN resource and potential AN resource (AN resource should be confirmed be RAN2.). It is assumed whether the Remote's traffic can be relayed by the Relay should be authorized according to the inter-PLMN agreements.

Meanwhile, for Layer-2 based relay, the Remote UE NAS layer will perform PLMN selection as usual and candidate PLMN for PLMN selection should be authorized for performing Layer-2 based UE-to-Network Relay.

Figure 18:
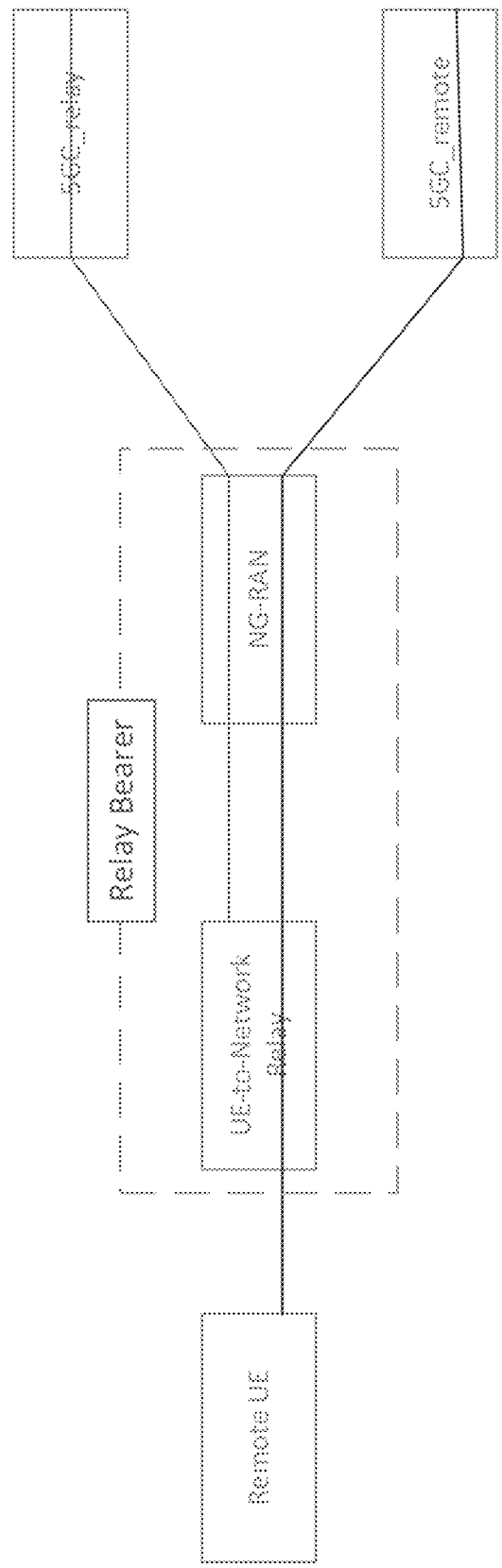
FIG. 18 is a reproduction of FIG. 6.7.3-1 of 3GPP TR 23.752 V0.5.1.

[FIG. 6.41.1-1 of 3GPP TR 23.752 V0.5.1, Entitled "Inter-PLMN Layer-2 Relay in Case RAN Sharing", is Reproduced as FIG. 18]

The key points of the solution is listed as following:
The Remote UE is authorized the PLMNs information which can be the relay PLMNs.
It is assumed Model A and Model B discovery procedure is used to discover a Relay.
The Relay indicates the serving PLMN information in discovery announce/response message;
The Relay forwards the System Information information (including PLMN) received from the system information of the cell.
Editor's note: It is assumed the Relay in CONNECTED needs to acquire the latest System Information and this needs to be confirmed by RAN2.
The ProSe layer of the Remote UE checks whether the PLMN in the discovery announce/response message is authorized to be the relay PLMN, if yes, the ProSe layer further checks the authorized PLMNs in the System Information message. The ProSe layer forwards the authorized PLMNs information to the NAS layer; otherwise, the ProSe layer does not forward the PLMN information to the NAS layer.
The NAS layer of the Remote UE performs PLMN selection, and indicates to the ProSe layer the selected PLMN information.
The ProSe layer of the Remote UE selects the Relay which forwards the System Information including the indicated PLMN information from NAS layer.
The illustrated procedure can be shown in FIG. 6.41.1-2.

Figure 19:
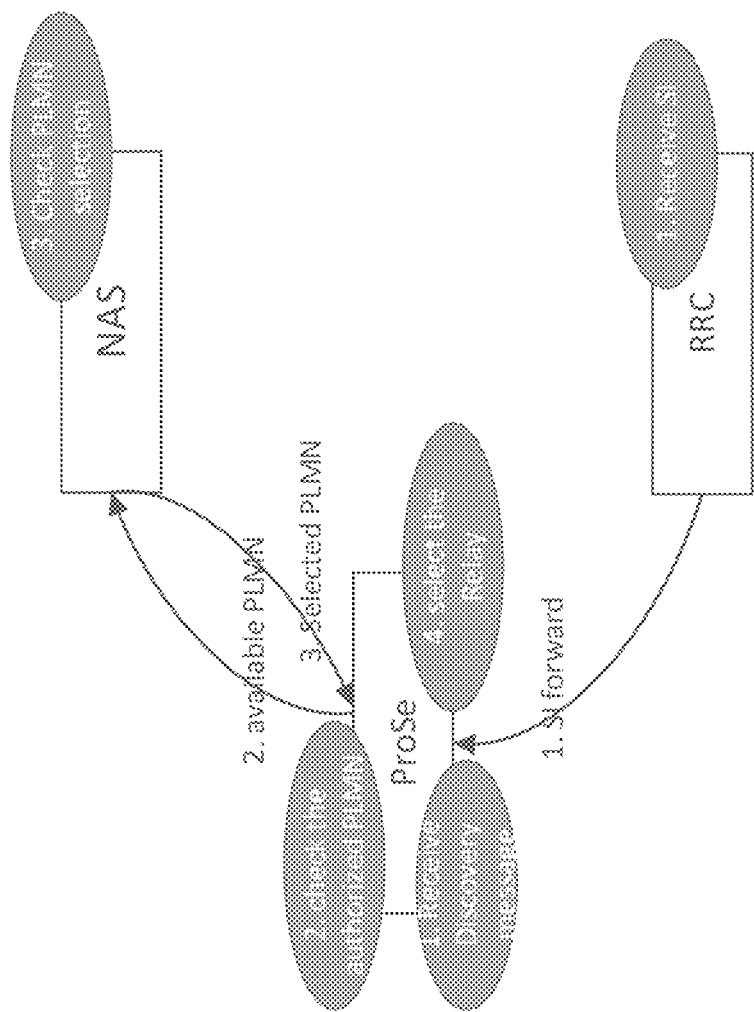
FIG. 19 is a reproduction of FIG. 6.41.1-2 of 3GPP TR 23.752 V0.5.1.

[FIG. 6.41.1-2 of 3GPP TR 23.752 V0.5.1, Entitled "Illustration of PLMN Selection and Relay Selection Combination in Remote UE", is Reproduced as FIG. 19]

Here is one example to further explain the procedure.
Step 0: The Remote UE is authorized the relay PLMN information: PLMN 1, 2, 3, 4, 5, 7, 8 (as yellow highlighted in Table 6.41.1-1) and PLMN 6 is not authorized for relay.
Step 1: The Remote discovers Relay-1, Relay-2, Relay-3, the PLMN information each Relay indicated in Discovery message and System Information as following Table 6.41.1-1.

[Table 6.41.1-1 of 3GPP TR 23.752 V0.5.1, Entitled "PLMN Information in Discovery Message and System Information", is Reproduced as FIG. 20]

Step 2: The ProSe layer of the Remote UE check the authorized PLMN information for each Relay. Relay-1' serving PLMN (PLMN 1) is authorized PLMN, Relay-2's serving PLMN (PLMN 6) is not authorized PLMN, Relay-3's serving PLMN (PLMN 5) is authorized PLMN, then the ProSe layer forwards PLMN 1, 2, 3, 4, 5 as available PLMN to NAS layer.
Step 3: NAS layer of the Remote UE performs PLMN selection, selects PLMN 2, indicates to ProSe layer.
Step 4: The ProSe layer of the Remote UE will select Relay-1 as the Relay.
NOTE: The Remote UE can further select a Relay according to other information before or after PLMN determination in this solution.

6.41.2 Procedures
The Model A and Model B for KI #1 and authorization procedure for KI #8 is reused.

6.41.3 Impacts on Services, Entities and Interfaces
The Remote UE is authorized the PLMNs information for relay.
The Relay UE indicates the serving PLMN information in discovery message.
The Relay UE forwards the System Information of the camped cell including the supported PLMNs.
The Remote UE checks whether the Relay's PLMN is authorized for relay, and only the authorized PLMNs can be the available PLMNs for NAS PLMN selection.
The Remote UE selects the Relay based on the selected PLMN by NAS layer.
3GPP R2-2008922 introduces the following:
1. Introduction
After RAN2 #111-e meeting, the long email discussion "[Post111-e] [627] [Relay] Remaining issues on L2 architecture" was discussed [1]. The proposals of on-demand SI delivery for Remote UE were as below:

---

Proposal-30: agree the following description for L2 UE-to-NW relay (also reflected by TP)
  Relay UE can support the relaying of the system information to the Remote UE(s) and what system information can be relayed to Remote UEs can be discussed at normative phase.
Proposal-31: agree the following description for L2 UE-to-NW relay (also reflected by TP)
  Relay UE can forward the received system information to Remote UEs via broadcast or groupcast.
Proposal-32 [Easy]: agree the following description for L2 UE-to-NW relay (also reflected by TP)
  Relay UE can forward the system information to Remote UE via dedicated PC5-RRC signaling and the detailed mechanisms of PC5-RRC signaling design can be discussed in WI stage.
Proposal-33: agree the following on-demand SI delivery principles for Remote UE for L2 UE-to-NW relay (also reflected by TP)
  On-demand SI request is supported for Remote UE for all RRC states (Idle/Inactive/Connected state).
  Only Msg3 based on-demand SI request is supported for Remote UE during Idle or Inactive mode; For connected Remote UE, only on-demand SIB request (i.e. dedicatedSIBRequest) is supported as Rel-16.
  The legacy Uu RRC procedure is reused to support the Remote UE's on-demand SI request.
  On-demand SI delivery is supported for the Remote UE(s) regardless of out-of-coverage or in-coverage, when connected with Relay UE.
Proposal-34: RAN2 further discuss PC5-RRC message based SIB notification from Remote UE to the Relay UE for L2 UE-to-UE Relay at WI phase.

In this contribution, we discuss on-demand SI delivery principles for Remote UE.

2. Discussion

In [1], on-demand SI principles for remote UE are proposed as below:

---

Proposal-33: agree the following on-demand SI delivery principles for Remote UE for L2 UE-to-NW relay (also reflected by TP)
  On-demand SI request is supported for Remote UE for all RRC states (Idle/Inactive/Connected state).
  Only Msg3 based on-demand SI request is supported for Remote UE during Idle or Inactive mode; For connected Remote UE, only on-demand SIB request (i.e. dedicatedSIBRequest) is supported as Rel-16.
  The legacy Uu RRC procedure is reused to support the Remote UE's on-demand SI request.
  On-demand SI delivery is supported for the Remote UE(s) regardless of out-of-coverage or in-coverage, when connected with Relay UE.

---

In Uu interface, UE supports on-demand SI for all RRC states. The remote UE accesses to network via U2N relay should be treated as a normal UE as much as possible. Therefore, the first principle is reasonable.

Although when the remote UE is in coverage, it can acquire the SI from gNB directly. However, the remote UE and the relay UE may be in different cells. The remote UE can acquire the SIBs of the relay UE's serving cell via on-demand SI manner. Besides this case, on-demand SI for remote UE can also be used for OOC remote UE. Therefore, the fourth principle is reasonable.

For the second and third principles, they should be discussed further.

The Uu on-demand SI procedures for RRC_Connected and for Idle/Inactive states are different. Hence, on-demand SI principles for remote UE should be discussed for RRC_Connected and for Idle/Inactive separately.

In rel-16, the on-demand SI procedure in RRC_Connected is supported. The dedicatedSIBRequest message is introduced to request SIB(s) required by the UE in RRC_Connected. Upon receiving the on-demand SIB request by the UE, the network responds with either an RRCReconfiguration message that includes the requested SIBs (if these are send via dedicated signalling) or broadcast. For the case that the network responds with an RRCReconfiguration message, the on-demand SI procedure in RRC_Connected can be reused for connected remote UE. If the network responds with broadcast, the situation is similar to Idle/Inactive remote UE.

Proposal 1: For Connected remote UE, on-demand SI in RRC_Connected that both SIB request and respond via dedicated signaling can be reused.

For Idle/Inactive remote UE, both Msg1 and Msg3 based on-demand SI can't work.

For Msg1 based on-demand SI, since Uu preamble of remote UE can't be relayed, it can't be used for remote UE.

For Msg3 based on-demand SI, it also can't be used for remote UE, even though RRCSystemInfoRequest message of the remote UE can be relayed to gNB using the same scheme as the first RRC message for connection establishment from Remote UE with gNB. The reasons are as below:

1. The remote UE Can't receive Msg4.

The remote UE has not TEMPORARY_C-RNTI since Msg1 and Msg2 procedure are absent before Msg3. Hence, the relay UE doesn't know whether the PDCCH is addressed to the remote UE. Further, the UE Contention Resolution Identity MAC CE is a MAC PDU, the relay UE can't relay Uu MAC CE to the remote UE since MAC layer isn't end-to-end between remote UE and gNB.

2. The remote UE Can't acquire the requested SI message.

It is obviously that the remote UE can't monitor the updated SIB1 and receive the SI message by itself. If the remote UE want to let the relay UE to do it, it shall inform the whole information (including request SI) to relay UE, i.e. on-demand SI message shall be introduced in PC5 between remote UE and relay UE. Since the PC5 on-demand SI procedure should be introduced, it is unnecessary to specify that the SIB acquire procedure in Uu is requested by remote UE. In other word, it isn't the legacy Msg3 based on-demand SI. The on-demand SI for remote UE is divided to 2 parts; one is on-demand SI procedure between remote UE and relay UE, the other one is SI acquire procedure of relay UE.

Observation 1: Both Msg1 and Msg3 based on-demand SI can't be used for remote UE.

Proposal 2: On-demand SI for remote UE should be divided into 2 parts; one is on-demand SI procedure between remote UE and relay UE, the other one is SI acquires procedure of relay UE.

Proposal 3: On-demand SI procedure should be introduced in PC5 between remote UE and UE-to-Network relay.

Whether the relay UE needs to request the SI/SIB(s) requested by the remote UE from gNB depending on whether the relay UE has stored a valid version of the SI/SIB(s) requested by remote UE. If the relay UE has stored a valid version of the SI/SIB(s), it can directly forward it to the remote UE; otherwise, the relay UE can request the SI/SIB(s) from the gNB using legacy Uu procedure and then forward it to the remote UE. How to transmit the SI/SIB(s) on PC5 can be further discussed in WI phase.

Proposal 4: Relay UE acquires SI/SIB from the gNB using legacy Uu procedure.

The on-demand SI principles for remote UE can be summarized in proposal 5.

Proposal 5: on-demand SI principles for remote UE are as below:

On-demand SI request is supported for Remote UE for all RRC states (Idle/Inactive/Connected state).
  On-demand SI procedure should be introduced in PC5 between remote UE and UE-to-Network relay.
  "For Connected remote UE, on-demand SI in RRC_Connected that both SIB request and respond via dedicated signaling can be reused.
  " On-demand SI delivery is supported for the Remote UE(s) regardless of out-of-coverage or in-coverage, when connected with Relay UE.

The 3GPP RAN2 #112e Chairman's notes have the following agreements:

| Agreements: | |
|---|---|
| Proposal 1 | [easy]For L2 U2N Relay, RRC_INACTIVE state is supported for remote UE |
| Proposal 2 | [easy]For L2 U2N Relay, RRC_INACTIVE state is supported for relay UE |

-continued

| Agreements: |
| --- |

| | |
| --- | --- |
| Proposal 3 | [easy]For L2 U2N Relay, the RRC states combination of remote UE in RRC_CONNECTED and relay UE in RRC_IDLE is excluded |
| Proposal 4 | [easy]For L2 U2N Relay, the RRC states combination of remote UE in RRC_CONNECTED and relay UE in RRC_INACTIVE is excluded |
| Proposal 6 | [easy]For L2 U2N Relay, the RRC states combination of remote UE in RRC_INACTIVE and relay UE in RRC_CONNECTED is supported |
| Proposal 8 | [easy]For L2 U2N Relay, the RRC states combination of remote UE in RRC_INACTIVE and relay UE in RRC_INACTIVE is supported |
| Proposal 9 | [easy]For L2 U2N Relay, the RRC states combination of remote UE in RRC_IDLE and relay UE in RRC_INACTIVE is supported |

| Agreements: |
| --- |

Proposal-1: [Easy] agree the following description for L2 UE-to-NW relay
For L2 UE-to-NW relay, the Uu adaptation layer at Relay UE supports UL bearer mapping between ingress PC5 RLC channels for relaying and egress Uu RLC channels over the Relay UE Uu path.
Proposal-2: [Easy] agree the following description for L2 UE-to-NW relay
The different RBs of the same Remote UE and/or different Remote UEs can be subject to N:1 mapping and data multiplexing over Uu RLC channel
Proposal-3: [Easy] agree the following description for L2 UE-to-NW relay
For L2 UE-to-NW relay, Uu adaptation layer is used to support Remote UE identification for the UL traffic (multiplexing the data coming from multiple Remote UE).
Proposal-6: [Easy] agree the following description for L2 UE-to-NW relay
The Uu adaptation layer can be used to support DL bearer mapping at gNB to map end-to-end Radio Bearer (SRB, DRB) of Remote UE into Uu RLC channel over Relay UE Uu path
Proposal-15: [Easy] agree the following description for L2 UE-to-UE relay
For L2 UE-to-UE relay, the second hop PC5 adaptation layer can be used to support bearer mapping between the ingress RLC channels over first PC5 hop and egress RLC channels over second PC5 hop at Relay UE.
Proposal-25 [Easy]: agree the following description for L2 UE-to-NW relay
gNB implementation can handle the QoS breakdown over Uu and PC5 for the end-to-end QoS enforcement of a particular session established between Remote UE and network in case of L2 based UE to Network relaying. Details of handling in case PC5 RLC channels with different e2e QoS are mapped to the same Uu RLC channel can be discussed in WI phase.
Proposal-26 [Easy]: agree the following description for L2 UE-to-UE relay
QoS handling for L2 UE-to-UE Relay is subject to upper layer, e.g. solution 31 within TR23.752 studied by SA2.
Proposal-32 [Easy] [merging P31]: agree the following description for L2 UE-to-NW relay
Relay UE can forward the system information to Remote UE via broadcast, groupcast, or dedicated PC5-RRC signalling. The detailed mechanisms of broadcast, groupcast and PC5-RRC signalling design can be discussed in WI stage.
Proposal-35 [Easy]: agree the following access control check principles for L2 UE-to-NW relay
▫ The Relay UE may provide UAC parameters to Remote UE
▫ The access control check is performed at Remote UE using the parameters of the cell it intends to access.
▫ The UE-to-Network Relay UE does not perform access control check for the Remote UE's data.

| Agreements: |
| --- |

Proposal-5 (merging P4): agree the following description for L2 UE-to-NW relay
The identity information of Remote UE Uu Radio Bearer and Remote UE is included in the Uu adaptation layer at UL in order for gNB to correlate the received data packets for the specific PDCP entity associated with the right Remote UE Uu Radio Bearer of a Remote UE.
Proposal-7: agree the following description for L2 UE-to-NW relay
The Uu adaptation layer can be used to support DL N:1 bearer mapping and data multiplexing between multiple end-to-end Radio Bearers (SRBs, DRBs) of a Remote UE and/or different Remote UEs and one Uu RLC channel over the Relay UE Uu path
Proposal-8: agree the following description for L2 UE-to-NW relay
The Uu adaptation layer needs to support Remote UE identification for Downlink traffic

| Agreements: |
|---|
| Proposal-10 (merging P9): agree the following description for L2 UE-to-NW relay
The identity information of Remote UE Uu Radio Bearer and the identity information of Remote UE needs be put into the Uu adaptation layer by gNB at DL in order for Relay UE to map the received data packets from Remote UE Uu Radio Bearer to its associated PC5 RLC channel.
Proposal-21: agree the following description for L2 UE-to-UE relay
Support the N:1 mapping by first hop PC5 adaptation layer between Remote UE SL Radio Bearers and first hop PC5 RLC channels for relaying.
Proposal-22: agree the following description for L2 UE-to-UE relay
Support the adaptation layer over first hop PC5 between Source Remote UE and Relay UE in order to identify traffic destined to different Destination Remote UEs. |

| Agreements: |
|---|
| Proposal 1a: Capture both the protocol stacks with and without PC5 adaptation layer for L2 UE-to-Network relay as candidate solutions in the TR, leave the down selection to WI phase (assuming down-selection first before studying too much on the detailed PC5 adaptation layer functionalities).
Proposal 1b: In the TR sec. 4.5.1.1, remove the Editor Note: "It is FFS if the adaptation layer is also supported at the PC5 interface between Remote UE and Relay UE.". Add normal text "Whether the adaptation layer is also supported at the PC5 interface between Remote UE and Relay UE is left to WI phase."
Proposal 2a: For L2 UE-to-UE relay, adaptation layer support the N:1 bearer mapping between multiple ingress PCS RLC channels over first PCS hop and one egress PCS RLC channel over second PCS hop and support the Remote UE identification function.
Proposal 2b: In the TR sec. 5.5.1, remove the Editor Note: "It is FFS on the details to support the N-to-1 mapping between the ingress RLC channels from multiple transmitting Remote UEs to egress RLC channels (going to the same Destination UE) at Relay UE."
Proposal 2c: For L2 UE-to-UE relay, the identity information of Remote UE end-to-end Radio Bearer is included in the adaptation layer in first and second PC5 hop.
Proposal 2d: In addition, the identity information of Source Remote UE and/or the identity information of Target Remote UE are candidate information to be included in the adaptation layer, which is decided in WI phase.
Proposal 3: For L2 UE-to-UE relay connection establishment procedure, capture in the TR that "R2 consider the 5A2 solution in TR 23.752 as baseline". Further R2 impacts can be discussed in WI phase, if any.
Proposal 4: For L2 UE-to-NW relay, relay UE can support the relaying of the system information to the Remote UE(s) and what system information can be relayed to Remote UEs can be discussed at normative phase. On-demand SI request is supported for Remote UE for all RRC states (Idle/Inactive/Connected state).
Proposal 5: In L2 U2N relay, the paging relaying solution apply to both CN paging and RAN paging via option 2.
Proposal 6a: For L2 UE-to-Network relay, the RRC reconfiguration and RRC connection release procedures can reuse the legacy RRC procedure, with the message content/configuration design left to WI phase.
Proposal 6b: For L2 UE-to-Network relay, the RRC connection re-establishment and RRC connection resume procedures can reuse the legacy RRC procedure as baseline, by considering the agreed "connection establishment procedure of L2 UE-to-NW relay" to handle the relay specific part, with the message content/configuration design left to WI phase.
Proposal 7: In the TR sec. 4.5.5.1, remove the Editor Note: "It is FFS if this PCS L2 configuration is a default configuration that can be overridden."
Proposal 8: In the TR sec. 5.5.1, remove the Editor Note: "It is FFS if the adaptation layer is also supported over the first PCS link (i.e. the PCS link between the transmitting Remote UE and Relay UE)."
Proposal 9: In the TR sec. 4.5.1.2, remove the Editor Note: "It is FFS if N-to-1 bearer mapping from PC5 RLC channels to Uu interface RLC channel is supported for this case." |

| Agreement: |
|---|
| Proposal-27: agree the following description for connection establishment procedure of L2 UE-to-NW relay:
Step 1. The Remote and Relay UE perform discovery procedure, and establish PC5-RRC connection using the legacy Rel-16 procedure as a baseline. |

| Agreement: |
|---|
| Step 2. The Remote UE sends the first RRC message (i.e. RRCSetupRequest) for its connection establishment with gNB via the Relay UE, using a default L2 configuration on PC5. The gNB responds with an RRCSetup message to Remote UE. The RRCSetup delivery to the Remote UE uses the default configuration for L2 on PC5. If the relay UE had not started in RRC_CONNECTED, it would need to do its own connection establishment as part of this step. The details for Relay UE to forward the RRCSetupRequest/RRCSetup message for Remote UE at this step can be discussed in WI phase.<br>Step 3. The gNB and Relay UE perform relaying channel setup procedure over Uu. According to the configuration from gNB, the Relay/Remote UE establishes an RLC channel for relaying of SRB1 towards the Remote UE over PC5. This step prepares the relaying channel for SRB1.<br>Step 4. Remote UE SRB1 message (e.g. an RRCSetupComplete message) is sent to the gNB via the Relay UE using SRB1 relaying channel over PC5. Then the Remote UE is RRC connected over Uu.<br>Step 5. The Remote UE and gNB establish security following legacy procedure and the security messages are forwarded through the Relay UE.<br>Step 6. The gNB sets up additional RLC channels between the gNB and Relay UE for traffic relaying. According to the configuration from gNB, the Relay/Remote UE sets up additional RLC channels between the Remote UE and Relay UE for traffic relaying. The gNB sends an RRCReconfiguration to the Remote UE via the Relay UE, to set up the relaying SRB2/DRBs. The Remote UE sends an RRCReconfigurationComplete to the gNB via the Relay UE as a response. |

3GPP TS 23.502 introduces the following:
4.2.2 Registration Management Procedures
4.2.2.1 General The Registration and Deregistration procedures in clause 4.2.2 provides the required functionality to register or deregister a UE/user with the 5GS. Additional functionality to support Registration Management for non-3GPP access is defined in clause 4.12. Additional functionality to support Registration Management for specific services such as SMS over NAS is defined in clause 4.13.

4.2.2.2 Registration Procedures
4.2.2.2.1 General

A UE needs to register with the network to get authorized to receive services, to enable mobility tracking and to enable reachability. The UE initiates the Registration procedure using one of the following Registration types:

Initial Registration to the 5GS;
Mobility Registration Update upon changing to a new Tracking Area (TA) outside the UE's Registration Area in both CM-CONNECTED and CM-IDLE state, or when the UE needs to update its capabilities or protocol parameters that are negotiated in Registration procedure with or without changing to a new TA, a change in the UE's Preferred Network Behaviour that would create an incompatibility with the Supported Network Behaviour provided by the serving AMF, or when the UE intends to retrieve LADN Information; or
Periodic Registration Update (due to a predefined time period of inactivity); or
Emergency Registration.

The General Registration call flow in clause 4.2.2.2.2 applies on all these Registration procedures, but the periodic registration need not include all parameters that are used in other registration cases.

The following are the cleartext IEs, as defined in TS 24.501 that can be sent by the UE in the Registration Request message if the UE has no NAS security context:
Registration type
SUCI or 5G-GUTI or PEI
Security parameters
additional GUTI 4G Tracking Area Update
the indication that the UE is moving from EPS.

Aspects related to dual registration in 3GPP and non-3GPP access are described in clause 4.12. The general Registration call flow in clause 4.2.2.2.2 is also used for the case of registration in 3GPP access when the UE is already registered in a non-3GPP access, and vice versa. Registration in 3GPP access when the UE is already registered in a non-3GPP access scenario may require an AMF change, as further detailed in clause 4.12.8.

The general Registration call flow in clause 4.2.2.2.2 is also used by UEs in limited service state (see TS 23.122 [22]) registering for emergency services only (referred to as Emergency Registration), see TS 23.501 [2] clause 5.16.4.

During the initial registration the PEI is obtained from the UE. If the AMF needs the PEI in the initial registration, it should retrieve the PEI as it establishes the NAS security context with a Security Mode Command. The AMF operator may check the PEI with an EIR. The AMF passes the PEI to the UDM, to the SMF and the PCF, then UDM may store this data in UDR by Nudr_SDM_Update.

NOTE 1: The use of NSI ID in the 5GC is optional and depends on the deployment choices of the operator.

During the registration the Home Network can provide Steering of Roaming information to the UE via the AMF (i.e. a list of preferred PLMN/access technology combinations or HPLMN indication that 'no change of the "Operator Controlled PLMN Selector with Access Technology" list stored in the UE is needed). The Home Network can include an indication for the UE to send an acknowledgement of the reception of this information. Details regarding the handling of Steering of Roaming information including how this information is managed between the AMF and the UE are defined in TS 23.122 [22].

The AMF determines Access Type and RAT Type as defined in TS 23.501 [2] clause 5.3.2.3.

3GPP TR 38.836 introduces following:
4.5.1 Architecture and Protocol Stack
4.5.1.1 Protocol Stack The protocol stacks for the user plane and control plane of L2 UE-to-Network Relay architecture are described in FIG. 4.5.1.1-1 and FIG. 4.5.1.1-2.

For L2 UE-to-Network Relay, the adaptation layer is placed over RLC sublayer for both CP and UP at the Uu interface between Relay UE and gNB. The Uu SDAP/PDCP and RRC are terminated between Remote UE and gNB, while RLC, MAC and PHY are terminated in each link (i.e. the link between Remote UE and UE-to-Network Relay UE and the link between UE-to-Network Relay UE and the gNB).

Editor note: It is FFS if the adaptation layer is also supported at the PC5 interface between Remote UE and Relay UE.

Figure 21:
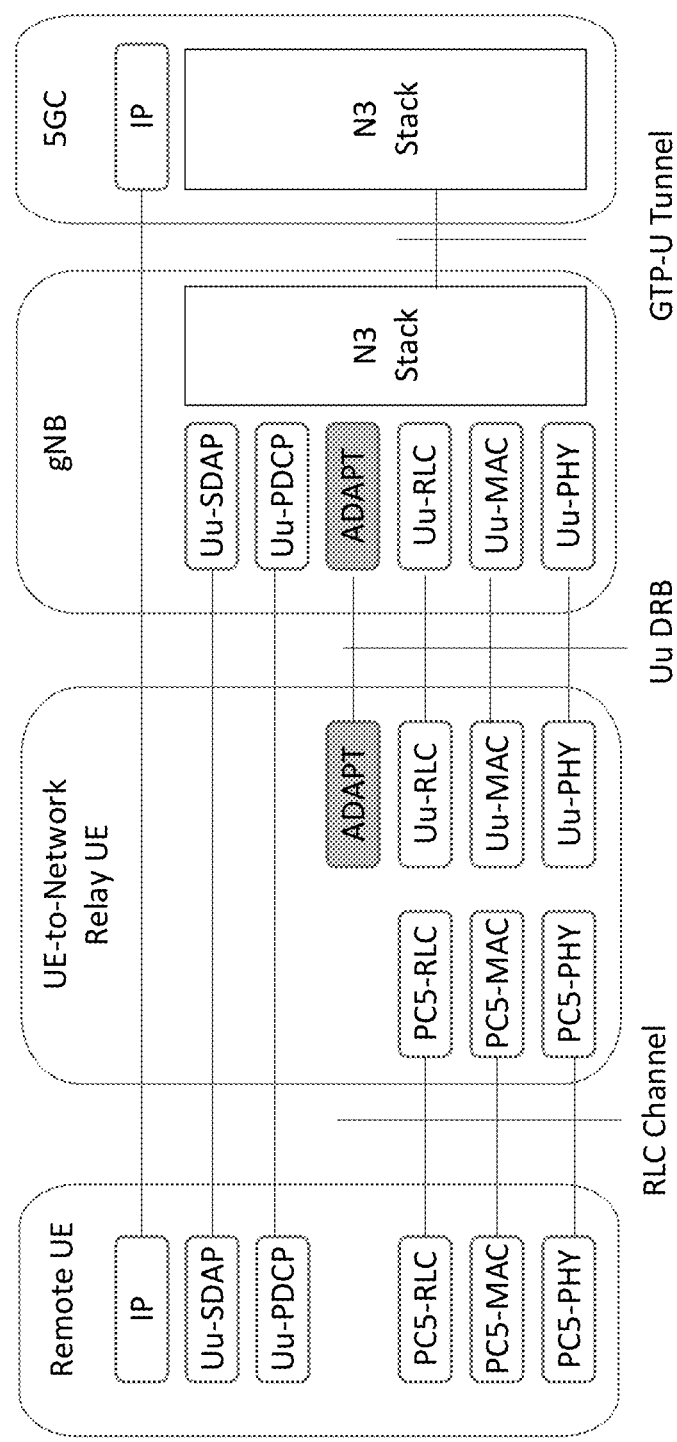
FIG. 21 is a reproduction of FIG. 4.5.1.1-1 of 3GPP TR 38.836 V0.1.1.

[FIG. 4.5.1.1-1 of 3GPP TR 38.836 V0.1.1, Entitled "User Plane Stack for L2 UE-to-Network Relay", is Reproduced as FIG. 21]

Figure 22:
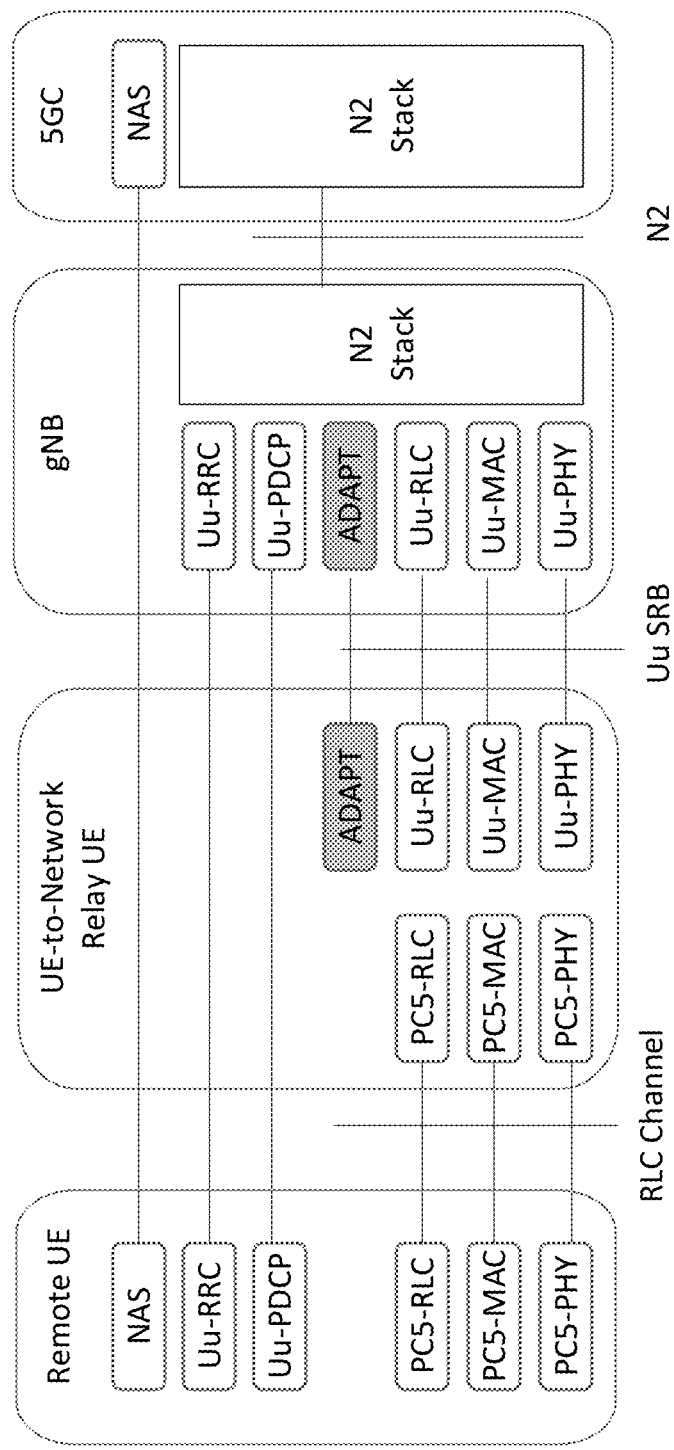
FIG. 22 is a reproduction of FIG. 4.5.1.1-2 of 3GPP TR 38.836 V0.1.1.

[FIG. 4.5.1.1-2 of 3GPP TR 38.836 V0.1.1, Entitled "Control Plane Protocol Stack for L2 UE-to-Network Relay", is Reproduced as FIG. 22]

4.5.1.2 Adaptation Layer Functionality

As a working assumption, some information about a Remote UE is put within the header of the adaptation layer to enable bearer mapping for L2 UE-to-Network relay and the details can be discussed at WI phase.

Editor note: It is FFS if N-to-1 bearer mapping from PC5 RLC channels to Uu interface RLC channel is supported for this case.

[ . . . ]

5.5.1 Architecture and Protocol Stack

For L2 UE-to-UE Relay architecture, the protocol stacks are similar to L2 UE-to-Network Relay other than the fact that the termination points are two Remote UEs. The protocol stacks for the user plane and control plane of L2 UE-to-UE Relay architecture are described in FIG. 5.5.1-1 and FIG. 5.5.1-2.

An adaptation layer is supported over the second PC5 link (i.e. the PC5 link between Relay UE and Destination UE) for L2 UE-to-UE Relay. For L2 UE-to-UE Relay, the adaptation layer is put over RLC sublayer for both CP and UP over the second PC5 link. The sidelink SDAP/PDCP and RRC are terminated between two Remote UEs, while RLC, MAC and PHY are terminated in each PC5 link.

Editor note: It is FFS if the adaptation layer is also supported over the first PC5 link (i.e. the PC5 link between the transmitting Remote UE and Relay UE).

Figure 23:
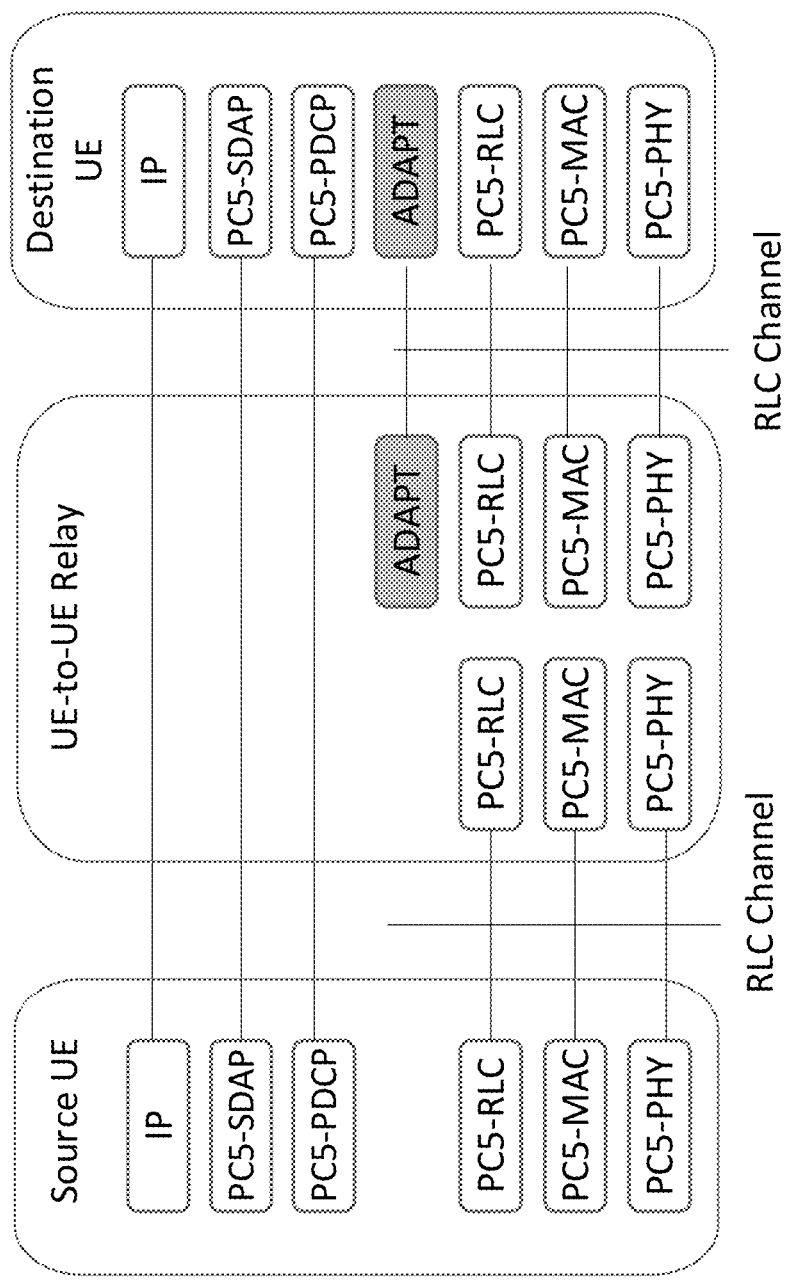
FIG. 23 is a reproduction of FIG. 5.5.1-1 of 3GPP TR 38.836 V0.1.1.

[FIG. 5.5.1-1 of 3GPP TR 38.836 V0.1.1, Entitled "User Plane Protocol Stack for L2 UE-to-UE Relay", is Reproduced as FIG. 23]

Figure 24:
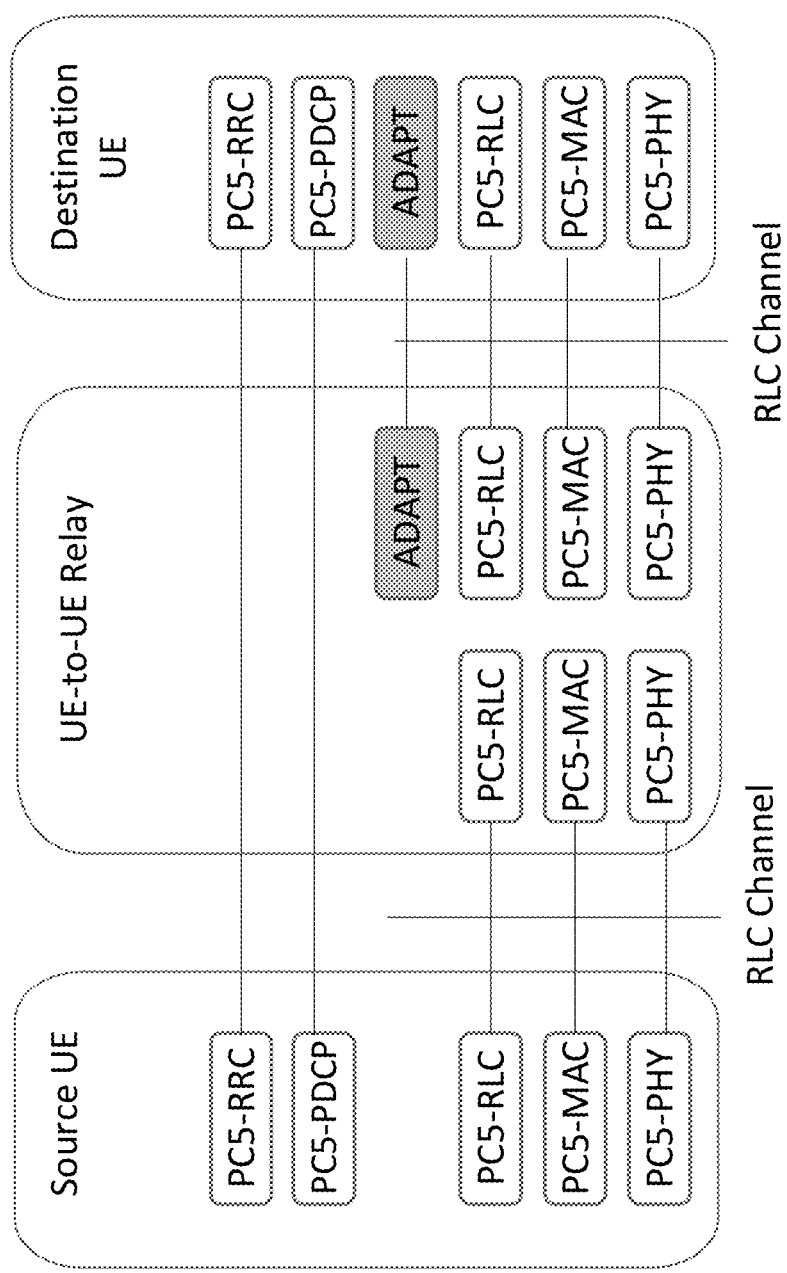
FIG. 24 is a reproduction of FIG. 5.5.1-2 of 3GPP TR 38.836 V0.1.1.

[FIG. 5.5.1-2 of 3GPP TR 38.836 V0.1.1, Entitled "Control Plane Protocol Stack for L2 UE-to-UE Relay", is Reproduced as FIG. 24]

As a working assumption, some information is put within the header of adaptation layer between Relay UE and the Destination UE to enable Bearer mapping for L2 UE-to-UE Relay and the details can be discussed at WI phase.

Editor Note: It is FFS on the details to support the N-to-1 mapping between the ingress RLC channels from multiple transmitting Remote UEs to egress RLC channels (going to the same Destination UE) at Relay UE.

3GPP TS 23.287 introduces the following:

6.3.3 Unicast Mode V2X Communication Over PC5 Reference Point 6.3.3.1 Layer-2 Link Establishment Over PC5 Reference Point To perform unicast mode of V2X communication over PC5 reference point, the UE is configured with the related information as described in clause 5.1.2.1.

FIG. 6.3.3.1-1 shows the layer-2 link establishment procedure for unicast mode of V2X communication over PC5 reference point.

Figure 25:
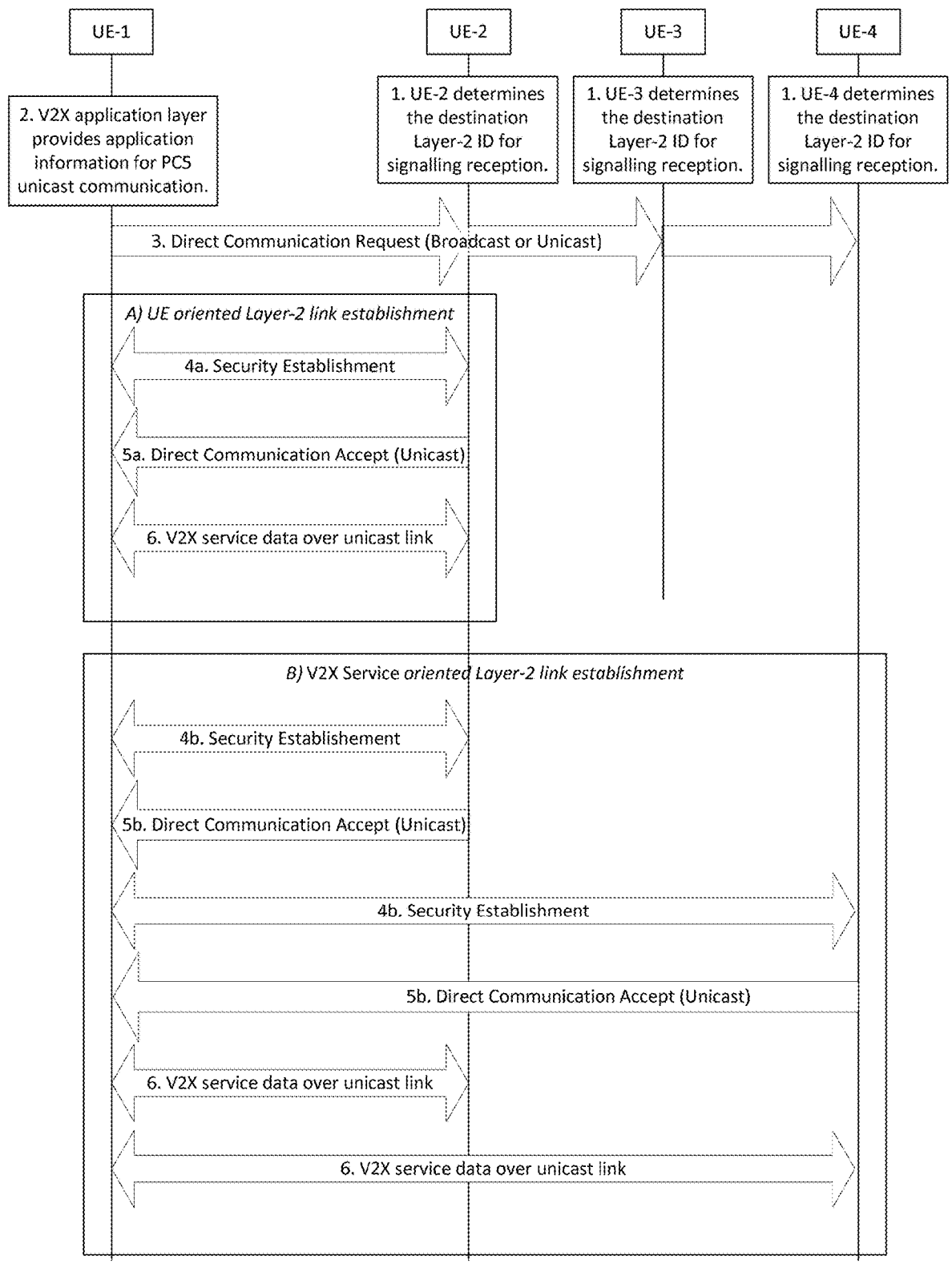
FIG. 25 is a reproduction of FIG. 6.3.3.1-1 of 3GPP TS 23.287 V.16.4.0.

[FIG. 6.3.3.1-1 of 3GPP TS 23.287 V.16.4.0, Entitled "Layer-2 Link Establishment Procedure", is Reproduced as FIG. 25]

1. The UE(s) determine the destination Layer-2 ID for signalling reception for PC5 unicast link establishment as specified in clause 5.6.1.4. The destination Layer-2 ID is configured with the UE(s) as specified in clause 5.1.2.1.

2. The V2X application layer in UE-1 provides application information for PC5 unicast communication. The application information includes the V2X service type (s) and the initiating UE's Application Layer ID. The target UE's Application Layer ID may be included in the application information.

The V2X application layer in UE-1 may provide V2X Application Requirements for this unicast communication. UE-1 determines the PC5 QoS parameters and PFI as specified in clause 5.4.1.4.

If UE-1 decides to reuse the existing PC5 unicast link as specified in clause 5.2.1.4, the UE triggers Layer-2 link modification procedure as specified in clause 6.3.3.4.

3. UE-1 sends a Direct Communication Request message to initiate the unicast layer-2 link establishment procedure. The Direct Communication Request message includes:

Source User Info: the initiating UE's Application Layer ID (i.e. UE-1's Application Layer ID).

If the V2X application layer provided the target UE's Application Layer ID in step 2, the following information is included:

Target User Info: the target UE's Application Layer ID (i.e. UE-2's Application Layer ID).

V2X Service Info: the information about V2X service type(s) requesting Layer-2 link establishment.

Security Information: the information for the establishment of security.

NOTE 1: The Security Information and the necessary protection of the Source User Info and Target User Info are defined in TS 33.536 [26].

The source Layer-2 ID and destination Layer-2 ID used to send the Direct Communication Request message are determined as specified in clauses 5.6.1.1 and 5.6.1.4. The destination Layer-2 ID may be broadcast or unicast Layer-2 ID. When unicast Layer-2 ID is used, the Target User Info shall be included in the Direct Communication Request message.

UE-1 sends the Direct Communication Request message via PC5 broadcast or unicast using the source Layer-2 ID and the destination Layer-2 ID.

4. Security with UE-1 is established as below:

4a. If the Target User Info is included in the Direct Communication Request message, the target UE, i.e. UE-2, responds by establishing the security with UE-1.

4b. If the Target User Info is not included in the Direct Communication Request message, the UEs that are interested in using the announced V2X service type (s) over a PC5 unicast link with UE-1 responds by establishing the security with UE-1.

NOTE 2: The signalling for the Security Procedure is defined in TS 33.536 [26].

When the security protection is enabled, UE-1 sends the following information to the target UE:
If IP communication is used:
IP Address Configuration: For IP communication, IP address configuration is required for this link and indicates one of the following values:
"IPv6 Router" if IPV6 address allocation mechanism is supported by the initiating UE, i.e., acting as an IPV6 Router; or
"IPv6 address allocation not supported" if IPv6 address allocation mechanism is not supported by the initiating UE.
Link Local IPV6 Address: a link-local IPV6 address formed locally based on RFC 4862 if UE-1 does not support the IPV6 IP address allocation mechanism, i.e. the IP Address Configuration indicates "IPV6 address allocation not supported".
QoS Info: the information about PC5 QoS Flow(s) to be added. For each PC5 QoS Flow, the PFI, the corresponding PC5 QoS parameters (i.e. PQI and conditionally other parameters such as MFBR/GFBR, etc.) and the associated V2X service type(s).
The source Layer-2 ID used for the security establishment procedure is determined as specified in clauses 5.6.1.1 and 5.6.1.4. The destination Layer-2 ID is set to the source Layer-2 ID of the received Direct Communication Request message.
Upon receiving the security establishment procedure messages, UE-1 obtains the peer UE's Layer-2 ID for future communication, for signalling and data traffic for this unicast link.
5. A Direct Communication Accept message is sent to UE-1 by the target UE(s) that has successfully established security with UE-1:
5a. (UE oriented Layer-2 link establishment) If the Target User Info is included in the Direct Communication Request message, the target UE, i.e. UE-2 responds with a Direct Communication Accept message if the Application Layer ID for UE-2 matches.
5b. (V2X Service oriented Layer-2 link establishment) If the Target User Info is not included in the Direct Communication Request message, the UEs that are interested in using the announced V2X Service(s) respond to the request by sending a Direct Communication Accept message (UE-2 and UE-4 in FIG. 6.3.3.1-1).
The Direct Communication Accept message includes:
Source User Info: Application Layer ID of the UE sending the Direct Communication Accept message.
QoS Info: the information about PC5 QoS Flow(s) requested by UE-1. For each PC5 QoS Flow, the PFI, the corresponding PC5 QoS parameters (i.e. PQI and conditionally other parameters such as MFBR/GFBR, etc.) and the associated V2X service type(s).
If IP communication is used:
IP Address Configuration: For IP communication, IP address configuration is required for this link and indicates one of the following values:
"IPv6 Router" if IPv6 address allocation mechanism is supported by the target UE, i.e., acting as an IPV6 Router; or
"IPv6 address allocation not supported" if IPv6 address allocation mechanism is not supported by the target UE.
Link Local IPV6 Address: a link-local IPV6 address formed locally based on RFC 4862 if the target UE does not support the IPV6 IP address allocation mechanism, i.e. the IP Address Configuration indicates "IPv6 address allocation not supported", and UE-1 included a link-local IPV6 address in the Direct Communication Request message. The target UE shall include a non-conflicting link-local IPv6 address.
If both UEs (i.e. the initiating UE and the target UE) selected to use link-local IPV6 address, they shall disable the duplicate address detection defined in RFC 4862 [21].
NOTE 3: When either the initiating UE or the target UE indicates the support of IPV6 router, corresponding address configuration procedure would be carried out after the establishment of the layer 2 link, and the link-local IPV6 addresses are ignored.
The V2X layer of the UE that established PC5 unicast link passes the PC5 Link Identifier assigned for the unicast link and the PC5 unicast link related information down to the AS layer. The PC5 unicast link related information includes Layer-2 ID information (i.e. source Layer-2 ID and destination Layer-2 ID) and the corresponding PC5 QoS parameters. This enables the AS layer to maintain the PC5 Link Identifier together with the PC5 unicast link related information.
6. V2X service data is transmitted over the established unicast link as below:
The PC5 Link Identifier, and PFI are provided to the AS layer, together with the V2X service data.
Optionally in addition, the Layer-2 ID information (i.e. source Layer-2 ID and destination Layer-2 ID) is provided to the AS layer.
NOTE 4: It is up to UE implementation to provide the Layer-2 ID information to the AS layer. UE-1 sends the V2X service data using the source Layer-2 ID (i.e. UE-1's Layer-2 ID for this unicast link) and the destination Layer-2 ID (i.e. the peer UE's Layer-2 ID for this unicast link).
NOTE 5: PC5 unicast link is bi-directional, therefore the peer UE of UE-1 can send the V2X service data to UE-1 over the unicast link with UE-1.
System information acquisition related procedure(s) and handling were introduced in 3GPP TS 38.331 and TS 38.300. Accordingly, a UE shall apply the System Information (SI) acquisition procedure as defined in 3GPP TS 38.331 upon cell selection (e.g. upon power on), cell-reselection, return from out of coverage, after reconfiguration with sync completion, after entering the network from another RAT, upon receiving an indication that the system information has changed, upon receiving a Public Warning System (PWS) notification, upon receiving request (e.g., a positioning request) from upper layers; and whenever the UE does not have a valid version of a stored System Information Block (SIB) or posSIB or a valid version of a requested SIB. On the other hand, when the UE acquires a MIB or a SIB1 or an SI message in a serving cell, and if the UE stores the acquired SIB, then the UE shall store the associated areaScope, the first PLMN-Identity, the cellIdentity, the systemInformationAreaID, and/or the valueTag for the SIB.
Basically, the UE could check if a stored SIB is valid or not based on whether the first PLMN-Identity, the systemInformationAreaID, the cellIdentity and/or the valueTag for the SIB received from the serving cell are identical to the PLMN-Identity, the systemInformationAreaID, the cellIdentity and/or the valueTag associated with the stored version of that SIB. These parameters related to sidelink communication could be carried in e.g. SIB12. System Information (SI) consists of a Master Information Block (MIB) and a number of SIBs, which are divided into Minimum SI and Other SI. Minimum SI (including MIB and SIB1 as introduced in 3GPP TS 38.300) comprises basic information required for initial access and information for acquiring any other SI. Other SI encompasses all SIBs not broadcast in the Minimum SI. Those SIBs can either be periodically broadcast, broadcast on-demand, or sent in a dedicated manner to UEs in RRC_CONNECTED.

According to 3GPP TR 23.752, UE-to-Network Relay communication is studied for UE to access network via indirect network communication. Basically, Rel-16 5G architectural design (e.g. flow-based QoS communication over PC5/Uu interface) could be taken into consideration. In the scenario of UE-to-Network relay communication, a remote UE would access the network (e.g. 5GC) via a relay UE where the remote UE would be in out-of-coverage while the relay UE would be in-coverage. The remote UE would communicate with the relay UE via PC5 interface (or called sidelink interface) for accessing the network, while the relay UE would communicate with a base station (e.g. gNB) via Uu interface for forwarding traffic between the remote UE and the network.

According to the 3GPP RAN2 #112e Chairman's notes and 3GPP TS 23.502, an adaptation Layer could be introduced for supporting sidelink relay communication. For Layer-2 (L2) UE-to-Network Relay, the adaptation layer could be placed over Radio Link Control (RLC) sublayer for both Control Plane (CP) and User Plane (UP) at the Uu interface between Relay UE and gNB. The Uu Service Data Adaptation Protocol (SDAP)/Packet Data Convergence Protocol (PDCP) and Radio Resource Control (RRC) are terminated between Remote UE and gNB, while RLC, Medium Access Control (MAC), and Physical (PHY) are terminated in each link (i.e. the link between Remote UE and UE-to-Network Relay UE and the link between UE-to-Network Relay UE and the gNB).

Figure 26:
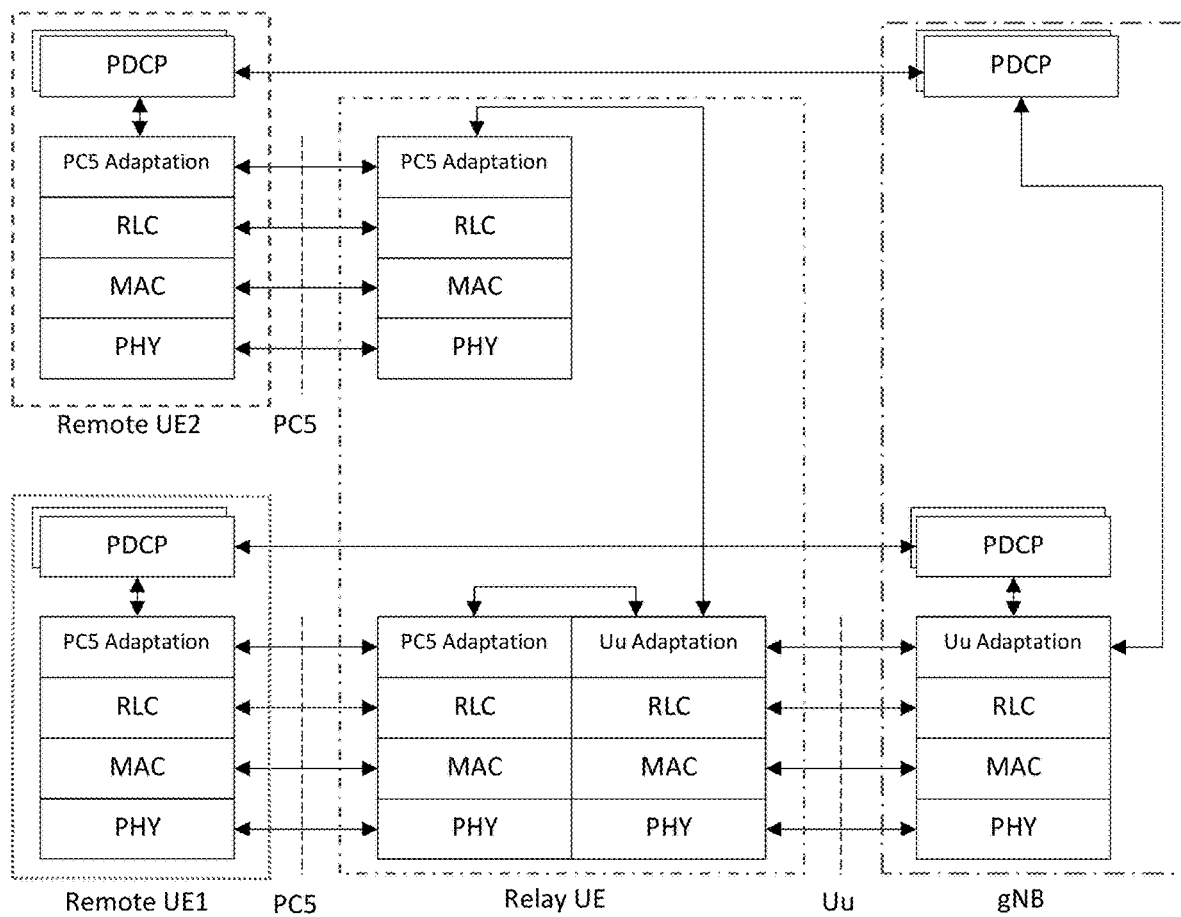
FIG. 26 illustrates an example of protocol stacks for Layer-2 UE-to-Network Relay according to one embodiment.

FIG. 26 illustrates an example of protocol stacks for Layer-2 UE-to-Network Relay according to one embodiment. In case of L2 UE-to-Network relay communication as illustrated in FIG. 26, Remote UE1 could communicate with gNB via a Relay UE. Remote UE1 and gNB may establish one or more Uu Data Radio Bearers (DRBs) for communicating traffic. For example, there are 6 Uu DRBs: DRB1, DRB2, DRB3, DRB4, DRB5 and DRB6. Remote UE1 and the Relay UE could establish one or more PC5 RLC channels for forwarding the traffic. For example, there are three PC5RLC channels: Remote UE1's PC5 RLC channel #1, Remote UE1's PC5 RLC channel #2 and Remote UE1's PC5 RLC channel #3. DRB1 and DRB2 could be mapped to the Remote UE1's PC5 RLC channel #1. DRB3 and DRB4 could be mapped to the Remote UE1's PC5 RLC channel #2. DRB5 and DRB6 could be mapped to the Remote UE1's PC5 RLC channel #3. And, gNB and the Relay UE could establish one or more Uu RLC channels for forwarding the traffic. For example, there are two Uu RLC channels: Uu RLC channel #1 and Uu RLC channel #2. The Remote UE1's PC5 RLC channel #1 and the Remote UE1's PC5 RLC channel #2 could be mapped to the Uu RLC channel #1. The Remote UE1's PC5 RLC channel #3 could be mapped to the Uu RLC channel #2. Possibly, Remote UE2 could also communicate with gNB via the Relay UE. Remote UE2 may also have the same relay channel configuration as Remote UE1 as mentioned above.

On the other hand, according to the 3GPP RAN2 #11e Chaiman's notes, the Uu adaptation layer will be also supported for Uu SRBs (including e.g. Uu SRB0, Uu SRB1, Uu SRB2, and/or etc.). However, whether the PC5 adaptation layer would be also supported for the Uu SRBs is not clear. It is assumed that the PC5 adaptation layer is also supported for the Uu SRBs.

Figure 27:
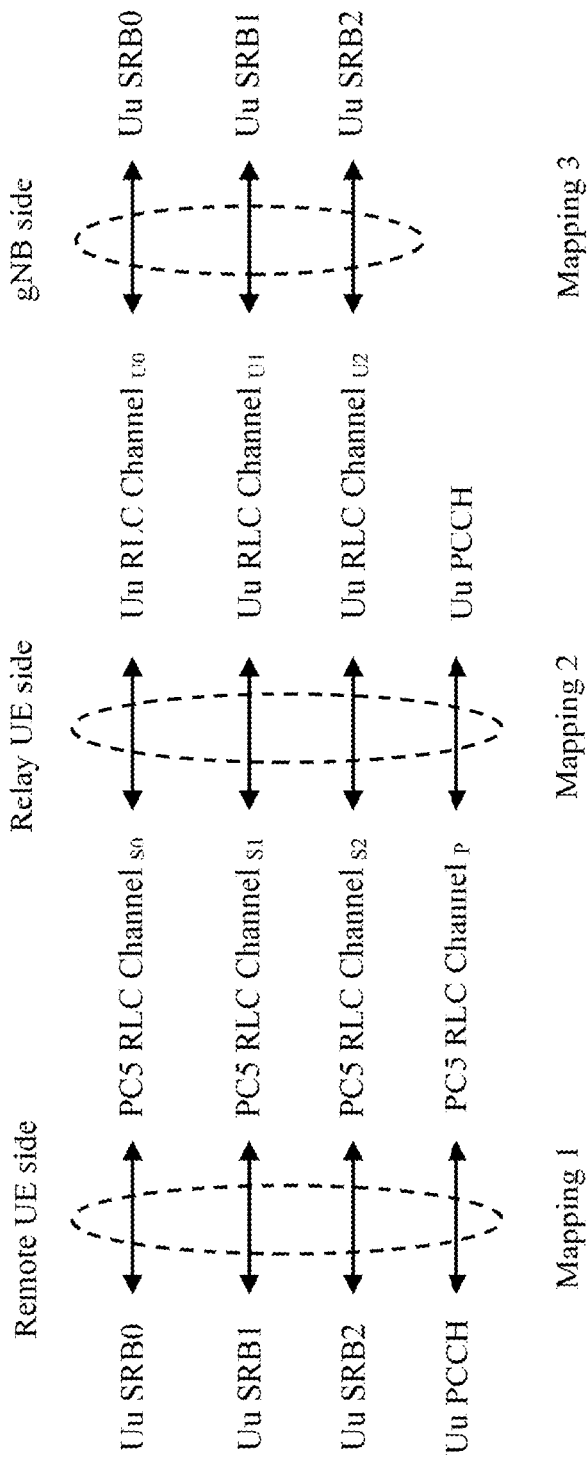
FIG. 27 illustrates an example of association between Uu SRBs, Uu Physical Control Channel (PCCH), SL RLC channels, and Uu RLC channels according to one embodiment.

FIG. 27 illustrates an example of association between Uu SRBs, Uu Physical Control Channel (PCCH), SL RLC channels, and Uu RLC channels according to one embodiment. In FIG. 27, each Uu SRB could be associated with one PC5 RLC channel (i.e. as the mapping 1 shown in FIG. 27), and each PC5 RLC channel could be associated with one Uu RLC channel (i.e. as the mapping 2 shown in FIG. 27). Thus, each Uu RLC channel will be associated with one Uu SRB (i.e. as the mapping 3 shown in FIG. 27). With the mapping information, gNB can know a RRC message received from the Relay UE is sent on which Uu SRB based on which Uu RLC channel on which this RRC message is received. Similarly, the Relay UE can know a RRC message received from gNB is to be sent on which PC5 RLC channel based on which Uu RLC channel on which this RRC message is received. Similarly, the Remote UE can know a RRC message received from the Relay UE is sent on which Uu SRB based on which PC5 RLC channel on which this RRC message is received.

For Uu PCCH used for monitoring or receiving paging messages, according to 3GPP TS 38.331, there is no associated signalling radio bearer. Thus, Uu PCCH could be associated with one PC5 RLC channel (i.e. as the mapping 1 and 2 shown in FIG. 27). If Relay UE monitors or receives a paging message for a Remote UE, this Relay UE could send the paging message on the PC5 RLC channel associated with Uu PCCH to the Remote UE. When the Remote UE receives a transport block on the PC5 RLC channel associated with Uu PCCH, the Remote UE could know the transport block may include the paging message for the Remote UE.

If each Uu RLC channel could be associated with one Remote UE, gNB and the Relay UE can further know a RRC message is sent on which Uu SRB of which Remote UE. With the mapping information, gNB may know a RRC message received from the Relay UE is sent on which Uu SRB and is associated with which Remote UE based on association between a Remote UE and a Uu RLC channel and association between a Uu SRB and the Uu RLC channel on which this RRC message is received. Similarly, the Relay UE can know a RRC message received from gNB is to be sent on which PC5 RLC channel of which Remote UE based on association between a Remote UE and a Uu RLC channel and association between a PC5 RLC channel and the Uu RLC channel on which this RRC message is received. To achieve this, the range of Uu RLC channel ID (e.g. from 1 to 65536) could be larger than (or equal to) the range of PC5 RLC channel ID (e.g. from 1 to 32).

More specifically, association between Uu SRB and PC5 RLC channel (i.e. the mapping 1) could be specified with default configuration or pre-configured in UE. Association between PC5 RLC channel and Uu RLC channel (i.e. the mapping 2) could be specified with default configuration, pre-configured in UE, configured by network (i.e. base station, gNB, via e.g. dedicated signalling or system information (e.g. SIB)) or configured by Relay UE. Association between Uu SRB and Uu RLC channel (i.e. the mapping 3) could be specified with default configuration, pre-configured in UE or configured by network (i.e. base station, gNB, via e.g. dedicated signalling or system information (e.g. SIB)). Association between Uu PCCH and PC5 RLC channel could be specified with default configuration or pre-configured in UE (i.e. the mapping 1) or configured by network (i.e. base station, gNB, via e.g. dedicated signalling or system information (e.g. SIB)) or configured by Relay UE (i.e. the mapping 2).

According to 3GPP TS 38.300, the UE in RRC_IDLE and RRC_INACTIVE state may use Discontinuous Reception (DRX) to monitor one paging occasion (PO) per DRX cycle in order to reduce power consumption. A PO is a set of PDCCH monitoring occasions and can consist of multiple time slots (e.g. subframe or OFDM symbol) where paging downlink control information (DCI) can be sent. One Paging Frame (PF) is one Radio Frame and may contain one or multiple PO(s) or starting point of a PO. According to 3GPP TS 23.502, the UE needs to register with the network to get authorized to receive services, to enable mobility tracking and to enable reachability. When the UE has registered onto the network, the UE has 5G-S-TMSI. And then, the both PO and PF are determined by the UE_ID which is derived from the 5G-S-TMSI of the UE (i.e. 5G-S-TMSI mod 1024).

Figure 28:
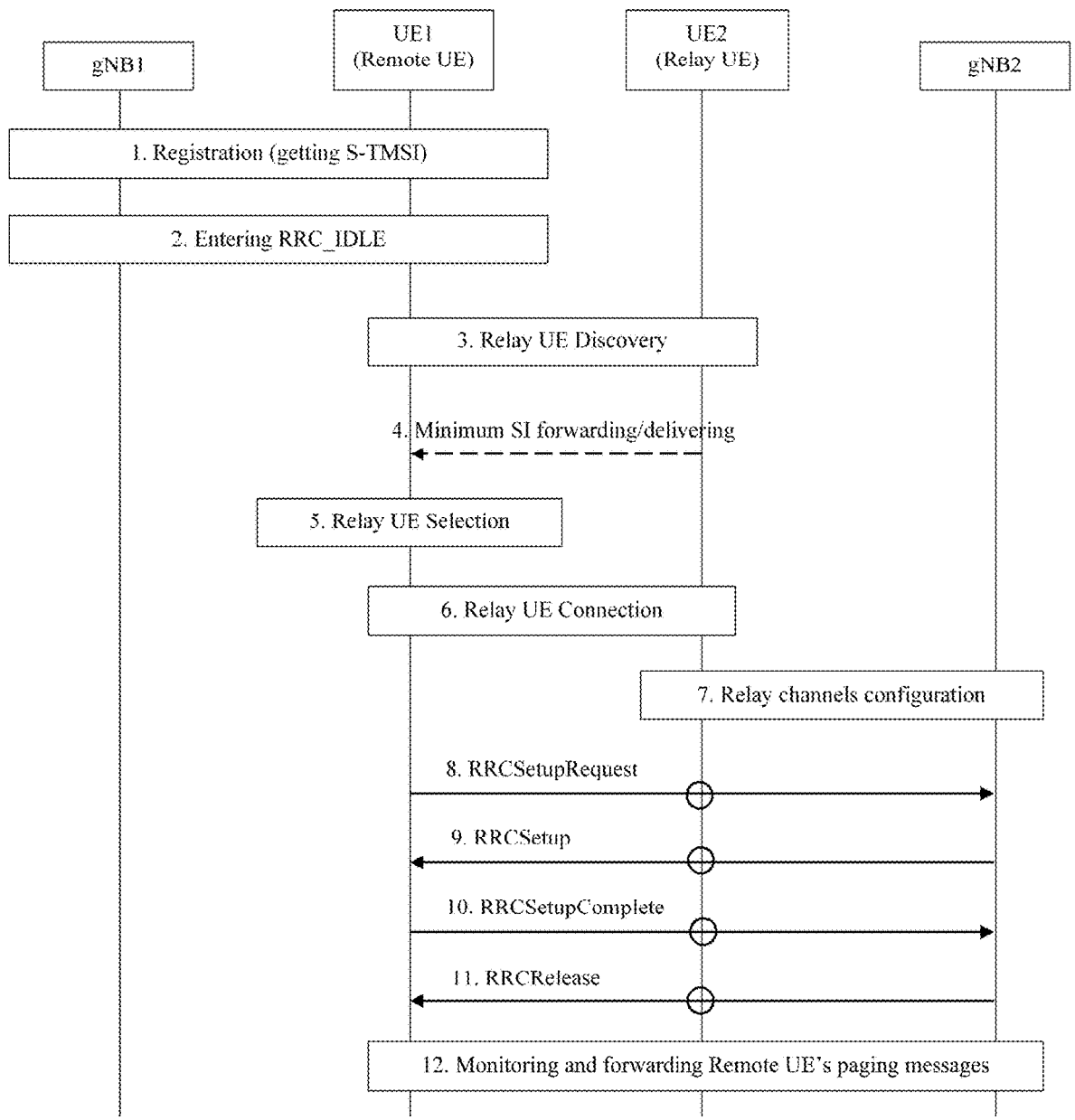
FIG. 28 illustrates an exemplary flow chart for paging monitoring via Reley UE starting from Remote UE in RRC_IDLE according to one embodiment.

According to 3GPP TR 23.752, R2-2008922, and the 3GPP RAN2 #112e Chairman's notes, forwarding system information received from the serving cell of a Relay UE to a Remote UE (in RRC_IDLE or RRC_INACTIVE) could be supported in UE-to-Network relay communication. Properly, forwarding paging messages received from the serving cell of the Relay UE to the Remote UE (in RRC_IDLE or RRC_INACTIVE) could be also supported. Thus, step flow used for acquiring system information and/or paging messages of a cell (controlled by gNB2) via a Relay UE locating at the cell and forwarding the system information and/or the paging messages to the Remote UE (which may have originally registered onto the network via gNB1) could be considered and illustrated in FIG. 28, which illustrates an exemplary flow chart for paging monitoring via Reley UE starting from Remote UE in RRC_IDLE according to one embodiment:

Step 1: UE1 (in capable of being Remote UE in UE-to-Network Relay communication) could perform cell selection and find a cell to camp on. The cell could be controlled by gNB1. UE1 could perform the registration procedure (as specified in 3GPP TS 23.502) with gNB1 in order to register the network. After the registration procedure is completed, UE1 may get one S-TMSI (or called 5G-S-TMSI). This S-TMSI could be used to determine one or more paging occasions of UE1 for monitoring (CN-initiated) paging from gNB1.

Step 2: If UE1 has no traffic for transmission or reception, UE1 may enter RRC_IDLE, and then start to monitor paging.

Step 3: Possibly, UE1 would need to find a Relay UE if UE1 is far away from gNB1 (according to e.g. measurement on gNB1's signal strength). UE1 could find one or more Relay UEs based on received discovery messages sent by these found Relay UEs. Basically, each discovery message could include one Layer-2 ID of one Relay UE sending this discovery message. This Layer-2 ID could be also used for sidelink frames transmission or reception including following signalling or messages exchanged between UE1 and UE2.

Step 4: Basically, each Relay UE could (periodically) broadcast the minimum SI (stored in this Relay UE) of the cell serving this Relay UE. In this example, the minimum SI sent by UE2 (a Relay UE found by UE1 based on Step 3) is provided by gNB2. The minimum SI could be sent via e.g. a PC5 RRC message. And then, UE1 could perform a SI acquisition procedure in order to acquire Minimum SI from UE2. UE1's lower layers could use a Layer-2 ID of UE2 as Source (Layer-2 or Layer-1) ID to monitor a sidelink control information used for scheduling a sidelink reception including Minimum SI of UE2. UE1's lower layers could use a common Layer-2 ID as Destination (Layer-2 or Layer-1) ID to monitor the sidelink control information used for scheduling a sidelink reception including Minimum SI of UE2.

UE1 could then receive a minimum SI forwarded by UE2. UE1 could then store the minimum SI. The Layer-2 ID of UE2 (or partial of the Layer-2 ID of UE2, i.e. Layer-1 ID) could be used as a Source (Layer-2 or Layer-1) ID for sending or receiving the minimum SI. The common Layer-2 ID (or partial of the common Layer-2 ID, i.e. Layer-1 ID) could be used as a Destination (Layer-2 or Layer-1) ID for sending or receiving the minimum SI. The common Layer-2 ID could be associated with a purpose of delivering or forwarding system information. The common Layer-2 ID could be preconfigured or specified in UE1 and UE2.

Step 5: And then, UE1 could determine to select UE2 as Relay UE based on a relay UE selection criteria or procedure. UE1 may select UE2 as Relay UE since measurement at UE2's signal strength is stronger than or equal to a threshold. UE2's signal strength may be measured at discovery messages and/or messages including the minimum SI sent by UE2. It is also possible that UE1 may select UE2 as Relay UE since the cell serving UE2 is associated with a Public Land Mobile Network (PLMN) and UE1 also belongs to the PLMN. UE1 could know this according to a PLMN ID of UE2's serving cell included in the minimum SI. UE1 may take these factors (e.g. the UE2's signal strength and/or the PLMN ID) into account for Relay UE selection.

Step 6: Once UE1 has selected UE2 as Relay UE, UE1 may perform a procedure used to establish a connection with UE2. This procedure could be the unicast link establishment procedure as introduced in 3GPP TS 23.287.

Step 7: Once UE2 has connected with UE1, UE1 may send a first RRC message (e.g. SidelinkUEInformationNR) to gNB2. In this RRC message, a destination ID (e.g. Layer-2 ID) of UE1 could be included. This RRC message could also include an indicator (in a field or an information element (IE)) indicates UE1 is a remote UE. The indicator could be associated with the destination ID of UE1.

Upon receipt of the first RRC message from UE2, gNB2 may send a second RRC message (e.g. RRC Reconfiguration) to UE2. In the second RRC message, a mapping of Uu SRB and Uu RLC channel for UE1 could be provided. For example, the second RRC message or the mapping of Uu SRB and Uu RLC channel for UE1 could indicate a Uu RLC channel$U_0$ is associated with Uu SRB0 and/or the destination ID or an index of the destination ID. The second RRC message or the mapping of Uu SRB and Uu RLC channel for UE1 could also indicate a Uu RLC channel$_{U1}$ is associated with Uu SRB1 and/or the destination ID or an index of the destination ID. The second RRC message or the mapping of Uu SRB and Uu RLC channel for UE1 could also indicate a Uu RLC channel$_{U2}$ is associated with Uu SRB2 and/or the destination ID or an index of the destination ID.

Step 8: Once UE1 has connected with UE2 (in Step 6), UE1 may initiate a procedure for RRC connection establishment with gNB2. UE1 may send a first RRC message for request of establishing RRC connection (e.g. RRCSetupRequest) on Uu SRB0 to gNB2. Uu SRB0 could be associated with a PC5 RLC channel$_{S0}$. Thus, the first RRC message for request of establishing RRC connection is sent to UE2 on the PC5 RLC channel$_{S0}$.

Upon receipt of the first RRC message for request of establishing RRC connection on the PC5 RLC channel$_{S0}$, UE2 could deliver this RRC message to the Uu RLC channel$_{U0}$ for transmission to gNB2.

Step 9: Upon receipt of the first RRC message for request of establishing RRC connection on the Uu RLC channel$_{U0}$ from UE2, gNB2 may send a second RRC message for setup of establishing RRC connection (e.g. RRCSetup) on Uu SRB0 to UE1. The second RRC message for setup of establishing RRC connection is sent to UE2 on the Uu RLC channel$_{U0}$.

Upon receipt of the second RRC message for setup of establishing RRC connection on the Uu RLC channel$_{U0}$, UE2 could deliver this RRC message to the PC5 RLC channel$_{U0}$ for transmission to UE1.

Step 10: In response to receipt of the second RRC message for setup of establishing RRC connection on the PC5 RLC channel$_{S0}$ from UE2, UE1 may establish Uu SRB1 for transmission of a third RRC message for completion of establishing RRC connection (e.g. RRCSetupComplete). Uu SRB1 could be associated with a PC5 RLC channel$_{S1}$. Thus, the third RRC message for completion of establishing RRC connection is sent to UE2 on the PC5 RLC channel$_{S1}$.

Upon receipt of the third RRC message for completion of establishing RRC connection on the PC5 RLC channel$_{S1}$, UE2 could deliver this RRC message to the Uu RLC channel$_{U1}$ for transmission to gNB2.

Step 11: Since UE1 may have no traffic for transmission, gNB2 would switch UE1 from RRC_CONNECTED to RRC_INACTIVE (for keeping UE context of UE1 for RRC connection resume when UE1 goes back RRC_CONNECTED). Thus, gNB2 may send a fourth RRC message for release of RRC connection on Uu SRB1 to UE1. The fourth RRC message for release of RRC connection is sent to UE2 on the Uu RLC channel$_{U1}$.

In the fourth RRC message, such (partial) content of suspendConfig specified in 3GPP TS 38.331 (including e.g. at least UE1's fullI-RNTI and/or shortI-RNTI) may be included. The fourth RRC message may also include a paging cycle used for determining paging frame or occasion.

According to 3GPP TS 38.331, RRCRelease message is sent on Uu SRB1. Thus, the fourth RRC message could be sent on the Uu RLC channel$_{U1}$ associated with Uu SRB1 for UE1. Basically, Uu SRB1 has security protection (including integrity protection and/or ciphering) enabled for UE1. Thus, UE2 is not able to read the content of the fourth RRC message received from gNB2. Therefore, gNB2 could send a fifth RRC message (e.g. RRCReconfiguration) to UE2 for providing paging monitoring related information (including e.g. the S-TMSI, the fullI-RNTI and/or the shortI-RNTI of UE1, the paging cycle, RAN-based Notification Area (RNA) area information and/or etc.) for UE2 to monitor or receive UE1's paging messages. The fifth RRC message could be sent on UE2's SRB (e.g. Uu SRB1 of UE2).

Upon receipt of the fourth RRC message for release of RRC connection on the Uu RLC channel$_{U1}$, UE2 could deliver this RRC message to the PC5 RLC channel$_{U1}$ for transmission to UE1. In response to receipt of the fourth RRC message for release of RRC connection on the PC5 RLC channels from UE2, UE1 may then enter RRC_INACTIVE.

Step 12: With the fifth RRC message received from gNB2, UE2 could be able to monitor or receive paging messages of UE1 at those paging occasions of UE1. Once a paging message is received and in which the S-TMSI, the fullI-RNTI or the shortI-RNTI of UE1 is included in this paging message, UE2 may send this paging message to UE1 (via e.g. PC5 RRC message). The paging message could be included in a container within the PC5 RRC message. UE2 may send the paging message based on default PC5 AS configuration (including parameters used for establishing one or more sidelink logical channels for forwarding the paging messages). This paging message could be sent on a PC5 RLC channel p (associated with Uu PCCH).

Figure 29:
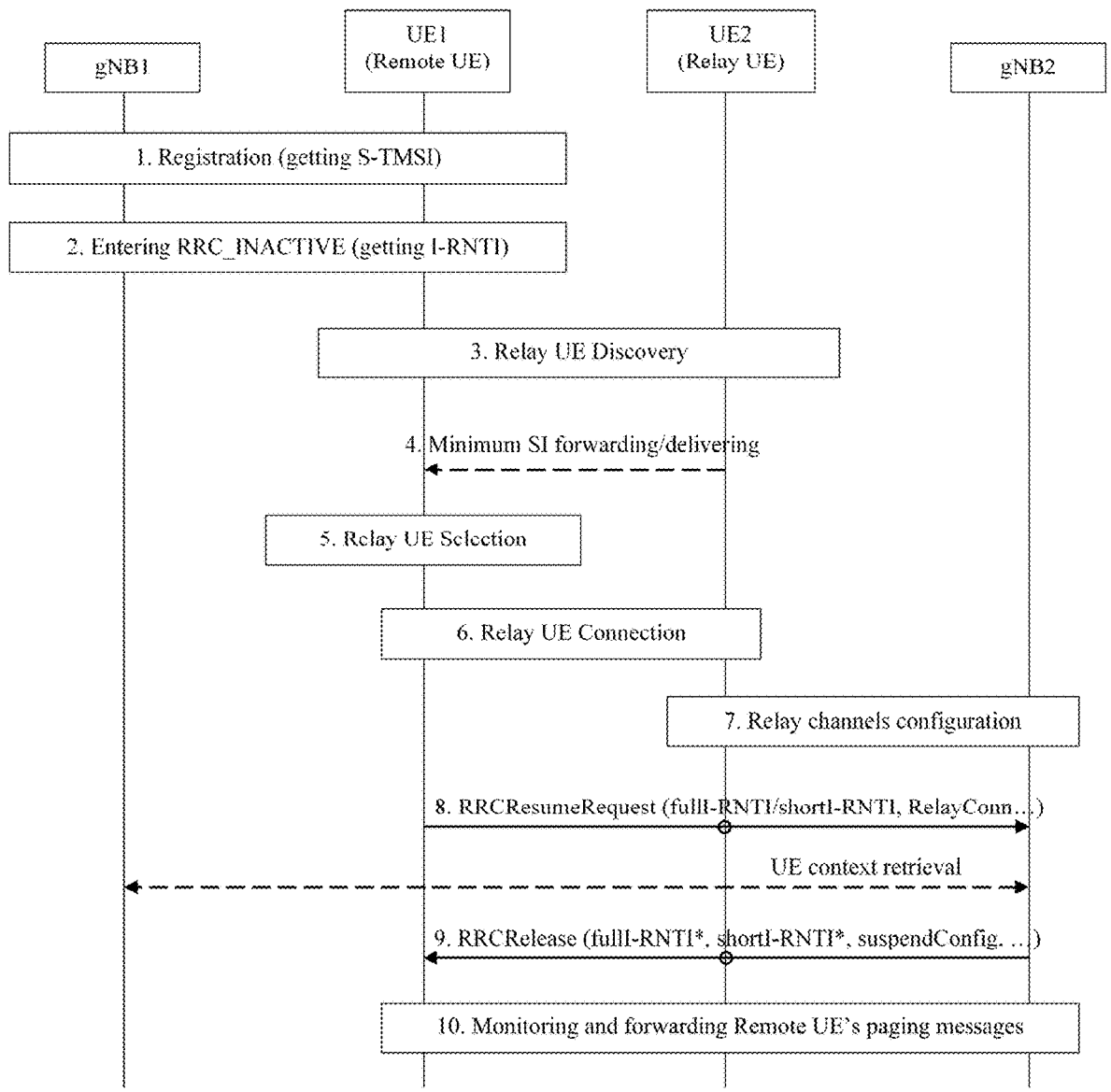
FIG. 29 illustrates an exemplary flow chart for paging monitoring via Relay UE starting from Remote UE in RRC_INACTIVE according to one embodiment.

FIG. 29 illustrates an exemplary flow chart for paging monitoring via Relay UE starting from Remote UE in RRC_INACTIVE according to one embodiment. An example could be illustrated in FIG. 29 which has the following modifications to FIG. 28:

Step 2: In addition to switching from RRC_CONNECTED to RRC_IDLE as mentioned in the Step 2 in FIG. 28, gNB1 may decide to switch UE1 from RRC_CONNECTED into RRC_INACTIVE. gNB1 may send a RRC message (e.g. RRCRelease) to UE1 for the RRC state transition. In the RRC message, I-RNTI belonging to UE1 may be included. Possibly, the RRC message could include fullI-RNTI and/or shortI-RNTI. Other than the fullI-RNTI and/or the shortI-RNTI, some other related parameters could include, for example, at least one of paging cycle for RAN paging, RNA area information, a timer length for periodic RNA update, and/or etc.

Step 5: Except for the Step 5 mentioned in FIG. 28, UE1 may select UE2 based on the content of the minimum SI including e.g. RNA area ID. If a Relay UE's serving cell belonging to a RNA area where UE1 currently locates on, UE1 may prioritize to select this Relay UE. In case UE1's RNA area is different from UE2's RNA area, UE1 may still select UE2 as Relay UE if there is no Relay UE locating the same RNA area as UE1's one (but at least UE1 and UE2 belong to the same PLMN).

Other than including RNA area related information (including e.g. the RNA area ID) in the minimum SI, an alternative could be that Relay UE could include the RNA area related information in discovery messages for other UEs in proximity receiving these discovery messages and then knowing this Relay UE's RNA area.

It is also possible that UE1 may not take the RNA area ID into account in Relay UE selection. Since UE2's serving cell may belong another RNA area which is different from UE1's one (by comparing between a RNA area ID of UE1 and a RNA area ID of UE2), UE1 would perform a RRC procedure for RNA update after/upon/when/if/in response to UE1 selects UE2 as Relay UE and/or connects UE2 (to make sure the network is able to reach UE1).

Step 8: UE1 may initiate a RRC procedure for RNA update (e.g. the RRC connection resume procedure). Within the RRC procedure for RNA update, UE1 may send a first RRC message (e.g. RRCResumeRequest) to gNB2 via UE2. In the first RRC message, at least a fullI-RNTI or a shortI-RNTI of UE1 could be included. UE1 may determine whether to include the fullI-RNTI or the shortI-RNTI in the first RRC message based on e.g. the useFullResumeID indicated in the minimum SI sent by UE2. According to 3GPP TS 38.331, RRCResumeRequest message is sent on SRB0. Thus, this first RRC could be sent on Uu SRB0 for UE1. Since Uu SRB0 could be associated with a PC5 RLC channel$_{S0}$, the first RRC message could be sent to UE2 on the PC5 RLC channel$_{S0}$. When initiating the RNA update procedure, UE1 may enable security protection (including integrity protection and/or ciphering) on all radio bearers except for SRB0.

Upon receipt of the first RRC message from UE1, since PC5 RLC channel$_{S0}$ could be associated with the Uu RLC channel$_{U0}$, the first RRC message could be delivered to the Uu RLC channel$_{U0}$ for transmission to gNB2.

In response to receipt of the first RRC message, gNB2 will negotiate with gNB1 for UE context retrieval. According to the fullI-RNTI or the shortI-RNTI, gNB2 could know gNB1 is the one gNB which stores the UE context of UE1. If UE context retrieval is successful, UE1's fullI-RNTI and/or shortI-RNTI may be updated and may be associated with gNB2.

Step 9: gNB2 may then send a second RRC message (e.g. RRCRelease) to UE1 via UE2 in response to receipt of the first RRC message. In the second RRC message, at least UE1's new fullI-RNTI and/or new shortI-RNTI may be included. In the second RRC message, UE1's original fullI-RNTI and/or shortI-RNTI may be still included (if gNB2 is the same as gNB1). The second RRC message may also include a (new) paging cycle for determining paging frame or occasion. The second RRC could be sent on Uu SRB1 for UE1. Since Uu SRB1 could be associated with the Uu RLC channel$_{U1}$, the second RRC message could be sent to UE2 on the Uu RLC channel$_{U1}$.

gNB2 could send a third RRC message (e.g. RRCReconfiguration) to UE2 for providing paging monitoring related information (including e.g. the S-TMSI, the new fullI-RNTI and/or the new shortI-RNTI of UE1, the new paging cycle, RNA area information and/or etc.) for UE2 to monitor UE1's paging messages. The third RRC message could be sent on UE2's SRB (e.g. Uu SRB1 of UE2).

Step 10: Same as Step 12 in FIG. 28.

Alternatively, the PLMN related information (e.g. PLMN ID) and/or the RNA related information (e.g. RNA area ID) could be included in the discovery messages sent by Relay UE as Step 3. By this way, UE1 could receive the minimum SI after Relay UE selection is done (i.e. behind Step 5).

Possibly, a Relay UE could broadcast the minimum SI if or when the Relay UE connects to one or more Remote UEs. Connecting to Remote UE could mean that the Relay UE has established one direct link with this Remote UE. The Relay UE could perform a unicast link establishment procedure with the Remote UE for establishing the direct link between the Relay UE and the Remote UE. The direct link could be established and used for forwarding traffic between the Remote UE and the network (e.g. a base station, gNB).

Possibly, a Relay UE could broadcast the minimum SI if or when the Relay UE is performing transmission of one or more discovery messages. Performing transmission of one or more discovery messages could mean that the Relay UE is performing a Model A discovery procedure or a Model B discovery procedure Within the Model A discovery procedure, the Relay UE could transmit one or more discovery messages (i.e. the Announcement message) for a period. Within the Model B discovery procedure, the Relay UE could transmit one or more discovery messages (i.e. the Response message).

Possibly, a Relay UE could broadcast the minimum SI if or when the Relay UE is monitoring paging for one or more Remote UEs. Monitoring paging for one or more Remote UEs could mean that the Relay UE has determined one or more paging occasions according to these Remote UEs' UE IDs (e.g. S-TMSIs of these Remote UEs) and is monitoring potential paging at these paging occasions.

According to 3GPP TS 38.331, a UE only in RRC_IDLE or RRC_INACTIVE can monitor paging. Since UE2 may be in RRC_CONNECTED, UE2 is not able to monitor or receive paging messages for UE1 if UE2 still follows the principle of monitoring paging as in 3GPP TS 38.331. To address this, UE2 could be able to monitor paging for UE1 while UE2 is in RRC_CONNECTED and needs for monitoring or forwarding UE1's paging messages. Alternatively, if UE2 still follows the principle of monitoring paging in 3GPP TS 38.331, gNB could send paging messages to UE2 via dedicated signing (via RRCReconfiguration or other RRC message sent on PDCCH addressed to UE2) while UE2 is in RRC_CONNECTED and needs for monitoring or forwarding UE1's paging messages. If/when/after/upon UE2 receives UE1's paging messages in the dedicated signalling, UE2 may then send the UE1's paging messages to UE1 (via e.g. PC5 RRC messages).

According to 3GPP 38.331, when a UE entering RRC_INACTIVE, the UE should store UE Inactive AS context with some parameters including e.g. C-RNTI of a serving cell this UE was connected to prior to suspension of the RRC connection, PhysCellId of the serving cell, CellIdentity of the serving cell, etc. At least one of these stored parameters is used for determining content of authentication information (e.g. resumeMAC-I or VarResumeMAC-Input) when this UE enters RRC_CONEECTED from RRC_INACTIVE. The authentication information could be included in a request message of resuming RRC connection (e.g. RRCResumeRequest or RRCResumeRequest1). Since UE1 connects gNB2 via UE2, UE1 could not obtain these parameters directly from gNB2. Thus, gNB2 may also provide at least one of these parameters (e.g. C-RNTI, PhysCellId, CellIdentity, etc.) in the RRC message used for switching UE1 to enter RRC_INACTIVE (e.g. the fourth RRC message as in Step 11 in FIG. 28 or the second RRC message as in Step 9 in FIG. 29).

After/when/if/upon UE1 receives the RRC message for entering RRC_INACTIVE, UE1 may then:
store a new C-RNTI or replace the current C-RNTI with the new C-RNTI indicated in a RRC message for entering RRC_INACTIVE received from UE2;
store a new cellIdentity or replace the current cellIdentity with the new cellIdentity indicated in the minimum SI or the RRC message for entering RRC_INACTIVE received from UE2; and/or
store a new physical cell identity or replace the current physical cell identity with the new physical cell identity indicated in the minimum SI or the RRC message for entering RRC_INACTIVE received from UE2.

Figure 30:
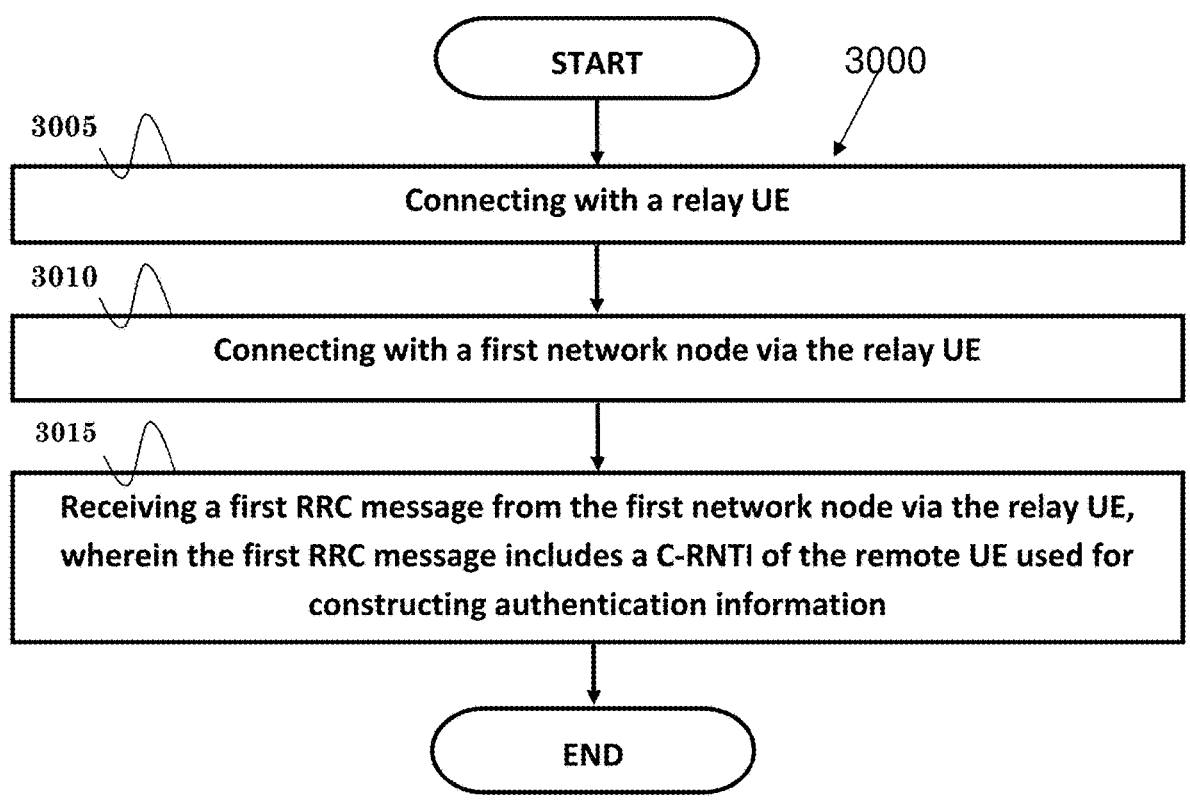
FIG. 30 is a flow chart according to one exemplary embodiment.

FIG. 30 is a flow chart 3000 illustrating a method for a remote UE to support UE-to-Network relay communication. In step 3005, the remote UE connects with a relay UE. In step 3010, the remote UE connects with a first network node via the relay UE. In step 3015, the remote UE receives a first RRC message from the first network node via the relay UE, wherein the first RRC message includes a C-RNTI of the remote UE used for constructing authentication information.

In one embodiment, the remote UE could establish a RRC connection between the remote UE and the first network node via the relay UE. The remote UE could also enter a RRC_CONNECTED if establishment of the RRC connection is completed. Furthermore, the remote UE could enter a RRC_INACTIVE from the RRC_CONNECTED in response to reception of the first RRC message from the first network node via the relay UE. The first RRC message could be a RRCRelease message including suspendConfig or a RRC message for release or suspension of the RRC connection.

In one embodiment, the remote UE could transmit a second RRC message to the first network node via the relay UE or directly to a second network node for request of resuming the RRC connection. The second RRC message may include the authentication information. The first or second network node may be a base station (e.g., gNB). The second RRC message may be a RRCResumeRequest or RRCResumeRequest1 message.

In one embodiment, the authentication information may be resumeMAC-I.

Referring back to FIGS. 3 and 4, in one exemplary embodiment of a method for a remote UE to support UE-to-Network relay communication, the remote UE 300 includes a program code 312 stored in the memory 310. The CPU 308 could execute program code 312 to enable the remote UE (i) to connect with a relay UE, (ii) to connect with a first network node via the relay UE, and (iii) to receive a first RRC message from the first network node via the relay UE, wherein the first RRC message includes a C-RNTI of the remote UE used for constructing authentication information. Furthermore, the CPU 308 can execute the program code 312 to perform all of the above-described actions and steps or others described herein.

Figure 31:
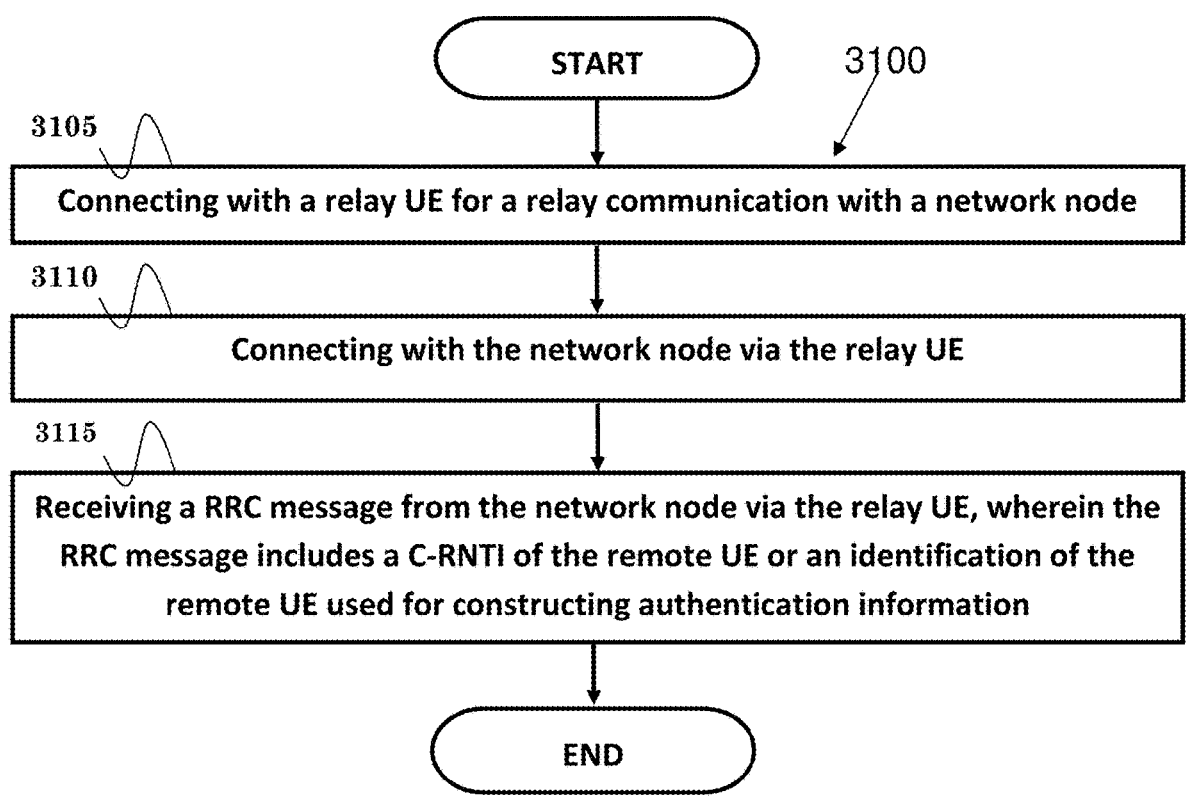
FIG. 31 is a flow chart according to one exemplary embodiment.

FIG. 31 is a flow chart 3100 illustrating a method for a remote UE to support UE-to-Network relay communication. In step 3105, the remote UE connects with a relay UE for a relay communication with a network node. In step 3110, the remote UE connects with the network node via the relay UE. In step 3115, the remote UE receives a RRC message from the network node via the relay UE, wherein the RRC message includes a C-RNTI of the remote UE or an identification of the remote UE used for constructing authentication information.

In one embodiment, the remote UE could transmit a first PC5-S message for request of establishing a PC5-S connection to the relay UE. The remote UE could also receive a second PC5-S message for acceptation of establishing the PC5-S connection from the relay UE. Furthermore, the remote UE could transmit a first RRC message for request of establishing the RRC connection to the network node via the relay UE. In addition, the remote UE could receive a second RRC message for setup of establishing the RRC connection from the network node via the relay UE. The remote UE could also transmit a third RRC message for completion of establishing the RRC connection to the network node via the relay UE. Furthermore, the remote UE could enter a RRC_CONNECTED if the RRC connection is completed. The RRC message may be a RRC message for release or suspension of the RRC connection.

In one embodiment, the remote UE could enter a RRC_INACTIVE from the RRC_CONNECTED if the RRC message for release or suspension of the RRC connection is received from the network node via the relay UE. The RRC message for release or suspension of the RRC connection may also include at least one of an identification used for identifying the remote UE (e.g. fullI-RNTI and/or shortI-RNTI), a paging cycle (e.g. ran-PagingCycle), a RAN-NotificationAreaInfo, a PeriodicRNAU-TimerValue, a cellIdentity (of a serving cell of the relay UE or the network node), and/or a PhysCellId (of the serving cell of the relay UE or the network node).

In one embodiment, the remote UE could transmit a fourth RRC message for request of resuming the RRC connection to the network node via the relay UE. The fourth RRC message may include the authentication information. The fourth RRC message may also include the identification used for identifying the remote UE (e.g. fullI-RNTI and/or shortI-RNTI).

In one embodiment, the authentication information could be constructed with the cellIdentity and/or the PhysCellId. The authentication information may be resumeMAC-I.

In one embodiment, the network node may be a base station (e.g. gNB).

Referring back to FIGS. 3 and 4, in one exemplary embodiment of a method for a remote UE to support UE-to-Network relay communication, the remote UE 300 includes a program code 312 stored in the memory 310. The CPU 308 could execute program code 312 to enable the remote UE (i) to connect with a relay UE for a relay communication with a network node, (ii) to connect with the network node via the relay UE, and (iii) to receive a RRC message from the network node via the relay UE, wherein the RRC message includes a C-RNTI of the remote UE or an identification of the remote UE used for constructing authentication information. Furthermore, the CPU 308 can execute the program code 312 to perform all of the above-described actions and steps or others described herein.

Various aspects of the disclosure have been described above. It should be apparent that the teachings herein could be embodied in a wide variety of forms and that any specific structure, function, or both being disclosed herein is merely representative. Based on the teachings herein one skilled in the art should appreciate that an aspect disclosed herein could be implemented independently of any other aspects and that two or more of these aspects could be combined in various ways. For example, an apparatus could be implemented or a method could be practiced using any number of the aspects set forth herein. In addition, such an apparatus could be implemented or such a method could be practiced using other structure, functionality, or structure and functionality in addition to or other than one or more of the aspects set forth herein. As an example of some of the above concepts, in some aspects concurrent channels could be established based on pulse repetition frequencies. In some aspects concurrent channels could be established based on pulse position or offsets. In some aspects concurrent channels could be established based on time hopping sequences. In some aspects concurrent channels could be established based on pulse repetition frequencies, pulse positions or offsets, and time hopping sequences.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, processors, means, circuits, and algorithm steps described in connection with the aspects disclosed herein may be implemented as electronic hardware (e.g., a digital implementation, an analog implementation, or a combination of the two, which may be designed using source coding or some other technique), various forms of program or design code incorporating instructions (which may be referred to herein, for convenience, as "software" or a "software module"), or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

In addition, the various illustrative logical blocks, modules, and circuits described in connection with the aspects disclosed herein may be implemented within or performed by an integrated circuit ("IC"), an access terminal, or an access point. The IC may comprise a general purpose processor, a digital signal processor (DSP), an application specific integrated circuit (ASIC), a field programmable gate array (FPGA) or other programmable logic device, discrete gate or transistor logic, discrete hardware components, electrical components, optical components, mechanical components, or any combination thereof designed to perform the functions described herein, and may execute codes or instructions that reside within the IC, outside of the IC, or both. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

It is understood that any specific order or hierarchy of steps in any disclosed process is an example of a sample approach. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

The steps of a method or algorithm described in connection with the aspects disclosed herein may be embodied directly in hardware, in a software module executed by a processor, or in a combination of the two. A software module (e.g., including executable instructions and related data) and other data may reside in a data memory such as RAM memory, flash memory, ROM memory, EPROM memory, EEPROM memory, registers, a hard disk, a removable disk, a CD-ROM, or any other form of computer-readable storage medium known in the art. A sample storage medium may be coupled to a machine such as, for example, a computer/processor (which may be referred to herein, for convenience, as a "processor") such the processor can read information (e.g., code) from and write information to the storage medium. A sample storage medium may be integral to the processor. The processor and the storage medium may reside in an ASIC. The ASIC may reside in user equipment. In the alternative, the processor and the storage medium may reside as discrete components in user equipment. Moreover, in some aspects any suitable computer-program product may comprise a computer-readable medium comprising codes relating to one or more of the aspects of the disclosure. In some aspects a computer program product may comprise packaging materials.

While the invention has been described in connection with various aspects, it will be understood that the invention is capable of further modifications. This application is intended to cover any variations, uses or adaptation of the invention following, in general, the principles of the invention, and including such departures from the present disclosure as come within the known and customary practice within the art to which the invention pertains.

The invention claimed is:

1. A method for a remote User Equipment (UE) to support UE-to-Network relay communication, comprising:
   connecting with a relay UE;
   establishing a RRC connection between the remote UE and a network via the relay UE;
   receiving a Radio Resource Control Release (RRCRelease) message for suspension of the RRC connection from the network via the relay UE, wherein the RRCRelease message includes a Cell Radio Network Temporary Identifier (C-RNTI) of the remote UE, and the C-RNTI of the remote UE is used for generating authentication information to be included in a Radio Resource Control Resume Request (RRCResumeRequest) message or in a Radio Resource Control Resume Request1 (RRCResumeRequest1) message for requesting resumption of the RRC connection; and
   transmitting the RRCResumeRequest message or the RRCResumeRequest1 message to the network.

2. The method of claim 1, further comprising:
   entering a RRC_CONNECTED if establishment of the RRC connection is completed.

3. The method of claim 2, further comprising:
   entering a RRC_INACTIVE from the RRC_CONNECTED in response to reception of the RRCRelease message from the network via the relay UE.

4. The method of claim 1, wherein the RRCRelease message includes suspendConfig.

5. The method of claim 1, further comprising:
   transmitting the RRCResumeRequest message or the RRCResumeRequest1 message to the network via the relay UE or directly to the network.

6. The method of claim 5, wherein the network comprises a base station.

7. The method of claim 1, wherein the authentication information is resumeMAC-I.

8. A remote User Equipment (UE) to support UE-to-Network relay communication, comprising:
   a control circuit;
   a processor installed in the control circuit; and
   a memory installed in the control circuit and operatively coupled to the processor;
   wherein the processor is configured to execute a program code stored in the memory to:
      connect with a relay UE;
      establish a RRC connection between the remote UE and a first network node via the relay UE;
      receive a first Radio Resource Control Release (RRCRelease) message for suspension of the RRC connection from the network via the relay UE, wherein the RRCRelease message includes a Cell Radio Network Temporary Identifier (C-RNTI) of the remote UE, and the C-RNTI of the remote UE is used for generating authentication information to be included in a Radio Resource Control Resume Request (RRCResumeRequest) message or in a Radio Resource Control Resume Request1 (RRCResumeRequest1) message for requesting resumption of the RRC connection; and
      transmit the RRCResumeRequest message or the RRCResumeRequest1 message to the network.

9. The remote UE of claim 8, further comprising:
   entering a RRC_CONNECTED if establishment of the RRC connection is completed.

10. The remote UE of claim 9, further comprising:
    entering a RRC_INACTIVE from the RRC_CONNECTED in response to reception of the RRCRelease message from the network via the relay UE.

11. The remote UE of claim 8, wherein the RRCRelease message includes suspendConfig.

12. The remote UE of claim 8, further comprising:
transmitting the RRCResumeRequest message or the RRCResumeRequest1 message to the first network via the relay UE or directly to the network.

13. The remote UE of claim 12, wherein the network comprises a base station.

14. The remote UE of claim 8, wherein the authentication information is resumeMAC-I.

* * * * *